US012122196B2

(12) United States Patent
Ciocia et al.

(10) Patent No.: US 12,122,196 B2
(45) Date of Patent: *Oct. 22, 2024

(54) HUB-INTEGRATED INFLATION SYSTEM

(71) Applicant: Aperia Technologies, Inc., Burlingame, CA (US)

(72) Inventors: Kevin Ciocia, Burlingame, CA (US); Brandon Richardson, Burlingame, CA (US)

(73) Assignee: Aperia Technologies, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,334

(22) Filed: Mar. 28, 2023

(65) Prior Publication Data

US 2023/0249501 A1 Aug. 10, 2023

Related U.S. Application Data

(63) Continuation of application No. 16/694,840, filed on Nov. 25, 2019, now Pat. No. 11,642,920.

(60) Provisional application No. 62/889,728, filed on Aug. 21, 2019, provisional application No. 62/865,822, filed on Jun. 24, 2019, provisional application No. 62/792,830, filed on Jan. 15, 2019, provisional application No. 62/771,748, filed on Nov. 27, 2018.

(51) Int. Cl.
*B60C 23/12* (2006.01)
*B60B 27/00* (2006.01)
*B60B 27/02* (2006.01)
*F04B 35/01* (2006.01)

(52) U.S. Cl.
CPC .......... *B60C 23/12* (2013.01); *B60B 27/0047* (2013.01); *B60B 27/02* (2013.01); *F04B 35/01* (2013.01); *B60B 2900/561* (2013.01)

(58) Field of Classification Search
CPC ..... B60C 23/12; B60C 23/127; B60C 23/137; B60B 27/0047; B60B 27/02; B60B 2900/561; F04B 35/01
See application file for complete search history.

(56) References Cited

U.S. PATENT DOCUMENTS

| 789,024 A | 5/1905 | Hibbard et al. |
|---|---|---|
| 1,358,524 A | 11/1920 | Cooper |
| 1,448,248 A | 3/1923 | Anthony |
| 1,484,914 A | 2/1924 | Thomas |
| 2,089,297 A | 8/1937 | Read et al. |
| 2,202,665 A | 5/1940 | Metz |

(Continued)

FOREIGN PATENT DOCUMENTS

| BR | 102012023751 A2 | 8/2014 |
|---|---|---|
| BR | 112015017312 A2 | 7/2017 |

(Continued)

OTHER PUBLICATIONS

Richardson, Brandon, et al., "System and Method for Tire Inflator Management", U.S. Appl. No. 18/538,645, filed Dec. 13, 2023.

*Primary Examiner* — S. Joseph Morano
*Assistant Examiner* — Emily G. Castonguay
(74) *Attorney, Agent, or Firm* — Jeffrey Schox; Diana Lin

(57) ABSTRACT

A hub-integrated inflation system which functions to convert relative motion at the wheel end (e.g., between the axle and the hub or wheel) into a pumping motion. The relative motion is then converted into mechanical or electrical energy, which can be used to actuate a pump of an inflator.

20 Claims, 28 Drawing Sheets

(56) References Cited

U.S. PATENT DOCUMENTS

| | | |
|---|---|---|
| 2,211,935 A | 8/1940 | Parker |
| 2,317,636 A | 4/1943 | Parker |
| 2,415,618 A | 2/1947 | West |
| 2,440,255 A | 4/1948 | Forrest |
| 2,496,691 A | 2/1950 | Berry |
| 2,899,907 A | 8/1959 | Becher |
| 2,962,119 A | 11/1960 | White |
| 3,012,820 A | 12/1961 | King |
| 3,047,339 A | 7/1962 | Hamer |
| 3,152,553 A | 10/1964 | Sverker |
| 3,175,507 A | 3/1965 | Sverker |
| 3,249,059 A | 5/1966 | Renn |
| 3,400,074 A | 9/1968 | Grenci |
| 3,452,801 A | 7/1969 | Fletcher et al. |
| 3,511,294 A | 5/1970 | Bepristis et al. |
| 3,532,449 A | 10/1970 | Garton |
| 3,730,215 A | 5/1973 | Conery et al. |
| 3,886,974 A | 6/1975 | Bjorklund |
| 3,981,633 A | 9/1976 | Wall |
| 4,018,579 A | 4/1977 | Hofmann |
| 4,030,300 A | 6/1977 | Thompson |
| 4,042,446 A | 8/1977 | Lawton |
| 4,095,923 A | 6/1978 | Cullis |
| 4,121,472 A | 10/1978 | Vural et al. |
| 4,157,530 A | 6/1979 | Merz |
| 4,180,985 A | 1/1980 | Northrup |
| 4,256,971 A | 3/1981 | Griffith |
| 4,291,235 A | 9/1981 | Bergey et al. |
| 4,370,894 A | 2/1983 | Sturesson |
| 4,460,006 A | 7/1984 | Kolze |
| 4,536,668 A | 8/1985 | Boyer |
| 4,606,710 A | 8/1986 | Maguire |
| 4,637,152 A | 1/1987 | Roy |
| 4,651,792 A | 3/1987 | Taylor |
| 4,744,399 A | 5/1988 | Magnuson et al. |
| 4,768,542 A | 9/1988 | Morris |
| 4,807,487 A | 2/1989 | Seidl |
| 4,819,593 A | 4/1989 | Bruener et al. |
| 4,852,528 A | 8/1989 | Richeson et al. |
| 4,893,459 A | 1/1990 | Orlando |
| 4,895,199 A | 1/1990 | Magnuson et al. |
| 4,910,148 A | 3/1990 | Sorensen et al. |
| 4,922,984 A | 5/1990 | Dosjoub et al. |
| 5,018,797 A | 5/1991 | Takata |
| 5,052,456 A | 10/1991 | Dosjoub |
| 5,173,038 A | 12/1992 | Hopfensperger et al. |
| 5,201,968 A | 4/1993 | Renier |
| 5,293,919 A | 3/1994 | Olney et al. |
| 5,325,902 A | 7/1994 | Loewe et al. |
| 5,342,177 A | 8/1994 | Cheng |
| 5,370,711 A | 12/1994 | Audit et al. |
| 5,375,984 A | 12/1994 | Wehling |
| 5,388,470 A | 2/1995 | Marsh |
| 5,409,049 A | 4/1995 | Renier |
| 5,413,159 A | 5/1995 | Olney et al. |
| 5,429,927 A | 7/1995 | Afseth et al. |
| 5,468,129 A | 11/1995 | Sunden et al. |
| 5,482,447 A | 1/1996 | Sunden et al. |
| 5,495,879 A | 3/1996 | Cabestrero |
| 5,512,439 A | 4/1996 | Hornes et al. |
| 5,525,493 A | 6/1996 | Hornes et al. |
| 5,538,062 A | 7/1996 | Stech |
| 5,591,281 A | 1/1997 | Loewe |
| 5,646,727 A | 7/1997 | Hammer et al. |
| 5,667,606 A | 9/1997 | Renier |
| 5,707,215 A | 1/1998 | Olney et al. |
| 5,759,820 A | 6/1998 | Hornes et al. |
| 5,846,354 A | 12/1998 | Winston et al. |
| 5,894,757 A | 4/1999 | Sully |
| 5,928,444 A | 7/1999 | Loewe et al. |
| 5,941,692 A | 8/1999 | Olney et al. |
| 5,941,696 A | 8/1999 | Fenstermacher et al. |
| 5,947,696 A | 9/1999 | Baumgarten |
| 6,092,545 A | 7/2000 | Bedore et al. |
| 6,144,295 A | 11/2000 | Adams et al. |
| 6,267,450 B1 | 7/2001 | Gamble |
| 6,360,768 B1 | 3/2002 | Galler |
| 6,463,798 B2 | 10/2002 | Niekerk et al. |
| 6,474,832 B2 | 11/2002 | Murray |
| 6,482,592 B1 | 11/2002 | Lundeberg et al. |
| 6,494,693 B1 | 12/2002 | Sunden |
| 6,663,348 B2 | 12/2003 | Schwarz et al. |
| 6,688,417 B2 | 2/2004 | Hansell |
| 6,742,386 B1 | 6/2004 | Larson |
| 6,744,356 B2 | 6/2004 | Hamilton et al. |
| 6,787,233 B1 | 9/2004 | Molteberg et al. |
| 6,814,547 B2 | 11/2004 | Childers et al. |
| 6,871,683 B2 | 3/2005 | Cobb |
| 6,984,702 B2 | 1/2006 | Fonnum et al. |
| 6,986,913 B2 | 1/2006 | Fonnum et al. |
| 6,994,136 B2 | 2/2006 | Stanczak |
| 7,013,931 B2 | 3/2006 | Toit |
| 7,029,576 B2 | 4/2006 | Siegfriedsen |
| 7,117,731 B2 | 10/2006 | Hrabal |
| 7,160,707 B2 | 1/2007 | Fonnum et al. |
| 7,173,124 B2 | 2/2007 | Deggerdal et al. |
| 7,217,762 B1 | 5/2007 | Joergedal et al. |
| 7,222,487 B1 | 5/2007 | Hinkley |
| 7,225,845 B2 | 6/2007 | Ellmann |
| 7,237,590 B2 | 7/2007 | Loewe |
| 7,255,323 B1 | 8/2007 | Kadhim |
| 7,302,837 B2 | 12/2007 | Wendte |
| 7,322,392 B2 | 1/2008 | Hawes |
| 7,357,164 B2 | 4/2008 | Loewe |
| 7,498,683 B2 | 3/2009 | Landwehr |
| 7,506,663 B2 | 3/2009 | Thomas et al. |
| 7,581,576 B2 | 9/2009 | Nakano |
| 7,607,465 B2 | 10/2009 | Loewe |
| 7,614,474 B2 | 11/2009 | Yang |
| 7,625,189 B2 | 12/2009 | Cheng |
| 7,704,057 B2 | 4/2010 | Malbec et al. |
| 7,748,422 B2 | 7/2010 | Bol |
| 7,763,689 B2 | 7/2010 | Fonnum et al. |
| 7,784,487 B2 | 8/2010 | Arnett |
| 7,784,513 B2 | 8/2010 | Loewe |
| 7,810,582 B2 | 10/2010 | Webb |
| 7,828,095 B2 | 11/2010 | Murata et al. |
| 7,828,101 B2 | 11/2010 | Radtke et al. |
| 7,847,421 B2 | 12/2010 | Gardner et al. |
| 7,856,871 B2 | 12/2010 | Mancosu et al. |
| 7,927,170 B2 | 4/2011 | Bickerton et al. |
| 7,931,061 B2 | 4/2011 | Gonska et al. |
| 7,931,817 B2 | 4/2011 | Bilski |
| 7,975,789 B2 | 7/2011 | Murata |
| 7,985,340 B2 | 7/2011 | Almaasbak et al. |
| 7,989,614 B2 | 8/2011 | Deggerdal et al. |
| 7,989,975 B2 | 8/2011 | Clement et al. |
| 8,004,104 B2 | 8/2011 | Hench |
| 8,022,561 B2 | 9/2011 | Ciglenec et al. |
| 8,038,987 B2 | 10/2011 | Fonnum et al. |
| 8,042,586 B2 | 10/2011 | Losey et al. |
| 8,083,503 B2 | 12/2011 | Voltenburg et al. |
| 8,110,351 B2 | 2/2012 | Bosnes |
| 8,113,254 B2 | 2/2012 | Benedict |
| 8,186,402 B2 | 5/2012 | Eigenbrode |
| 8,534,335 B2 | 9/2013 | Benedict |
| 8,581,433 B2 | 11/2013 | Sidenmark |
| 8,646,426 B2 | 2/2014 | Finkenbiner |
| 8,747,084 B2 | 6/2014 | Richardson et al. |
| 8,763,661 B2 | 7/2014 | Richardson |
| 8,794,280 B2 | 8/2014 | Flory et al. |
| 8,801,910 B2 | 8/2014 | Bazant et al. |
| 8,955,566 B2 | 2/2015 | Loewe |
| 9,039,386 B2 | 5/2015 | Richardson et al. |
| 9,039,392 B2 | 5/2015 | Richardson et al. |
| 9,074,595 B2 | 7/2015 | Richardson |
| 9,145,887 B2 | 9/2015 | Richardson |
| 9,151,288 B2 | 10/2015 | Richardson et al. |
| 9,381,780 B2 | 7/2016 | Hinque |
| 9,428,016 B2 | 8/2016 | Keeney et al. |
| 9,434,218 B2 | 9/2016 | Root |
| 9,597,932 B2 | 3/2017 | Dieckmann et al. |
| 9,682,599 B1 | 6/2017 | Hinque et al. |
| 9,789,739 B1 | 10/2017 | Hennig |

(56) References Cited

U.S. PATENT DOCUMENTS

| | | |
|---|---|---|
| 9,994,081 B2 | 6/2018 | Becker |
| 10,052,834 B2 | 8/2018 | Losey |
| 10,137,745 B2 | 11/2018 | McClellan |
| 10,144,254 B2 | 12/2018 | Richardson |
| 10,166,821 B2 | 1/2019 | Hennig |
| 10,183,535 B1 | 1/2019 | Chemali |
| 10,189,320 B2 | 1/2019 | Hinque |
| 10,239,364 B2 | 3/2019 | Hennig |
| 10,245,908 B2 | 4/2019 | Richardson |
| 10,358,005 B2 | 7/2019 | McClellan |
| 10,422,660 B2 | 9/2019 | Creech et al. |
| 10,513,156 B2 | 12/2019 | Hrabal |
| 10,576,794 B2 | 3/2020 | Lee |
| 10,625,544 B2 | 4/2020 | Balistreri |
| 10,814,683 B2 | 10/2020 | Richardson |
| 11,199,186 B2 | 12/2021 | Slesinski et al. |
| 11,209,289 B2 | 12/2021 | Creech et al. |
| 11,353,137 B2 | 6/2022 | Scopesi |
| 11,370,189 B2 | 6/2022 | Tsiberidis |
| 11,584,173 B2 | 2/2023 | Richardson |
| 2001/0000305 A1 | 4/2001 | Murray |
| 2002/0092346 A1 | 7/2002 | Niekerk et al. |
| 2003/0021693 A1 | 1/2003 | Schwarz et al. |
| 2003/0109657 A1 | 6/2003 | Fonnum et al. |
| 2004/0007302 A1 | 1/2004 | Hamilton et al. |
| 2004/0050760 A1 | 3/2004 | Siegfriedsen |
| 2004/0216827 A1 | 11/2004 | Stanczak |
| 2005/0014001 A1 | 1/2005 | Fonnum et al. |
| 2005/0067207 A1 | 3/2005 | Radtke et al. |
| 2005/0126273 A1 | 6/2005 | Hrabal |
| 2005/0147822 A1 | 7/2005 | Fonnum et al. |
| 2005/0239068 A1 | 10/2005 | Bosnes |
| 2006/0055174 A1 | 3/2006 | Landwehr |
| 2006/0102268 A1 | 5/2006 | Loewe |
| 2006/0118224 A1 | 6/2006 | Ellmann |
| 2006/0169349 A1 | 8/2006 | Nakano |
| 2007/0017595 A1 | 1/2007 | Arno et al. |
| 2007/0018458 A1 | 1/2007 | Martinez |
| 2007/0020130 A1 | 1/2007 | Malbec et al. |
| 2007/0040135 A1 | 2/2007 | Dyer et al. |
| 2007/0068238 A1 | 3/2007 | Wendt |
| 2007/0107822 A1 | 5/2007 | Loewe |
| 2007/0148022 A1 | 6/2007 | Cheng |
| 2007/0151648 A1 | 7/2007 | Loewe |
| 2007/0175831 A1 | 8/2007 | Almaasbak et al. |
| 2008/0003110 A1 | 1/2008 | Isono |
| 2008/0017256 A1 | 1/2008 | Thomas et al. |
| 2008/0035399 A1 | 2/2008 | Murata et al. |
| 2008/0135151 A1 | 6/2008 | Loewe |
| 2008/0149404 A1 | 6/2008 | Yang |
| 2008/0174120 A1 | 7/2008 | Gardner et al. |
| 2008/0190535 A1 | 8/2008 | Concu |
| 2008/0247883 A1 | 10/2008 | Yokomachi et al. |
| 2008/0289739 A1 | 11/2008 | Bol |
| 2008/0300396 A1 | 12/2008 | Deggerdal et al. |
| 2008/0308330 A1 | 12/2008 | Murata |
| 2009/0008942 A1 | 1/2009 | Clement et al. |
| 2009/0032158 A1 | 2/2009 | Rudolf et al. |
| 2009/0048733 A1 | 2/2009 | Isono |
| 2009/0087325 A1 | 4/2009 | Voltenburg et al. |
| 2009/0126997 A1 | 5/2009 | Webb |
| 2009/0151835 A1 | 6/2009 | Manning |
| 2009/0188310 A1 | 7/2009 | Mancosu et al. |
| 2009/0206024 A1 | 8/2009 | Bilski |
| 2009/0256532 A1 | 10/2009 | Ciglenec et al. |
| 2009/0301575 A1 | 12/2009 | Arnett |
| 2009/0311941 A1 | 12/2009 | Bickerton et al. |
| 2010/0102564 A1 | 4/2010 | Hench |
| 2010/0147429 A1 | 6/2010 | Gonska et al. |
| 2010/0243121 A1 | 9/2010 | Eigenbrode |
| 2011/0018275 A1 | 1/2011 | Sidenmark |
| 2011/0061621 A1 | 3/2011 | Finkenbiner |
| 2011/0146867 A1 | 6/2011 | Benedict |
| 2011/0146868 A1 | 6/2011 | Losey et al. |
| 2011/0203710 A1 | 8/2011 | Hinojosa et al. |
| 2011/0308953 A1 | 12/2011 | Bazant et al. |
| 2012/0020822 A1 | 1/2012 | Richardson et al. |
| 2012/0073716 A1 | 3/2012 | Benedict |
| 2013/0068361 A1 | 3/2013 | Flory et al. |
| 2013/0251552 A1 | 9/2013 | Richardson |
| 2013/0251553 A1 | 9/2013 | Richardson et al. |
| 2013/0276902 A1 | 10/2013 | Medley et al. |
| 2014/0000755 A1 | 1/2014 | Richardson et al. |
| 2014/0010680 A1 | 1/2014 | Richardson |
| 2014/0023518 A1 | 1/2014 | O'Brien et al. |
| 2014/0102621 A1 | 4/2014 | Losey |
| 2014/0186195 A1 | 7/2014 | Richardson et al. |
| 2014/0260969 A1 | 9/2014 | Richardson |
| 2015/0007920 A1 | 1/2015 | Tanno |
| 2015/0059950 A1 | 3/2015 | Hinque |
| 2015/0101723 A1 | 4/2015 | Keeney et al. |
| 2015/0239309 A1 | 8/2015 | Root |
| 2015/0360522 A1 | 12/2015 | Dieckmann et al. |
| 2015/0367693 A1 | 12/2015 | Richardson et al. |
| 2016/0008739 A1 | 1/2016 | Richardson |
| 2016/0107491 A1 | 4/2016 | Lin |
| 2016/0167465 A1 | 6/2016 | Hinque |
| 2016/0288592 A1 | 10/2016 | Becker |
| 2017/0015147 A1 | 1/2017 | McClellan |
| 2017/0015156 A1 | 1/2017 | McClellan |
| 2017/0015159 A1 | 1/2017 | Richardson |
| 2017/0036162 A1 | 2/2017 | Hoeldrich |
| 2017/0072752 A1 | 3/2017 | Lin |
| 2017/0166017 A1 | 6/2017 | Hinque |
| 2017/0166018 A1 | 6/2017 | Hinque et al. |
| 2017/0299077 A1 | 10/2017 | Jabcon et al. |
| 2018/0001718 A1 | 1/2018 | Hennig |
| 2018/0022170 A1 | 1/2018 | Hennig |
| 2018/0065429 A1 | 3/2018 | Richardson |
| 2018/0072112 A1 | 3/2018 | Lee |
| 2018/0104994 A1 | 4/2018 | Lin et al. |
| 2018/0170125 A1 | 6/2018 | Woodley |
| 2018/0178598 A1 | 6/2018 | Woodley |
| 2018/0207575 A1 | 7/2018 | Dunning et al. |
| 2018/0231395 A1 | 8/2018 | Creech et al. |
| 2018/0250991 A1 | 9/2018 | Hrabal |
| 2018/0326932 A1 | 11/2018 | Chemali |
| 2019/0023085 A1 | 1/2019 | Chemali |
| 2019/0063414 A1 | 2/2019 | Slesinski et al. |
| 2019/0118593 A1 | 4/2019 | Hrabal |
| 2019/0126693 A1 | 5/2019 | Balistreri |
| 2019/0271407 A1 | 9/2019 | Scopesi |
| 2019/0368897 A1 | 12/2019 | Creech et al. |
| 2020/0070450 A1 | 3/2020 | Tsiberidis |
| 2020/0130435 A1 | 4/2020 | Root et al. |
| 2020/0130436 A1 | 4/2020 | Root et al. |
| 2020/0130437 A1 | 4/2020 | Root et al. |
| 2020/0134942 A1 | 4/2020 | Root et al. |
| 2021/0016615 A1 | 1/2021 | Richardson |
| 2022/0161611 A1 | 5/2022 | Hrabal |
| 2022/0169084 A1 | 6/2022 | Van Ginderen et al. |

FOREIGN PATENT DOCUMENTS

| | | |
|---|---|---|
| CA | 2440255 A1 | 3/2005 |
| CN | 2202665 Y | 7/1995 |
| CN | 2496691 Y | 6/2002 |
| CN | 2635411 Y | 8/2004 |
| CN | 101415946 A | 4/2009 |
| CN | 101844491 A | 9/2010 |
| CN | 102963222 A | 3/2013 |
| CN | 103009938 A | 4/2013 |
| CN | 103171160 A | 6/2013 |
| CN | 103770579 A | 5/2014 |
| CN | 103879244 A | 6/2014 |
| CN | 102015334 B | 10/2014 |
| CN | 102963222 B | 5/2015 |
| CN | 102963221 B | 6/2015 |
| CN | 105365504 A | 3/2016 |
| CN | 105365505 A | 3/2016 |
| CN | 103009938 B | 6/2016 |
| CN | 103879243 B | 3/2017 |
| CN | 107816564 A | 3/2018 |
| CN | 108349337 A | 7/2018 |

(56) References Cited

FOREIGN PATENT DOCUMENTS

| | | |
|---|---|---|
| CN | 108349338 A | 7/2018 |
| CN | 108349340 A | 7/2018 |
| CN | 109070663 A | 12/2018 |
| CN | 110114231 A | 8/2019 |
| CN | 107816564 B | 11/2019 |
| CN | 108349338 B | 6/2020 |
| CN | 108349337 B | 11/2020 |
| CN | 108349340 B | 3/2021 |
| CN | 109070663 B | 8/2021 |
| DE | 1042446 B | 10/1958 |
| DE | 4042446 A1 | 7/1992 |
| DE | 19739144 A1 | 3/1999 |
| DE | 102012106549 A1 | 5/2014 |
| DE | 202017104222 U1 | 8/2017 |
| DE | 102019121377 A1 | 2/2021 |
| EP | 2572903 A1 | 3/2013 |
| EP | 2572903 B1 | 4/2016 |
| EP | 2951036 B1 | 12/2016 |
| EP | 3296131 A1 | 3/2018 |
| EP | 3332223 A1 | 6/2018 |
| EP | 3442813 A1 | 2/2019 |
| EP | 3296131 B1 | 6/2019 |
| EP | 3332223 B1 | 7/2019 |
| EP | 3535142 A1 | 9/2019 |
| EP | 3442813 B1 | 3/2020 |
| EP | 3535142 B1 | 9/2021 |
| GB | 530005 A | 12/1940 |
| GB | 2089297 A | 6/1982 |
| JP | 2005231573 A | 9/2005 |
| JP | 2010149073 A | 7/2010 |
| JP | 2011203230 A | 10/2011 |
| KR | 20070098639 A | 10/2007 |
| KR | 20080039578 A | 5/2008 |
| KR | 20140003969 U | 6/2014 |
| KR | 20170029520 A | 3/2017 |
| KR | 102256754 B1 | 5/2021 |
| RU | 112098 U1 | 1/2012 |
| WO | 2009034321 A1 | 3/2009 |
| WO | 2009110001 A1 | 9/2009 |
| WO | 2012012617 A2 | 1/2012 |
| WO | 2017064106 A1 | 4/2017 |

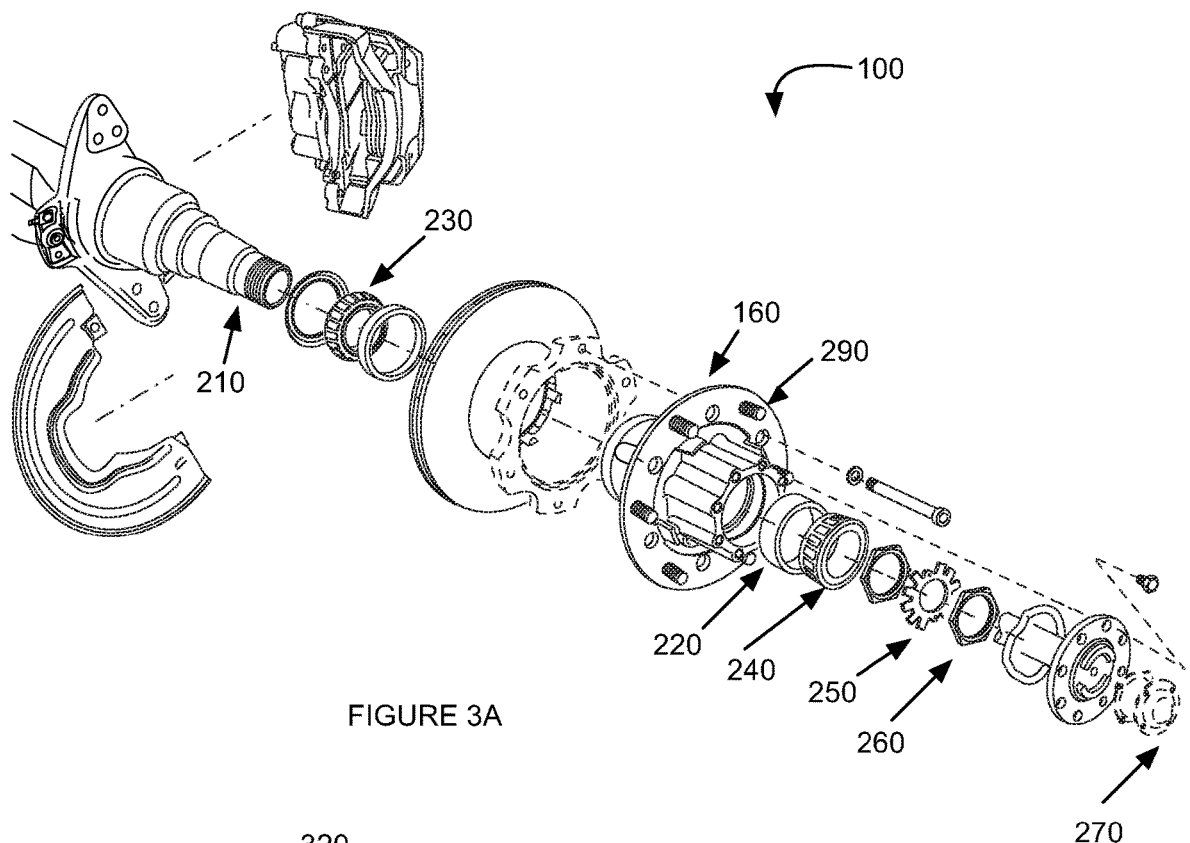
FIGURE 3A
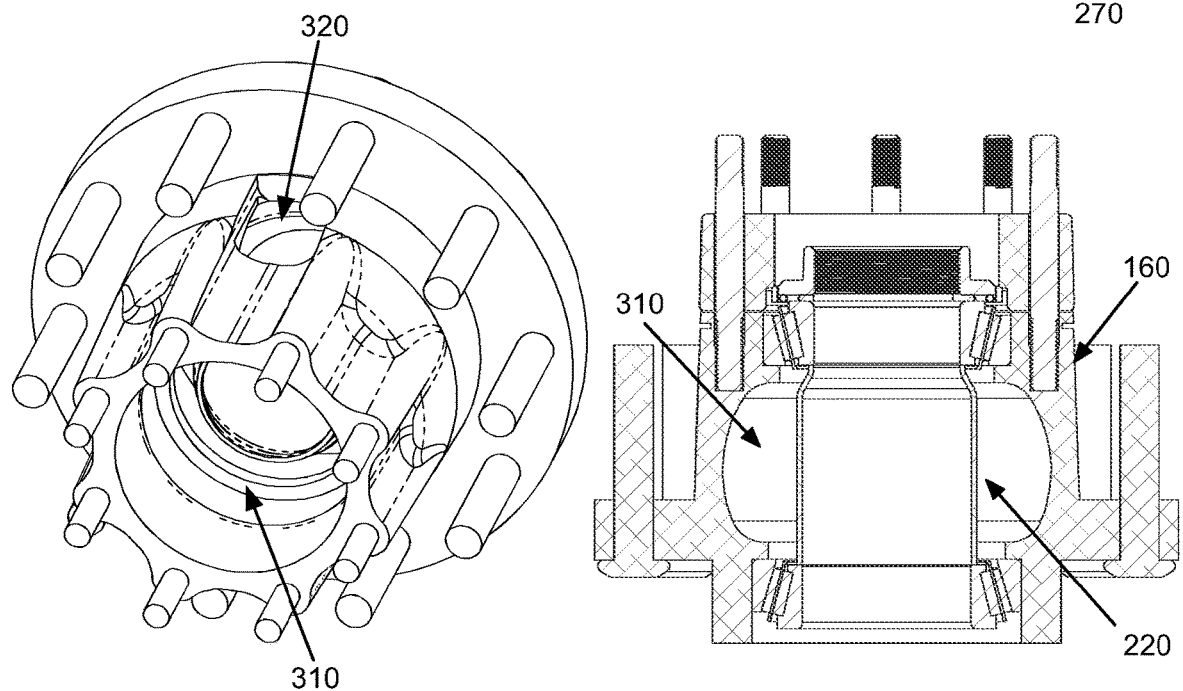
FIGURE 3B
FIGURE 3C

SECTION A-A

DETAIL B

DETAIL C

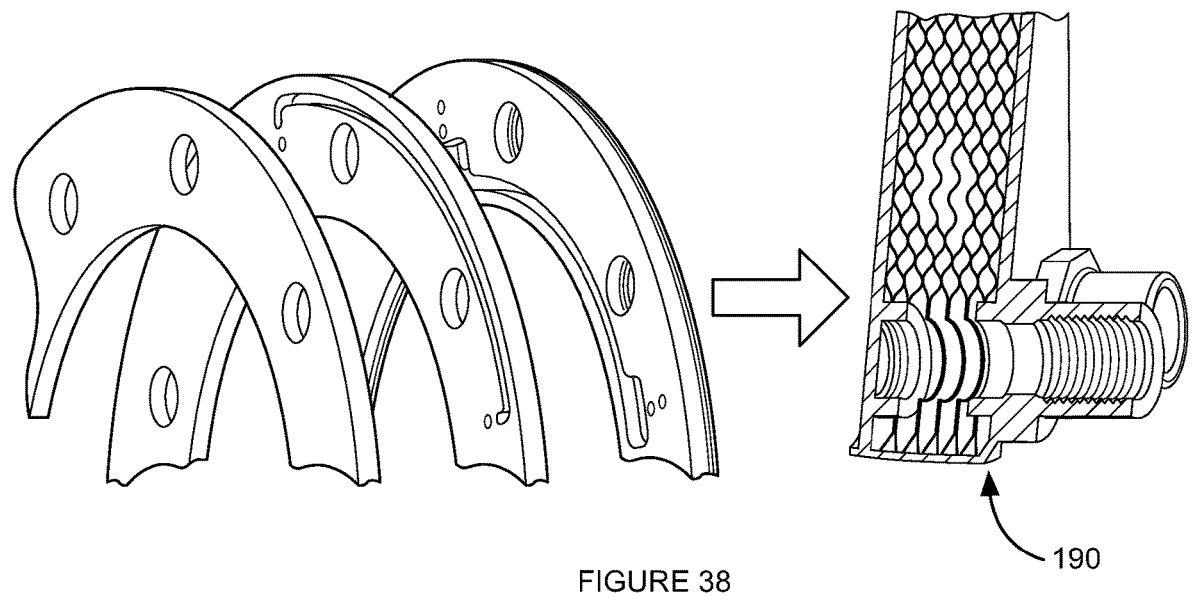
FIGURE 38
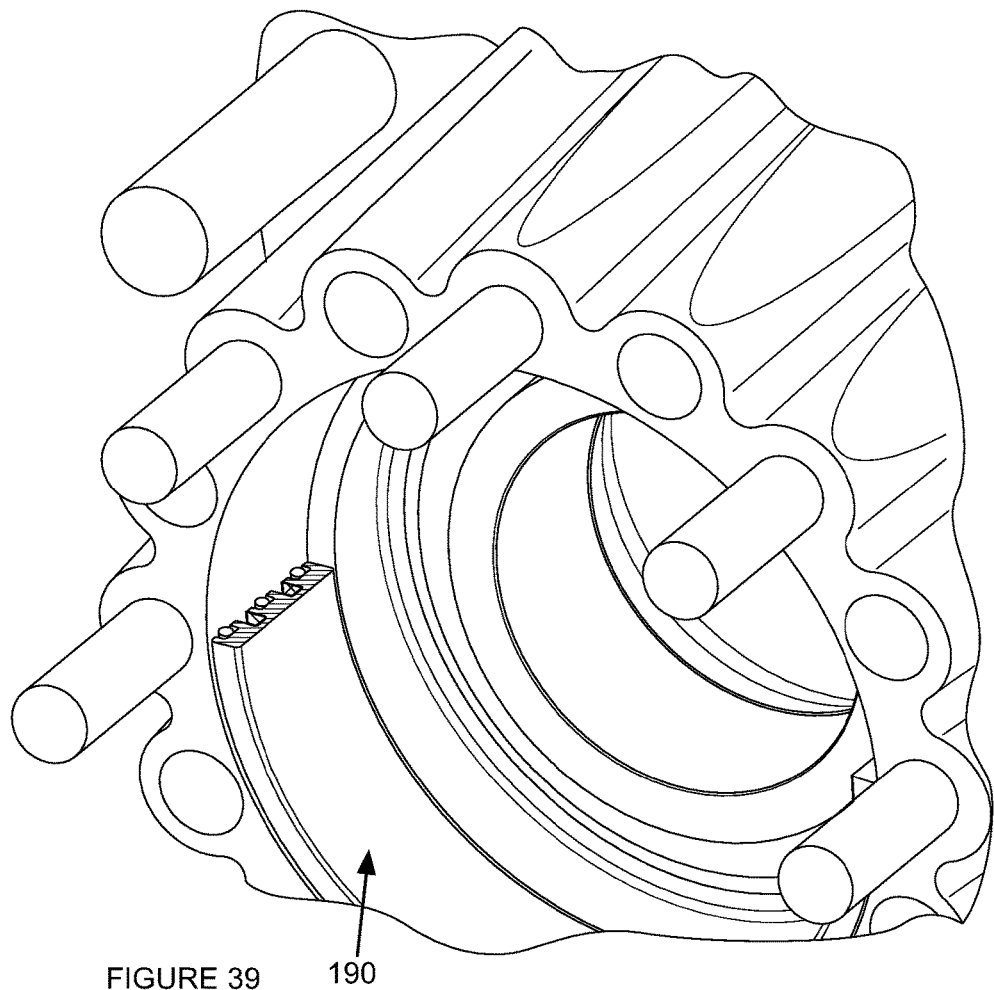
FIGURE 39    190

HUB-INTEGRATED INFLATION SYSTEM

CROSS-REFERENCE TO RELATED APPLICATIONS

This application is a continuation of U.S. Pat. No. 11,642,920, filed 25 Nov. 2019, which claims the benefit of U.S. Provisional Application No. 62/771,748 filed 27 Nov. 2018, U.S. Provisional Application No. 62/792,830, filed 15 Jan. 2019, U.S. Provisional Application No. 62/865,822, filed 24 Jun. 2019, and U.S. Provisional Application No. 62/889,728, filed 21 Aug. 2019, each of which is incorporated in its entirety by this reference.

TECHNICAL FIELD

This invention relates generally to the inflation system field, and more specifically to a new and useful wheel-end inflation system in the inflation system field.

BRIEF DESCRIPTION OF THE FIGURES

FIGS. 3A, 3B, and 3C are an exploded view of a hub example, an example of a hub body, and a cross-sectional view of a hub body, respectively.

FIG. 38 is a schematic representation of an example of a manifold defined by stacked plates.

FIG. 39 is a schematic representation of an example of a manifold defined by an annular ring.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
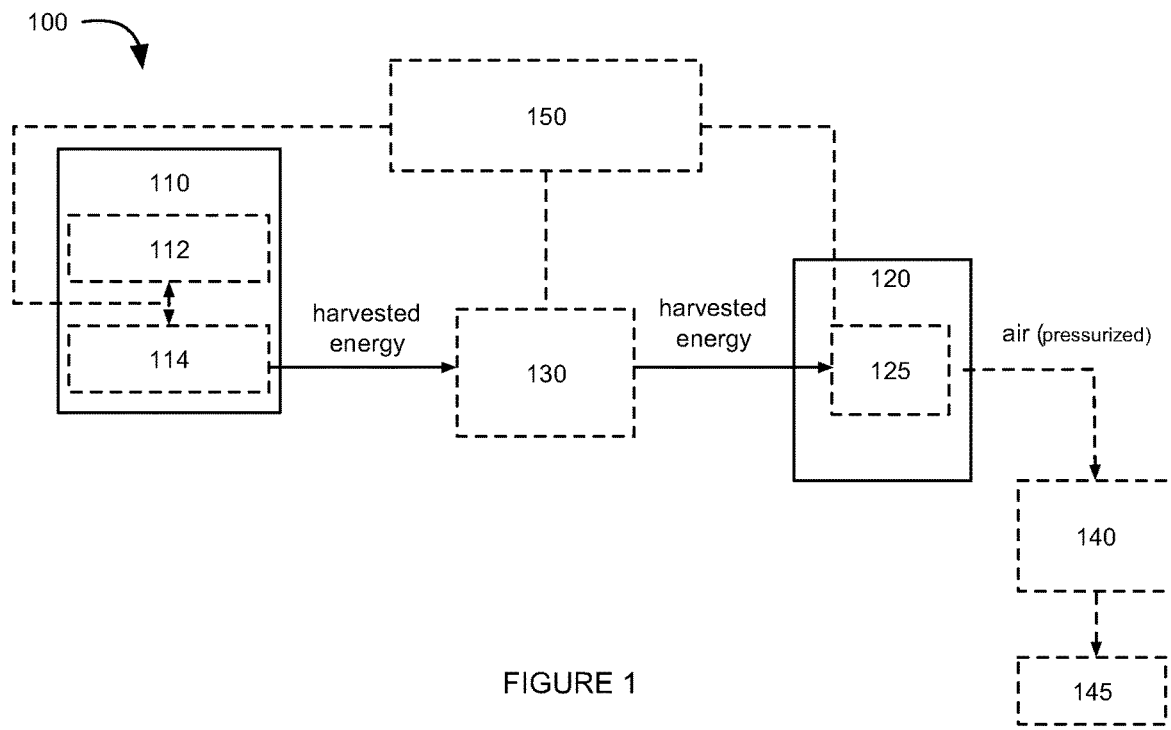
FIG. 1 is a schematic representation of the inflation system.

As shown in FIG. 1, the hub-integrated inflation system 100 includes a power pickup assembly 110 and an inflator 120. The hub-integrated inflation system can additionally or alternatively include an energy transmission system 130, a tire connector 140, a selective engagement mechanism 150, an energy transmission mechanism 160, or any other suitable component.

In variants, the inflator can include a housing, a pump 125, a mounting mechanism, an air inlet fluidly connected to the pump, an air outlet fluidly connecting the pump to the tire, and a power pickup interface connected to the power pickup assembly. The power pickup assembly can include an output component 114, statically mounted relative to the axle, and an input component 112, statically mounted relative to the hub. However, the hub-integrated inflation system can include any suitable set of components.

The hub-integrated inflation system functions to convert relative motion at the wheel end (e.g., between the axle and the hub or wheel) into a pumping motion. The relative motion is then converted into mechanical or electrical energy, which can be used to actuate the pump of the inflator.

2. Benefits

The hub-integrated inflation system can confer several benefits over conventional tire inflation systems.

First, the hub-integrated inflation system can be integrated into (e.g., built into, assembled into) the hub of the wheel, which can minimize the profile and accessibility of the pump from the wheel exterior. This can function to reduce pump damage and theft. Variants integrating the inflation system into the hub can provide a facile end-user experience, with no end-user installation (e.g., the inflation system is built into or assembled into hub) or one-time installation (e.g., after-market installation). Variants integrating the inflation system into the hub can additionally lower system exposure to damage resulting from environmental or road hazards.

Second, variants of the hub-integrated inflation system can be specific to a given wheel end, such that the pressurized air is not centralized. This can minimize the complexity that arises from centralized tire inflation systems, such as managing complex components (e.g., rotary fluid unions) and minimizing leak diagnosis and management complexity. Variants of the system can operate without an air pressure connection and/or power connection to other vehicle systems (e.g., only a wireless communication link to vehicle computers, no powered electrical connection to vehicle, no electrical wiring to vehicle computers, etc.).

Third, variants of the hub-integrated inflation system can be automatically controlled (e.g., based on pneumatics or tire pressure; using an automatic control system; etc.), manually controlled, or otherwise controlled.

Fourth, variants of the hub-integrated inflation system can improve the assembly and serviceability of tire inflation systems. Variants include a pump mounted radially on the hub body, allowing the pump to be accessed/serviced without disassembly of the hub. Variants integrated into the hub do not need to be removed and reattached every time the wheel is changed, which improves end-user experience and vehicle serviceability.

Fifth, variants of the hub integrated inflation system minimize component wear, which can increase the lifetime of the system and/or reduce required maintenance. Variants have a no-slip condition at engaged bearing surfaces (e.g., cam follower e follower surface of floating cam, reference surface of floating cam on bearing spacer, etc.) when under load and a slip condition when unloaded (or experience minimal loading due to component weight and/or inertia). Variants of the system have component contacts (e.g., cam follower contacting floating cam, floating cam contacting bearing surface etc.) inside of a lubricant cavity (e.g., flooded with lubricant) to minimize component wear resulting from component contacts. Variants of the system decouple components (e.g., cam follower contacting floating cam, floating cam contacting bearing surface etc.) during one or more modes of operation (e.g., pumping mode 500, non-pumping mode 510) to reduce component wear.

Sixth, variants of the hub integrated inflation system can reduce the number of components required, which can minimize weight, cost, and failure points on the system. In some variants, the pump, cam follower, and/or floating cam operate as the selective engagement mechanism (SEM), so there are no additional actuators or components required for the SEM.

However, the hub-integrated inflation system can confer any suitable set of benefits.

3. Hub

The hub-integrated inflation system can be used with a hub that rotatably mounts one or more wheels or tires 145 to an axle 200 of a vehicle (e.g., a truck, a car, etc.).

Components of the hub-integrated inflation system and/or external components (e.g., the axle) can define one or more axes. Axes defined can include: geometric axes, motion axes (e.g. translation axes, rotational axes, etc.), and/or any other suitable set of axes. For example, each component (or combination thereof) can define a central axis. The central axis can be: a geometric central axis, a mass central axis (e.g., an axis extending through a center of mass of the component), or any other suitable central axis. In another example, each component can define a rotational axis, wherein the component rotates about the rotational axis (e.g., axis of rotation). Different axes of different components can be aligned (e.g., coaxial), offset, parallel, orthogonal, skewed, or otherwise arranged.

The axle can include: an axle spindle 210, an axle shaft, axle housing, and/or any other suitable component. In variants, the axle can include the hub. The axle shaft and/or spindle can be: static relative to the vehicle body (e.g., not rotate relative to the vehicle body, such as in a trailer axle), static relative to the wheel (e.g., rotate with the wheel) rotate relative to the vehicle body (e.g., axle shaft in a drive axle), rotate relative to the wheel (e.g., not rotate with the wheel), or otherwise actuate relative to the vehicle or wheel.

The hub can include: a hub cap 270, a spindle nut 260 (and optionally spindle nut retention 262), a spacer nut 280, a lock nut (or lock washer 250), a hub body 160 (e.g., hub barrel, hub casing), an outer bearing 240, an inner bearing 230, a bearing spacer 220, studs 290 (e.g., drive studs) extending through stud bores defined in the hub body and mechanically connecting the hub to the axle, or any other suitable set of components (example shown in FIG. 3A).

The bearing spacer can be arranged in any suitable location. The bearing spacer preferably remains static relative to the axle spindle (e.g., is directly or indirectly mounted to the axle spindle), but can be arranged in any other appropriate manner. The bearing spacer preferably circumferentially surrounds the axle spindle (e.g., encircles the axle spindle) and has a central or rotational axis aligned with the axle spindle's central or rotational axis. The bearing spacer is preferably arranged within the lubrication chamber, between the inner and outer bearings, but can additionally or alternatively be arranged outboard of the inner bearing relative to the axis of rotation, inboard of the outer bearing relative to the axis of rotation, and/or otherwise arranged. The bearing spacer can have any suitable geometry. The bearing spacer preferably has a convex outer surface (with an outer bearing diameter) and a concave inner surface (with an inner bearing diameter), but can be otherwise configured. The bearing spacer preferably defines an annular cross section (e.g., wherein the outer and inner surfaces define circular cross sections), but can alternately have an arcuate outer surface with one or more lobes relative to the axis of rotation, have a circular triangular outer surface, have a changing cross sectional area/geometry (for an cross section orthogonal to the axis of rotation), have one or more grooves in the convex outer surface, and/or have any other suitable geometry. The bearing spacer can be mounted in any suitable way. Preferably, the bearing spacer is clamped between the inner race of the inner bearing and the inner race of the outer bearing (e.g., by the race sides, by the race arcuate surfaces), but can additionally or alternately be clamped between the inner race of the inner bearing and a non-rotary component on the axle, and/or clamped to the inner race of the outer bearing. The clamping force is preferably generated by a spindle nut, but additionally or alternatively the bearing spacer can include an internal spring pre-loaded against one or more inner bearing races, press-fit, mechanically bonded, and/or otherwise secured.

The hub is preferably associated with an axis of rotation (rotation axis), wherein the hub preferably rotates about the axis of rotation. The axis of rotation can be defined relative to the hub (e.g., a hub component, such as the hub body or hub barrel), axle component (e.g., axle spindle), external reference, wheel, tire, vehicle frame, vehicle suspension, the ground, a driveshaft, and/or a different component.

In a first variation, the wheel mounted by the hub rotates about the axis of rotation. In a second variation, the axle (e.g., axle spindle, axle shaft, axle component driven by the transmission, etc.) rotates about the axis of rotation. The axis of rotation can extend through: the wheel, the axle, the hub (e.g., hub body), the bearing spacer, the bearings, and/or any other suitable hub or axle component. The axis of rotation is preferably coaxially aligned with or intersect the hub or axle component's: geometric central axis (e.g., longitudinal axis), mass center, or other component reference. However, the axis of rotation can additionally or alternatively be offset the component reference.

In variants, the hub body can define a lubricant cavity (e.g., lubricant reservoir 310), wherein the bearing spacer is arranged within the lubrication cavity (example shown in FIG. 3B and FIG. 3C). The lubrication cavity can be selectively fluidly connected to the ambient environment by a lubrication hole. The lubrication hole can extend radially through the hub casing from the hub interior to the hub exterior and defined along an axial portion of the hub (e.g., between the drive studs and wheel studs; axially (relative to the axis of rotation) through the hub cap; or be otherwise arranged. The lubrication hole can be fluidly sealed from the ambient environment by a lubrication cap. In variants, the fill hole can be modified (e.g., enlarged, machined out) and sealed using a cap, bolts, gaskets, membranes and/or any other appropriate components.

In variants, the hub body can interface with brakes, which function to slow the vehicle. Brakes can be mounted proximal to the wheel studs on a radially inner portion of the hub. Brakes can include a brake drum which fits over the hub, and/or arranged in any other suitable manner.

Each hub-integrated inflation system can be connected to one wheel, two wheels, or any other suitable number of wheels (e.g., per wheel end). Each hub-integrated inflation system can be connected to one hub, or multiple hubs. Each hub preferably includes a single hub-integrated inflation system, but can alternatively include multiple hub-integrated inflation systems. Each vehicle can include one or more hub-integrated inflation systems.

The hub-integrated inflation system can be integrated into the hub, retrofit into the hub, attached to the wheel (e.g., removably attached), or otherwise attached to the system.

The hub can be a steer hub, a drive hub, a trailer hub, or any other suitable type of hub. The hub-integrated inflation system can be used with a front axle, rear axle, full-floating axle, semi-floating axle, three-quarter floating axle, non-floating axle, live axle, dead axle, lift axle, drive axle, steer axle, trailer axle, and/or any other appropriate axle.

However, the hub can additionally or alternately include any suitable set of components in any suitable arrangement.

4. Inflation System

The inflator of the hub-integrated inflation system functions to pressurize air, and can additionally or alternatively form a component (e.g., output component) of the power pickup assembly, form a component of the hub (e.g., a structural component, a retention mechanism, etc.), or perform any suitable functionality. Each hub-integrated inflation system can include one or more inflators or the same or different type.

One or more components of the inflation system operate relative to an axis of rotation, which can be the same as (or coaxial with) the axis of rotation of the hub or can be a different axis of rotation. The axis of rotation can be defined relative to a hub component, axle component, external reference, and/or other component. Preferably, the axis of rotation is defined relative to the axle spindle, but can additionally or alternatively be defined relative to the wheel, hub (hub body or hub barrel), tire, vehicle frame, vehicle suspension, the ground, a driveshaft, and/or a different component. The axis of rotation can be defined by component geometry (e.g., a boss, one or more faces/holes, axis of a hole, axis of an annular surface, etc.), motion of a center of mass, and/or motion of a body (rotational and/or translational). Most preferably, the axis of rotation is the axis of the axle spindle, but can additionally or alternatively be the axis the wheel, the axis of rotation of the wheel relative to the axle spindle, the axis of rotation of the hub body relative to the wheel, or otherwise defined.

The inflator can be arranged over the hubcap (and/or axle flange), replace the hubcap (and/or axle flange), be arranged proximal the hubcap (and/or axle flange), be arranged around the spindle nut (e.g., concentrically about the spindle nut), be arranged between the hubcap and the hub barrel, be arranged within the lubricant reservoir, be arranged over the bearing spacer (e.g., concentrically about the bearing spacer), be coaxially arranged with the lubricant reservoir lumen, be arranged between the hub barrel and the brake, be arranged along the exterior of the hub barrel (e.g., between the drive studs, in the hub barrel scalloping, along a face of the hub barrel, within the space between the hub cap and the hub barrel, etc.), be arranged within the studs, be arranged between the studs (e.g. extend axially along the hub exterior), replace the drive studs, be arranged within the lubricant hole 320, be arranged within new apertures formed through the hub barrel (e.g. holes formed axially, radially, arcuately, etc.), or otherwise arranged. The inflator can have an annular geometry, form a cap (e.g., form a cavity or divot), have a cylindrical geometry, replace a hub component, or have any other suitable geometry.

Components of the inflation system can be assembled through the rear of the hub, through the lubrication hole through the front of the hub, manufactured with the hub or hub components, or otherwise assembled into the hub.

Figure 9:
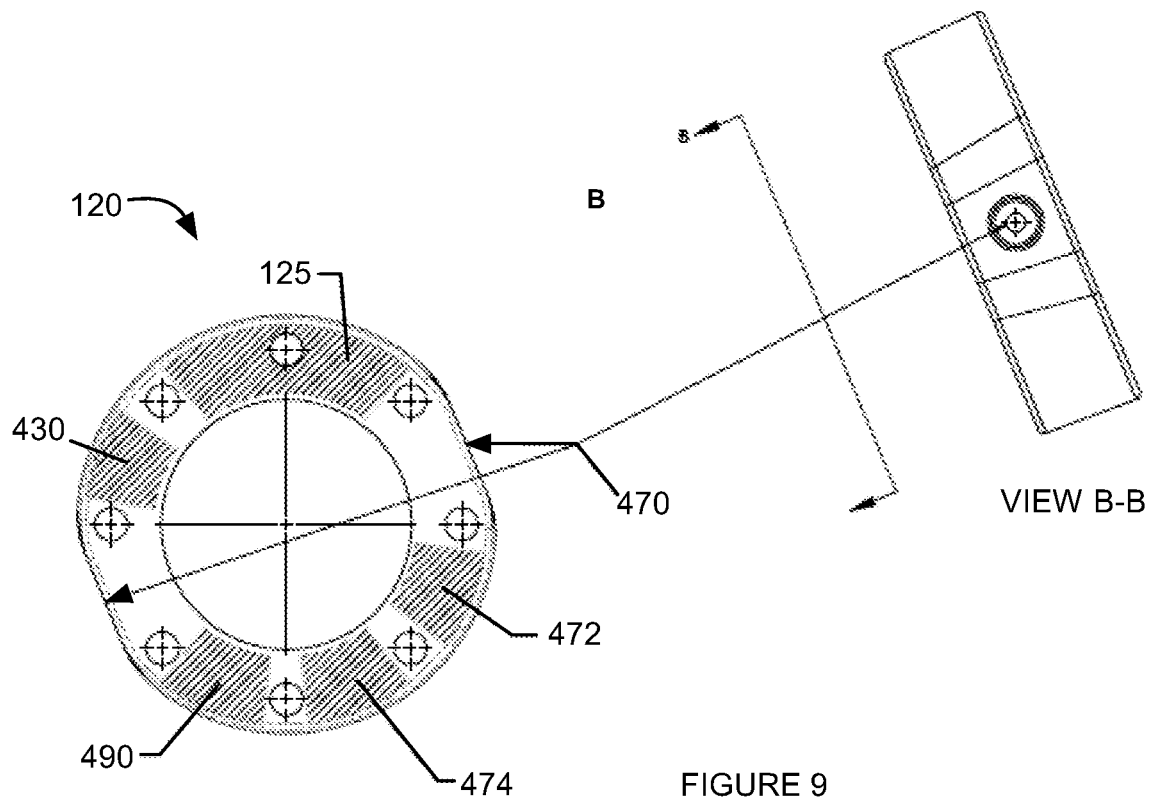
FIG. 9 is a schematic representation of an example of inflator component layout within an inflator example.

The inflator preferably includes a pump and a housing, but can additionally or alternatively include an air inlet, an air outlet, a power pickup interface, an energy transmission mechanism, and/or any other suitable component (example shown in FIG. 9). In an example shown in FIG. 9, the inflator can optionally include: a generator 430, an electronics module 490, a hose connector 470, an intake filter 472, an exhaust filter and water handling unit 474, and/or any suitable components.

The pump of the inflator functions to pressurize air. The pump is preferably fluidly connected to the fluid source (e.g., ambient environment, via the air inlet), fluidly connected to the tire (e.g., via the air outlet and/or tire connector), and mechanically or electrically connected to the power pickup assembly. The pump is preferably arranged inside of the inflator housing, but can additionally or alternatively be arranged outside of the inflator housing or form the inflator housing. However, the pump can be otherwise connected to the hub-integrated inflation system components.

Each inflator preferably includes one or more pumps of the same or different type, with the same or different arrangement.

The pump is preferably a piston pump with a chamber and piston (e.g., actuating within the chamber along an actuation axis), but can additionally or alternatively be a peristaltic pump, or be any other suitable pump.

The piston of the piston pump can include a piston shaft connected to a piston head (as different components or the different parts of the same component). Piston shaft actuation preferably translates the piston head along the chamber length between an induction or intake stroke and a compression stroke, between a top dead center (TDC) position and a bottom dead center (BDC) position, and/or between any other suitable set of strokes, positions, and/or modes. The piston shaft can be connected (rigidly or rotatably) to the piston, integrated from the piston, separate from the piston, integrated into the power pickup interface, and/or otherwise implemented.

The pump can be radially aligned with the hub (e.g., hub longitudinal axis), axially aligned with the hub, aligned along a cord of the hub, skewed or offset from the hub, or otherwise arranged. In variants, the piston shaft can extend radially outward relative to the axis of rotation, but can additionally or alternately be skewed or otherwise offset. The pumping motion is preferably linear actuation, but it can alternatively or additionally be pneumatic or pumping motion.

Figure 21:
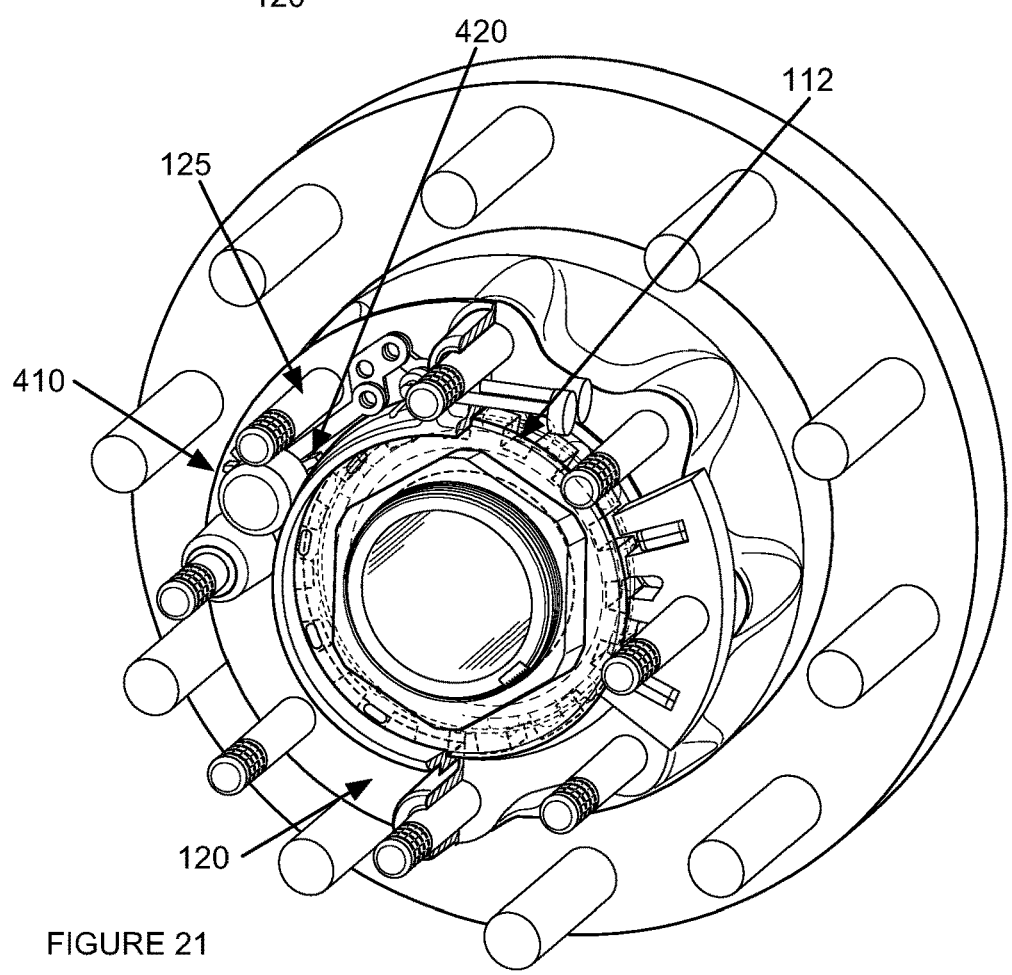
FIGS. 21 and 22 are examples of the power pickup assembly for the first variant of the inflation system.

In a first variation, the pump piston is directly or indirectly connected (e.g., via an energy transmission mechanism, via a rotary-to-linear converter, via a motor 410) to the output component of the power pickup assembly (PPA). In this variation, the PPA is preferably a mechanical PPA, but can alternatively or additionally be an electrical generator PPA. In one example (example shown in FIG. 21), the pump piston can be driven by a motor via an intermediate gear set, wherein the motor can be powered by an electrical generator PPA. In a second example, the pump piston can be directly connected to the PPA, wherein the piston shaft connects an output component of the PPA (e.g., a cam surface, a cam follower) to the piston head.

In a second variation, the pump is electrically connected (e.g., directly or indirectly, via an electricity conditioning circuit) to the output component of the power pickup assembly. In this variation, the PPA is preferably an electrical generator PPA, but can alternatively or additionally be a mechanical PPA.

However, the pump can be otherwise configured.

The inflator housing functions to encapsulate and mechanically protect the pump, and can additionally or alternatively define fluid manifolds, mounting points, or perform any other suitable functionality. The inflator housing can be a single piece housing, a multi-piece housing (e.g., a two-piece housing), or be otherwise constructed. The inflator housing can be made of metal, plastic, a combination thereof, or any other suitable material.

The inflator can optionally include one or more mounting mechanisms, which function to mount the inflator component(s) to the hub or wheel component. All or a portion of the inflator components can be statically mounted, movably mounted, entrained, and/or otherwise secured. Components which are not statically mounted can be: floating, constrained with less than 6 degrees of freedom relative to one or more hub components, partially constrained in one or more modes of operation, have different constraints between one or more operation modes, and/or be otherwise configured. The inflator components can be retained or constrained: axially, radially, arcuately, and/or otherwise constrained. In a first example, the cam follower is radially constrained relative to a follower surface of the floating cam in the pumping mode. In a second example, a floating cam is rotationally constrained (about the axis of rotation) relative to the cam follower and/or hub body in the non-pumping mode. In a third example, a floating cam is axially constrained (e.g., along the bearing spacer longitudinal axis, by a collar or the walls of a groove, etc.).

Examples of the mounting mechanism can include bolts, studs, or any other suitable fixturing mechanism. Additionally or alternatively, the inflator components can be mounted using an interference fit, adhesive, or any other suitable retention mechanism. Additionally or alternatively, the mounting mechanism can use existing hub retention mechanisms (e.g. assembled into the inflator position at the hub assembly) to retain the inflator to the hub or wheel. Additionally or alternatively, the mounting mechanism can use: a channel(s) and/or boss(es) in a different component (e.g., groove or flange in the hub body, piston shaft, cam follower, bearing spacer, etc. that the inflator component rests within), shaft collar(s) (e.g., on the bearing spacer), snap ring(s) (e.g., external on the bearing spacer, internal on the hub body), guides mounted to the hub, spacer(s) (e.g., on either side of a floating cam), one or more pins (e.g., cotter pin, pin meshing with a channel in floating cam and/or bearing spacer, etc.) and/or any other suitable retention mechanism.

The power pickup interface of the inflator functions to interface with the power pickup assembly (PPA). The power pickup interface preferably interfaces with the output component of the PPA, but can additionally or alternatively interface with the input component of the PPA, form a component of the PPA (e.g., the output component, the input component), or be otherwise coupled to the PPA. For example, the housing can include an output gear 420, can include windings or magnetic elements, or can include any other suitable component of the power pickup assembly.

The power pickup interface is preferably connected to the pump, more preferably the piston of the pump, but can alternatively be connected to any other suitable component.

The power pickup interface is preferably directly connected to the pump, but can additionally or alternatively be indirectly connected to the pump. The power pickup interface can be indirectly connected to the pump by a rotary-to-linear converter, such as a crank or cam 102, or any other suitable connection. Additionally or alternatively, the power pickup interface can be connected to the pump via an electrical connection, such as a wired or wireless connection. The power pickup interface can be entirely located within the inflator, partially located within the inflator, arranged outside of the inflator (e.g. wherein power is transmitted through the housing), or otherwise located.

The power pickup interface can be arranged on the inflator housing, such as the interior surface, exterior surface, an end of the inflator housing, or any other suitable surface thereof; be arranged within the inflator housing (e.g., wherein the output component extends into the inflator housing); or be otherwise arranged.

The power pickup interface can include a cam follower 101 to transmit energy from a rotary component (e.g., cam, floating cam) to the pump. The cam follower can be connected to the piston shaft, integrated into the piston shaft, integrated into a peristaltic pump, and/or otherwise configured. Each pump can be connected to one or more cams followers, and each cam follower can be connected to one or more pumps. The cam follower preferably contacts and traverses along a follower surface of a cam (acting as a bearing surface), but can additionally or alternately contact any appropriate surface on a PPA component. The cam follower can be statically, rotatably, translatably, or otherwise coupled to the pump. The cam follower can be arranged radially inward of the follower surface (e.g., arranged within a channel, following a concave surface), be arranged radially outward of the follower surface (e.g., following outer surface of a cam, engaging a convex surface), or otherwise arranged relative to the follower surface. The cam follower can be constructed from a wear resistant material, a self-lubricating material (e.g., graphite impregnated, Teflon, nylon, Delrin, etc.), and/or otherwise constructed.

In a first variant, the cam follower includes a roller that rolls along a cam surface (e.g., follower surface). The roller can be rotatably mounted to the pump-PPA connection (e.g., piston shaft) along the roller's rotational axis. The roller preferably engages with a no-slip condition, but can alternatively engage with a slip condition, both a no-slip and slip condition, be controllable between a slip state and no-slip state, or be otherwise configured. In a second variant, the cam follower includes a slider that slides along a cam surface (e.g., follower surface). In a first embodiment, the slider can translate within a groove defined in the cam surface. In a second embodiment, the slider can define a groove, wherein the cam surface (or portion thereof) slides within said groove. However, the cam follower can be otherwise configured.

Figure 32:
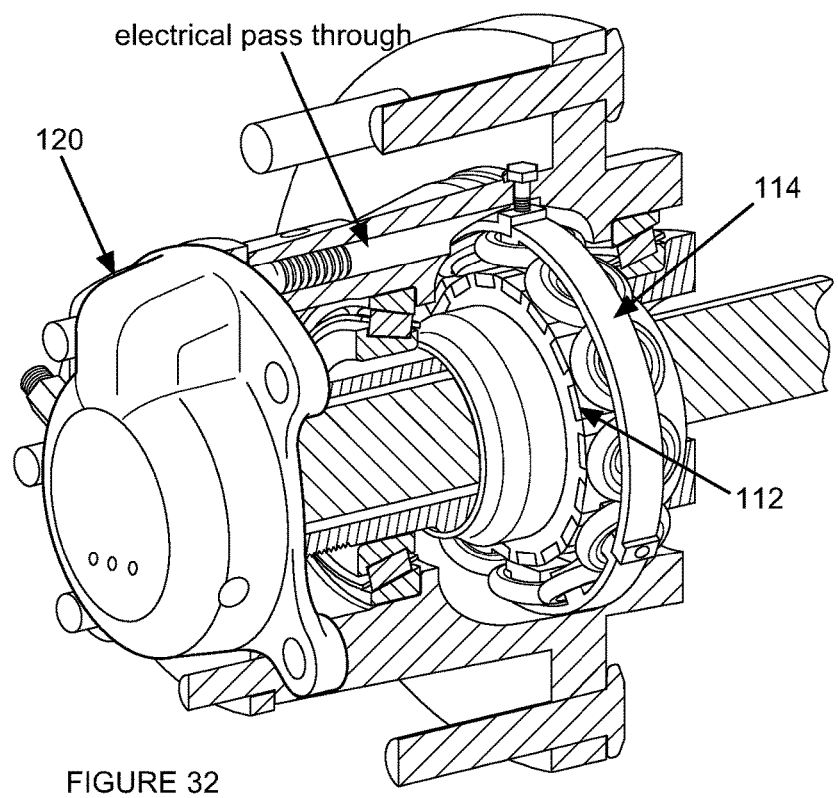
FIG. 32 is a schematic representation of an example of the inflation system with an electrical generator power pickup assembly (e.g., cooperatively forming a permanent magnet generator, with an array of permanent magnets on the bearing spacer and a set of coils mounted to the output component), an energy transmission mechanism extending through a stud, and an example of the eighth embodiment of the inflation system.
Figure 33:
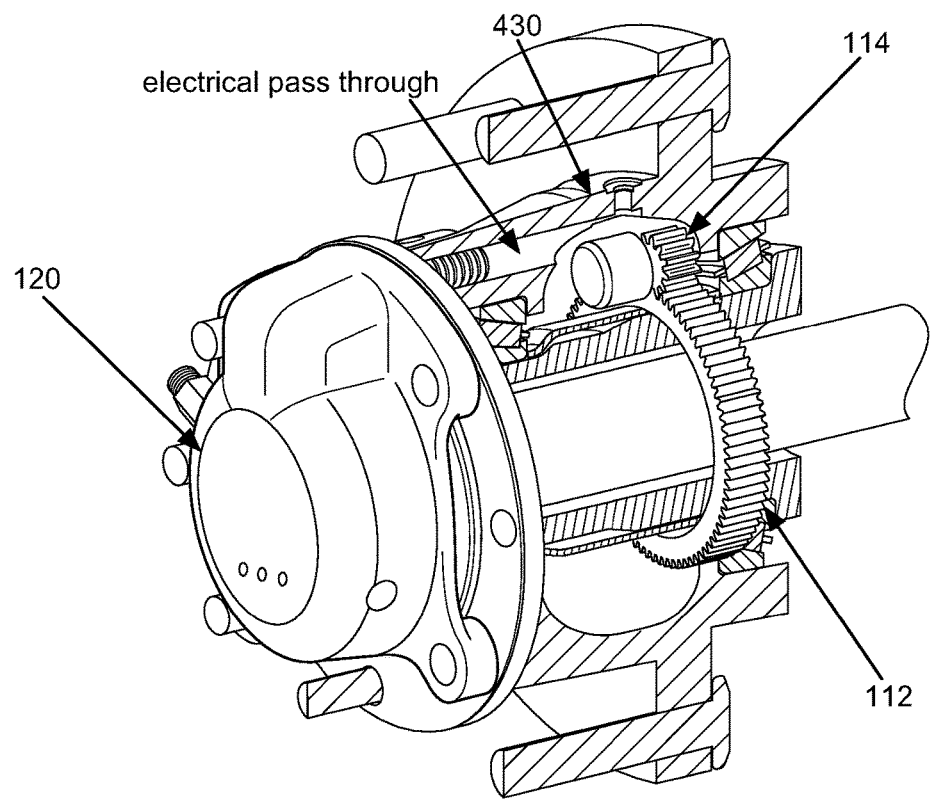
FIG. 33 is a schematic representation of an example of the inflation system with a hybrid power pickup assembly, an energy transmission mechanism extending through a stud, and an example of the eighth embodiment of the inflation system.
Figure 34:
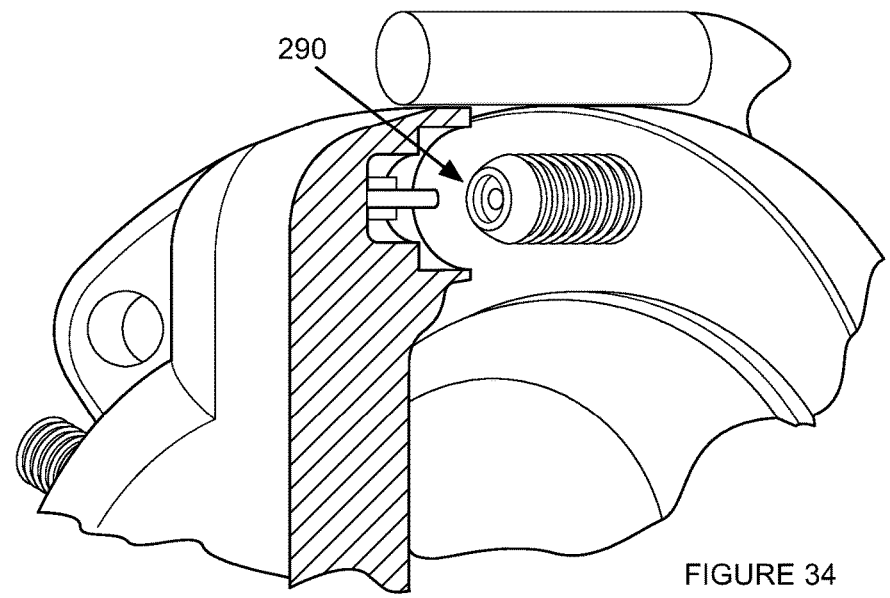
FIG. 34 is a schematic representation of an example of an electrical ETM extending through a stud.
Figure 35A:
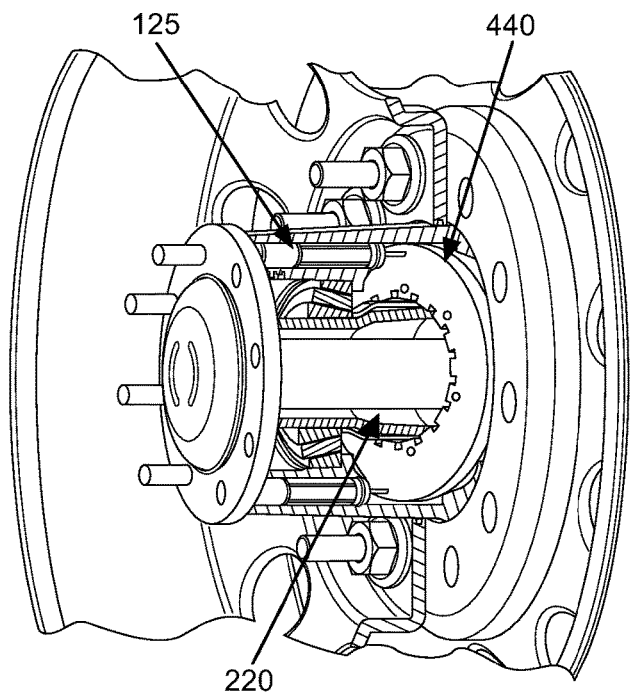
FIGS. 35A-35D are sectional views of an example of the third variation of the inflation system.
Figure 35B:
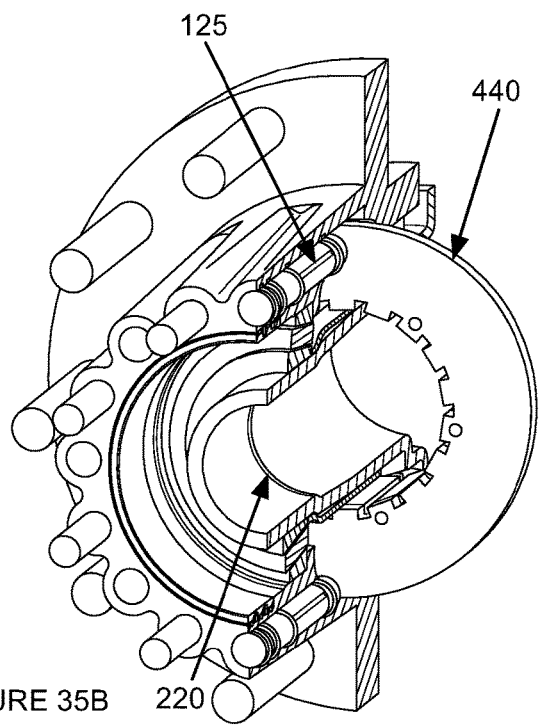
Figure 35C:
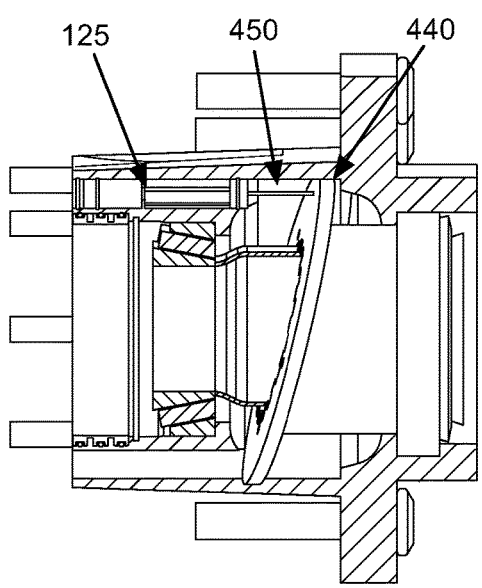
Figure 35D:
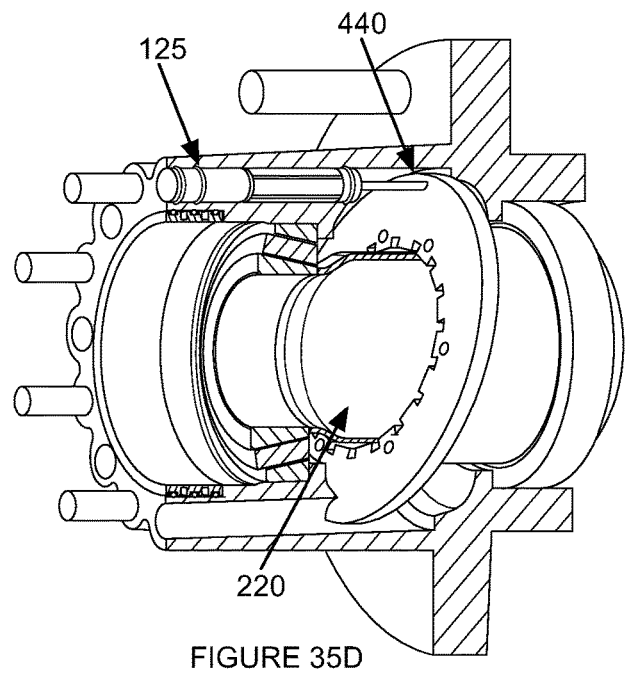
Figure 36:
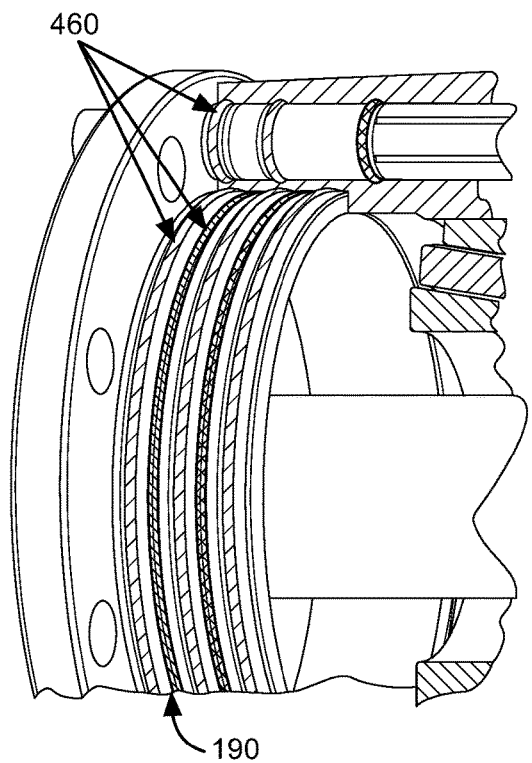
FIGS. 36 and 37 are isometric and cutaway views of examples of fluid connections.
Figure 37:
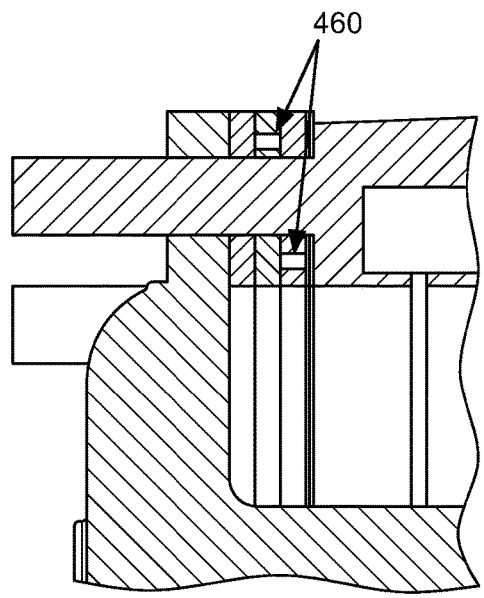
Figure 40:
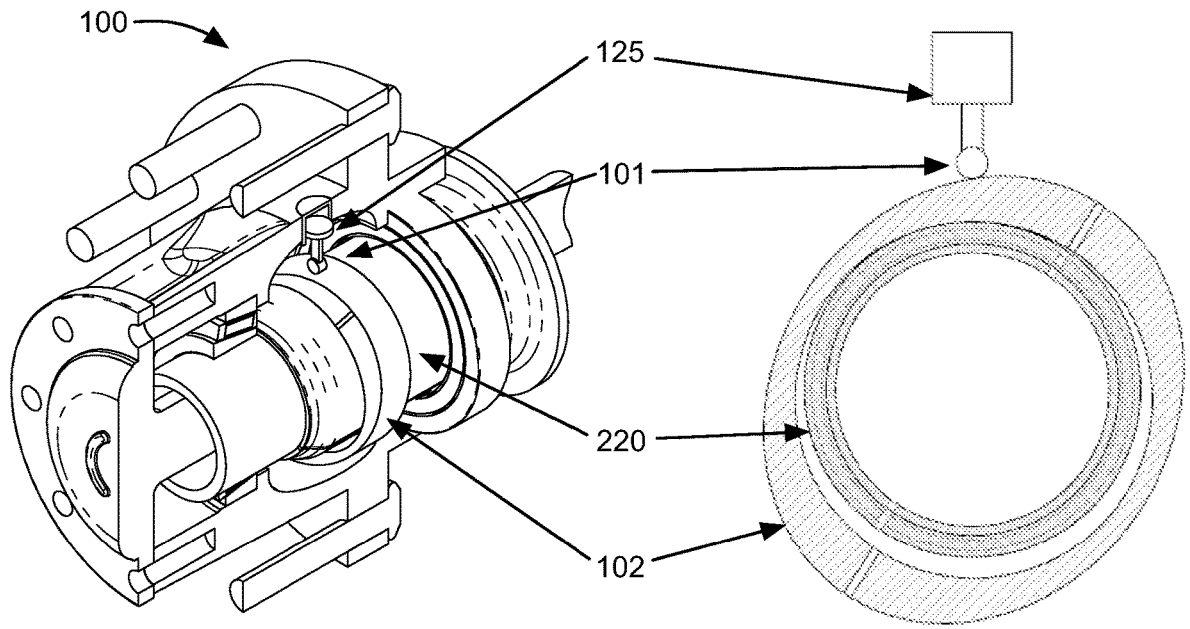
FIG. 40 is a sectional view of an example of an inflation system with a floating cam.
Figure 41:
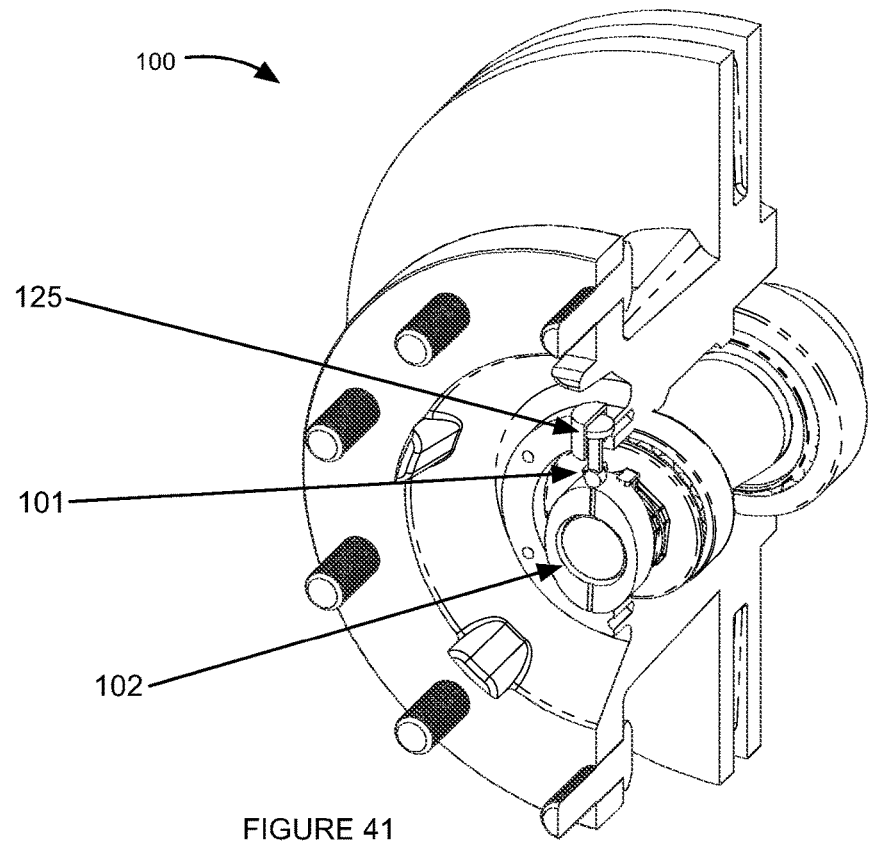
FIG. 41 is an isometric view of an example of an inflation system with a floating cam.

The inflator can optionally include an energy transmission mechanism (ETM), which functions to connect and/or transmit energy from the PPA to the inflator when the inflator is not collocated with the PPA (e.g., when the PPA is arranged within the hub interior, and the inflator is arranged exterior the hub). Examples of the energy transmission mechanism include a drive shaft, a belt drive, wires, a rotary junction (e.g., replacing one or more of the hub bearings), or any other suitable energy transmission mechanism. The ETM can extend through the shaft, a stud (example shown in FIGS. 32 and 34), between the stud bores, through a radial surface of the hub barrel, through the inflator housing, through the lubrication hole, or through any other suitable component. In variants where the PPA or inflator is arranged within the lubricant reservoir, the ETM can optionally include bearings and/or seals that fluidly seal the lubricant reservoir.

The inflator can optionally include one or more air inlets, which function to provide unpressurized air (e.g., working fluid) to the pump. The air inlet preferably fluidly connects the air source to the pump inlet, but can additionally or alternatively connect to any other suitable set of end points. The air source is preferably the ambient environment, but can additionally or alternatively be a fluid reservoir or any other suitable fluid source. The inflator (e.g., pump) preferably pressurizes the air using energy converted from the relative motion between the hub and the axle, but can additionally or alternatively convert pressurized air using electricity or any other suitable energy.

The air inlet is preferably collocated with the pump, but can additionally or alternatively be arranged distal the pump. The air inlet is preferably defined by the inflator housing, but can additionally or alternatively be fluidly connected to the air source by a fluid manifold. The fluid manifold can be defined by hub components, inflator components (e.g. the housing), tubing, or by any other suitable component. The air inlet can optionally include valves (e.g., one-way valves, passive valves, active valves, etc.), membranes (e.g., water-impermeable membranes, water-selective membranes), filters, or any other suitable component.

The inflator can optionally include one or more air outlets, which function to fluidly connect the pump outlet to the tire and to provide pressurized air between (e.g., to and/or from) the pump and the tire. The air outlet can extend through the lubricant hole, through a new radial or axial access hole, through tubing routed to the tire and connector, or through any other suitable fluid manifold. The air outlet is preferably static relative to the inflator housing, but can additionally or alternatively rotate relative to the inflator housing (e.g. include a rotary fluid connection, etc.).

The inflator can optionally include a generator, a battery or power storage, telematics, a control system, filters (e.g., intake and/or exhaust filters or water handling mechanisms), and/or any other suitable component. These components can be housed in the inflator, or housed in separate modules that are connected to the inflator.

The power pickup assembly (PPA) of the inflation system functions to harvest energy from relative motion (e.g. relative rotation) between the axle and hub (e.g., between the stationary and rotary hub components, between the axle and inflator, etc.). The PPA can be positioned in any appropriate location.

The PPA can be arranged at the wheel end (e.g., at the outer end of the hub), within the hub body, along the hub exterior (e.g., along an axial portion of the hub), at the hub interior, or at any suitable location. The PPA is preferably positioned between the inner and outer bearings and/or circumferentially around the bearing spacer, but can additionally or alternately be inboard of the inner bearing, outboard of the outer bearing, circumferentially around the inboard and/or the outboard bearing, and/or otherwise positioned in any appropriate axial and/or radial position relative to the axis of rotation. In a first variation, the PPA harvests energy from relative motion between the spacer nut (or lock ring) and the hub barrel (or wheel). In a second variation, the PPA harvests energy from relative motion between the bearing spacer and the hub barrel (or inflator, statically mounted to the hub barrel). In a third variation, the PPA harvests energy from relative motion between the bearing cone and the bearing race. However, the PPA can harvest energy from relative motion between any other suitable set of components.

Each inflation system can include one or more PPAs. Each hub, wheel, or wheel end can include one or more PPAs.

The PPA can be collocated with the inflator or be arranged distal the inflator. When the PPA is collocated with the inflator, the PPA can be adjacent or integrated with the inflator (e.g. wherein the hub or axle component includes the first power pickup component and the inflator includes the corresponding or companion power pickup component).

When the PPA is arranged distal the inflator (e.g. wherein the inflator is separated from the power pickup assembly by the hub barrel or other component), the system can additionally or alternatively include an ETM which functions to transmit harvested motion or energy for the power pickup assembly location to the inflator location. The ETM can include a linear drive, a belt drive, gearing, a piston, wires, or any other suitable energy transmission mechanism. In one example, the ETM can be routed through the lubrication hole, the drive studs, or any other suitable component from the hub barrel interior to the hub barrel exterior.

Figure 2:
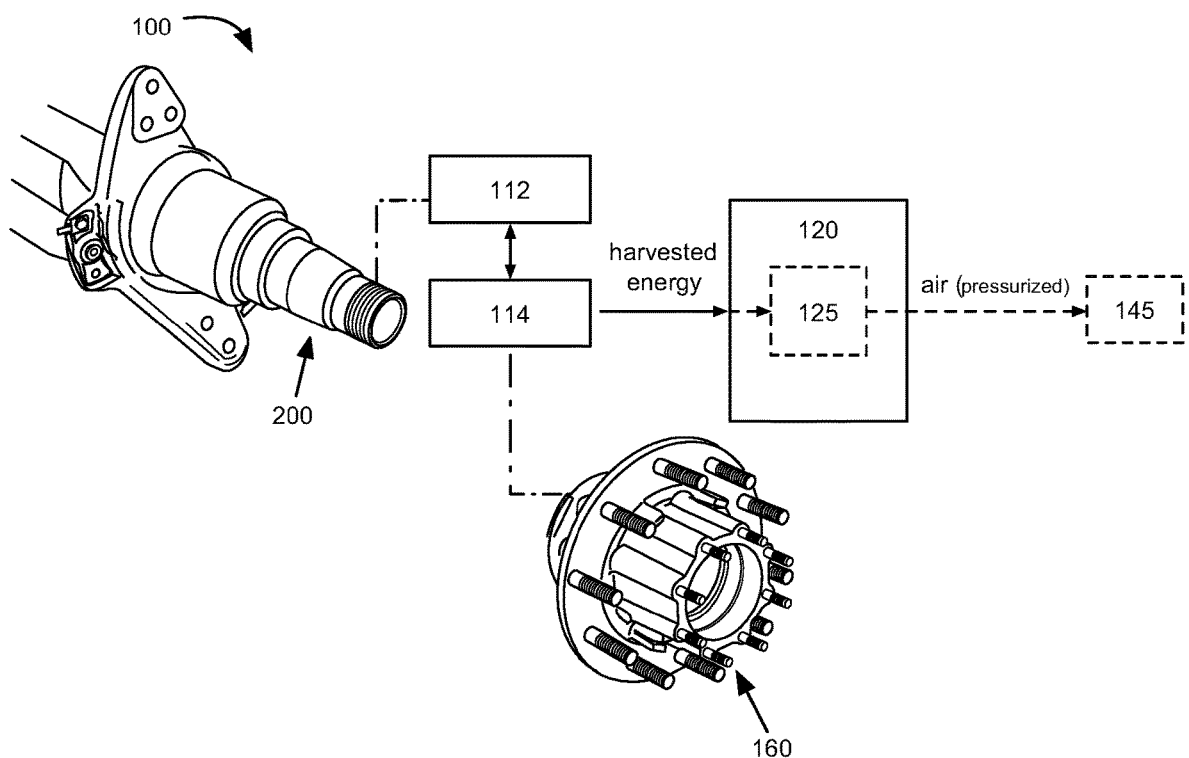
FIG. 2 is a schematic representation of a variant of the inflation system, mounted to an example wheel end.

The PPA can include a static component and a rotary component (example shown in FIG. 2). The static component functions as an input component, and is preferably statically mounted relative to the axle (e.g., directly mounted to the axle or mounted to an intermediate component that is mounted to the axle), but can alternatively be mounted to the hub. The rotary component functions as an output component, and is preferably statically mounted relative to the hub (e.g., directly mounted to the hub or mounted to an intermediate component that is mounted to the hub), but can alternatively be mounted to the hub. However, the PPA can include any suitable set of components.

Examples of the input component include: toothed gears (e.g., external gears; input gear; drive gear); toothed collars or flange edges; collars with an array of windings, armatures, permanent magnets, and/or ferrous elements (e.g., ferrous teeth) arranged along the collar exterior diameter; and/or any other suitable component. Examples of gears that can be used include: spur gears, helical gears, worm gears, bevel gears, or any other suitable gear.

Examples of the output component include: toothed gears (e.g., external gears; internal gears; driven gear; complimentary gears to the input gears); annular collars with an array of windings, armatures, permanent magnets, and/or ferrous elements (e.g., ferrous teeth) along the collar interior diameter; and/or any other suitable component.

The PPA can be mechanical (e.g., form a gear train), electrical (e.g., be an electrical generator), a combination thereof, or be otherwise configured.

Figure 4:
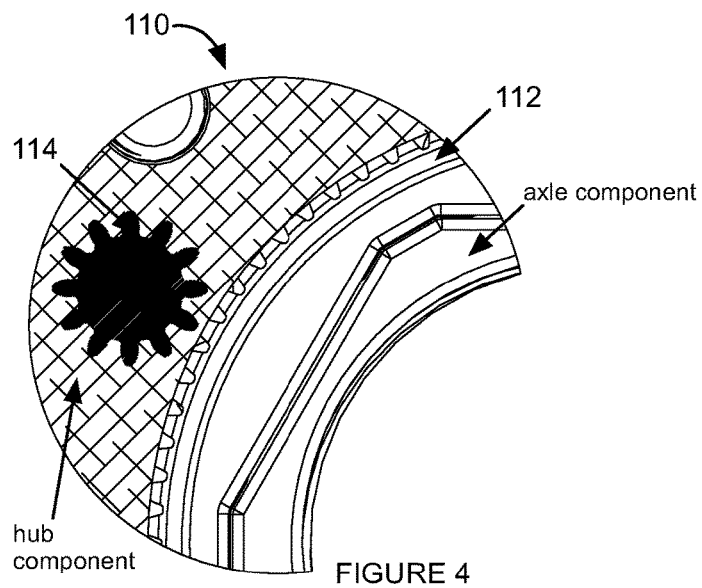
FIG. 4 is a schematic representation of an example of a mechanical variation of the power pickup assembly.

In a first variation, the PPA is a mechanical PPA (example shown in FIG. 4). In this variation, the input component includes an input gear or drive gear, and the output component includes an output gear or driven gear (e.g., pinion). Both gears are preferably external gears, but each gear can alternatively be an internal gear. The gear ratio between the input and output gears can be: between 5:1 and 50:1, 10:1 and 30:1, be 13:1, or be any suitable gear ratio. The PPA is preferably a direct drive but can additionally or alternatively be an indirect drive. The PPA can include one or more bearing surfaces. Bearing surfaces (e.g., wear surfaces) can be a region of contact between the component defining the respective bearing surface and a secondary component. For example, the input component and output component can each define a bearing surface. In another example, a PPA component and a non-PPA component (e.g., a vehicle component, the selective engagement mechanism, the energy transmission mechanism, the inflator, etc.) can each define a bearing surface. Bearing surface(s) can be lubricated (e.g., within the lubricant cavity, by supplied lubricant), un-lubricated, be self-lubricating (e.g., graphite impregnated, Delrin, Nylon, Teflon, etc.), or otherwise lubricated. Bearing surfaces can have no-slip conditions or slip conditions in one or more modes of operation. In a first example, the bearing surface can be statically retained against other component (e.g., exhibit a no-slip condition) in the pumping mode and translate relative to another component (e.g., exhibit a slip condition) in the non-pumping mode (e.g., reference surface). In a second example, the bearing surface has a no slip condition in the non-pumping mode and a slip condition in the pumping mode. In a third example, the bearing surface has the same surface condition in both the pumping and non-pumping mode (e.g., bearing surface of a cam follower, the bearing surface of the inner/outer bearing exterior, etc.). In a fourth example, components (e.g., a cam follower) are only in contact with a given bearing surface in each mode of operation. In an illustrative example of the fourth example, the cam follower contacts a first bearing surface, such as a follower surface, during pumping mode; and contacts a second bearing surface, such as a stopper surface, during non-pumping mode.

Figure 42:
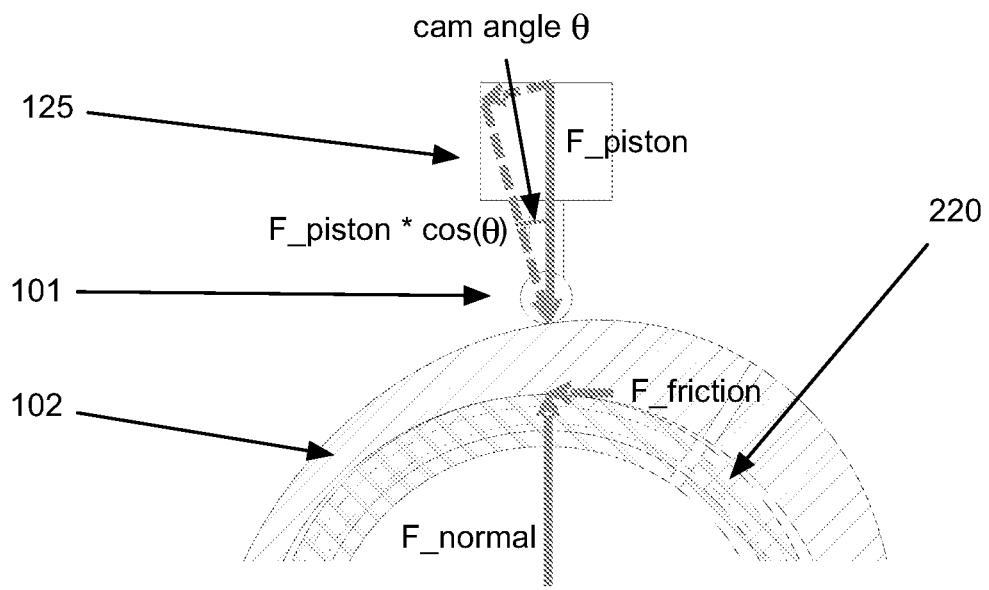
FIG. 42 is a diagram of the cam angle for an example of the inflation system with a floating cam.

The PPA can generate a torque about the axis of rotation (e.g., exerted on the axle spindle, bearing spacer, etc.; output by the PPA on the output component; etc.). The torque can be exerted by or on the axle spindle, the input component, the output component, the bearing spacer, an axle component, the hub body, the pump (or a component of the pump), and/or any other suitable component(s). The torque can be generated: from friction at one or more bearing surfaces, from mass imbalance, from relative motion between components, and/or from another source. In a first example, torque is generated by an eccentric mass rotating relative to the wheel or hub. In a second example, the torque is results from a frictional force associated with a non-zero cam angle (e.g., example shown in FIG. 42). In a third example, the torque is collectively generated by friction and an eccentric mass. However, the torque can be otherwise generated. The torque preferably opposes the direction of rotation of the wheel about the axis of rotation, however can be in the same direction as the rotation, or can be negligible. The torque can be: 0 in-oz, 5 in-oz, 10 in-oz, 25 in-oz, 35 in-oz, 50 in-oz, 100 in-oz, less than 50 in-oz, more than 50 in-oz, and/or any appropriate torque.

The axle component can be the axle itself, be the bearing spacer, be the spindle nut, or be any other suitable component statically mounted to the axle. The hub component can be the hub barrel (e.g., the interior of the lubricant reservoir), the hub body, the hub face, the hubcap, or be any other suitable hub component.

In the first variation of the PPA, relative rotation between the hub and the axle rotates the rotor and generates electricity at the starter electrically connected to the pump. In a second variation of the PPA, relative rotation between the axle and the hub rotates the output gear, which is mechanically connected to the pump e.g. via a rotary to linear converter.

Figure 5A:
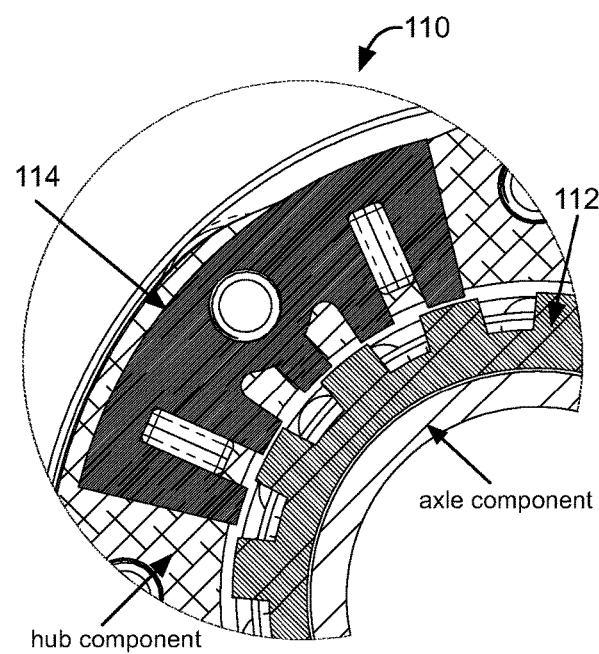
FIGS. 5A and 6 are sectional and isometric views of an electrical generator variation of the power pickup assembly.
Figure 6:
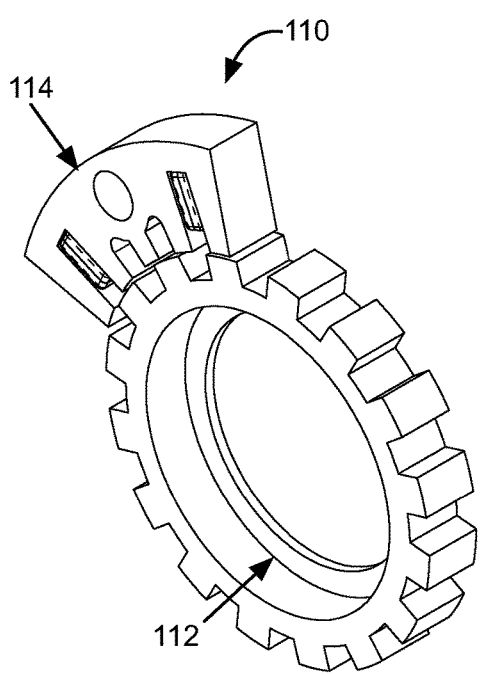
Figure 8:
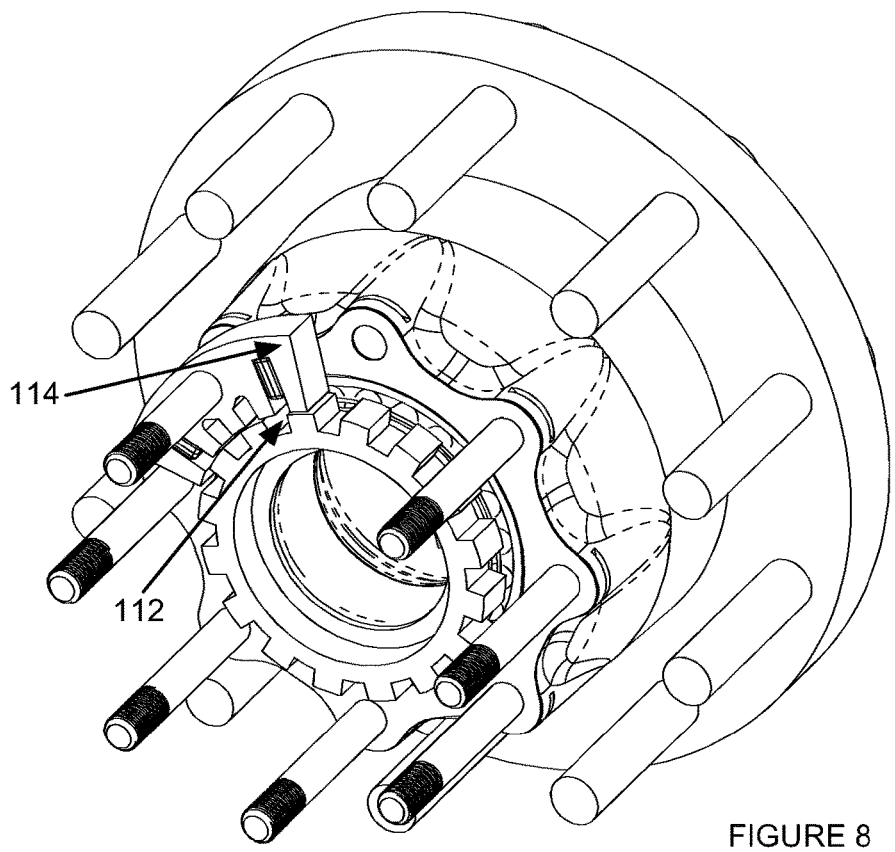
FIG. 8 is a schematic representation of an example of an electrical generator variation of the power pickup assembly.

In a second variation, the PPA forms a generator (example shown in FIGS. 5, 6, and 8). Examples of generators that can be formed include DC generators (e.g., homopolar generator, magnetohydrodynamic generators, etc.), AC generators (e.g., (induction generators, linear electric generators, variable-speed constant-frequency generators, flux switching generators), or any other suitable generators. The PPA can be brushed or brushless.

In this variation, the input component of the PPA includes a stator, and the output component of the PPA includes a rotor. The rotor preferably includes the windings (e.g., field windings) and/or armatures, but can additionally or alternatively include the ferrous elements (e.g., ferrous teeth, permanent magnet array, field magnets, etc.). The stator preferably includes the ferrous elements (e.g., ferrous teeth, permanent magnet array, field magnets, etc.), but can additionally or alternatively include the windings (e.g., field windings) and/or armatures. In one example, the input component can be the permanent magnet of the lubrication reservoir (e.g., that collects metallic chips within the lubrication reservoir), wherein the output component can be windings statically mounted to the static component (e.g., statically mounted relative to the axle, such as mounted to the bearing spacer). However, the windings and ferrous elements can be otherwise arranged.

In this variant, the PPA can optionally include power conditioning and/or storage components that function to condition and store the generated electricity. The power conditioning and/or storage components can be located within the inflator, within the lubricant reservoir, external to hub barrel, or in any other suitable location. The power conditioning and/or storage components can include capacitors, batteries, or any other suitable energy storage system.

Figure 7:
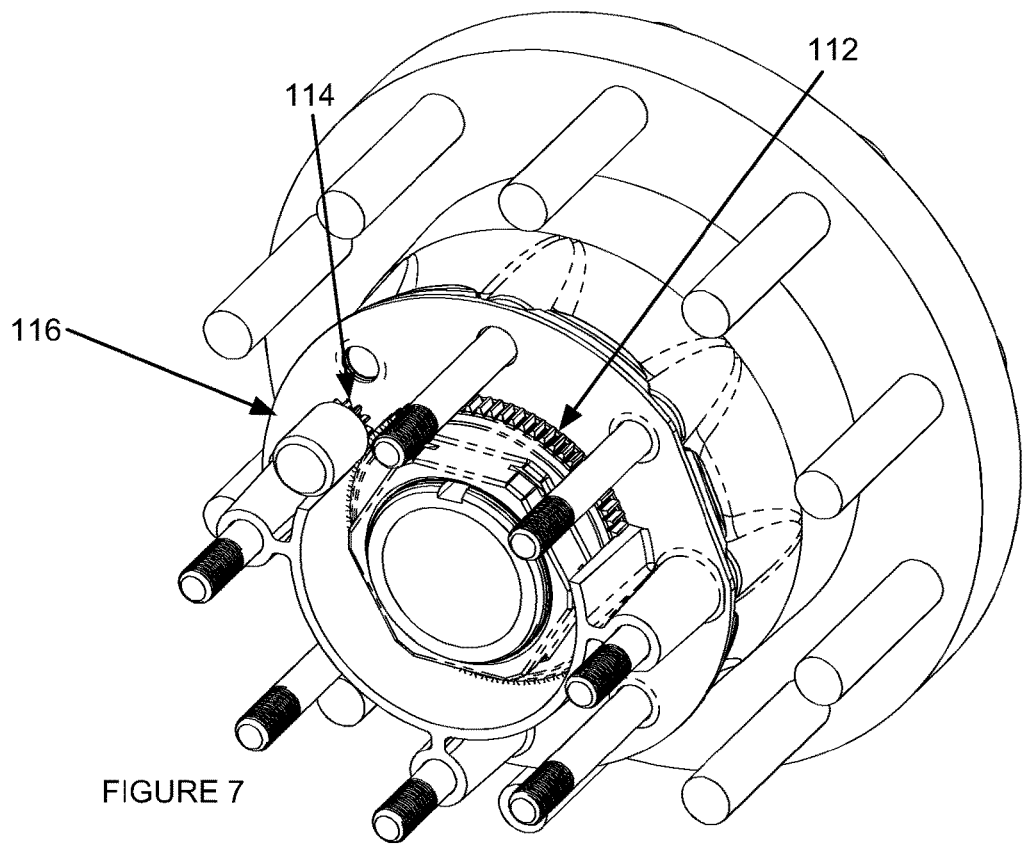
FIG. 7 is a schematic representation of an example of a hybridized power pickup assembly.

In a third variation, the PPA forms a hybridized system (example shown in FIG. 7). In this variation, the PPA includes: a secondary output component 116 (e.g., electrical generator) with a stator statically mounted relative to the hub and a rotor; an input gear statically mounted relative to the axle; and an output gear connecting the secondary output component (e.g., electrical generator's rotor) to the input gear. Hub rotation about the axle rotates the secondary output component (e.g., electrical generator) about the axle's axis. This causes the output gear to rotate about the input gear, thereby actuating the secondary output component (e.g., rotating the rotor of the electrical generator).

In a fourth variation, the input component includes a plate 440 mounted at a predetermined angle to the axle axis, and the output component can include an idler arm 450. The predetermined angle is preferably non-perpendicular to the angle axis (e.g., inclined at 30°, 60°, 90°, etc.), but can additionally or alternatively be perpendicular to the axle axis. The plate can be statically angled (e.g., manufactured as a singular piece with the collar mounting the plate to the axle or bearing spacer), removably angled (e.g., include a plate biased against a bearing spacer collar with an angled end, wherein the angled collar end defines the plate angle), or otherwise retained in the angled position. The plate can have a flat face or a profiled face. When the plate has a profiled face, idler arm arcuate translation across the plate face axially actuates (e.g., reciprocates) the idler arm; have a profiled perimeter, wherein idler arm movement along the plate perimeter translates the idler arm radially or axially. Examples of the plate can include a swash plate, a wobble plate, a cam, or any other suitable plate. Examples of the idler arm include: a wheel, a pin, a sliding contact, a gear, a hook or groove (e.g., that engages the plate edge, or any other suitable component.

In a fifth variation, the input component includes a cam mounted to the axle (e.g., to the axle spindle). The cam can include an asymmetric arcuate surface and/or have an axis of rotation offset from the cam center. The cam can be statically mounted relative to the axle component, selectively retained relative to the axle component (e.g., selectively retained relative to the axle spindle by a magnet, wherein the cam is a magnetic cam; selectively retained relative to the axle spindle by a pawl or other mechanical engagement system; selectively retained relative to the axle spindle by the selective engagement mechanism; selectively retained relative to the axle component by friction, such as between an inner cam surface and an outer surface of the axle component; etc.), and/or otherwise mounted relative to the axle. In this variation, the pump can be mounted to the hub and be arranged radially, such that the pump piston can actuate radially (e.g., mate with the cam's arcuate surface, mate with the follower surface). However, the pump can be otherwise arranged. In an example of pump operation, in the pumping mode, a magnet or other locking mechanism mounted to the axle (e.g., axle spindle) can selectively retain the cam in a predetermined angular position relative to the axle (e.g., axle spindle), wherein pump rotation about the cam's arcuate surface drives pump actuation. The variation can be placed into the non-pumping mode by releasing the cam from the retained position, such as by: removing power to the magnet, physically actuating the magnet (e.g., axially away from the cam), using a clutch mechanism that forces the cam to rotate relative to the spindle, by disengaging the cam follower from the cam, by releasing or reducing the force applied by the secondary actuator on the cam, or otherwise placed into the non-pumping mode.

Figure 51A:
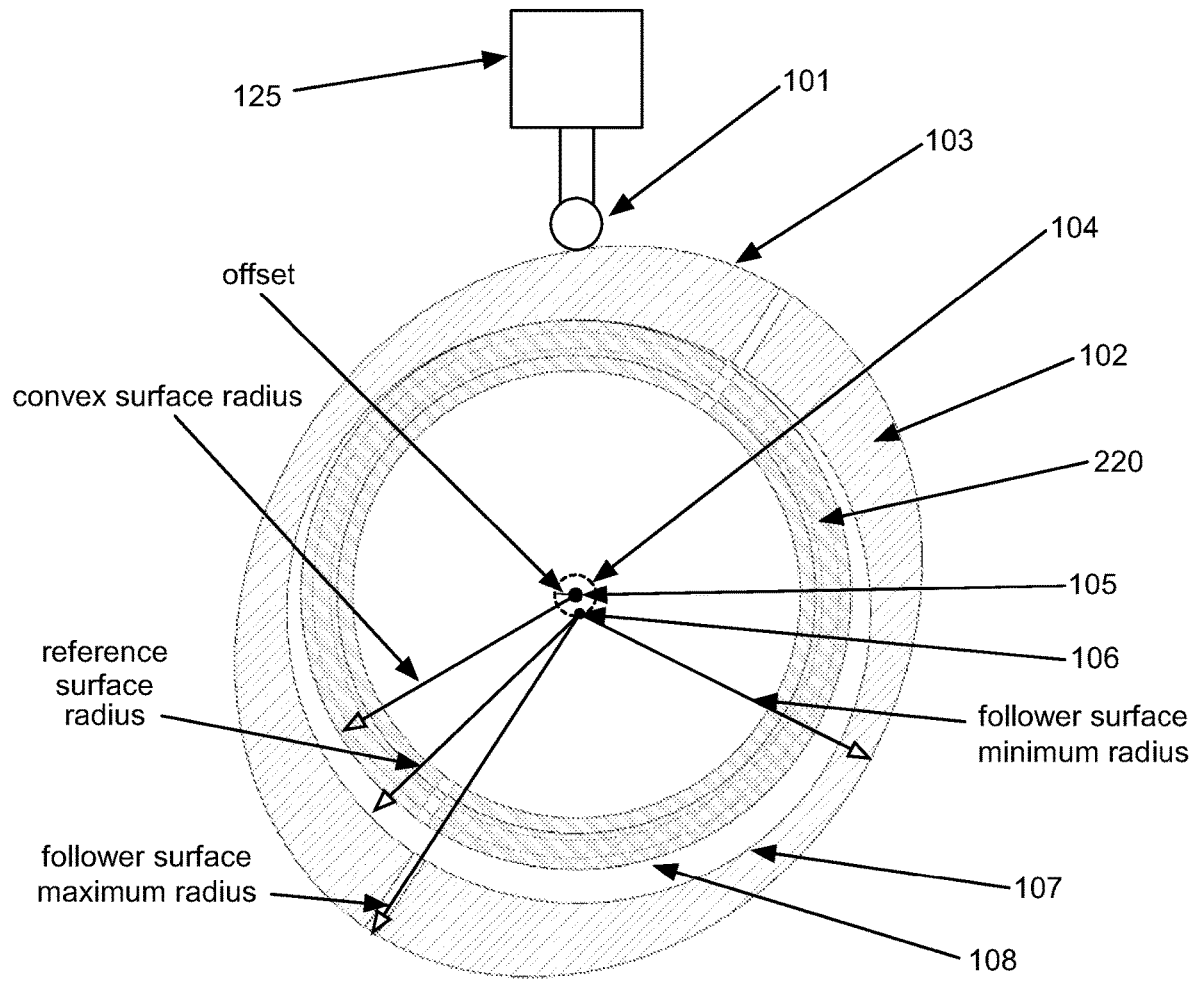
FIG. 51A is a diagram of an example of a floating cam.
Figure 51B:
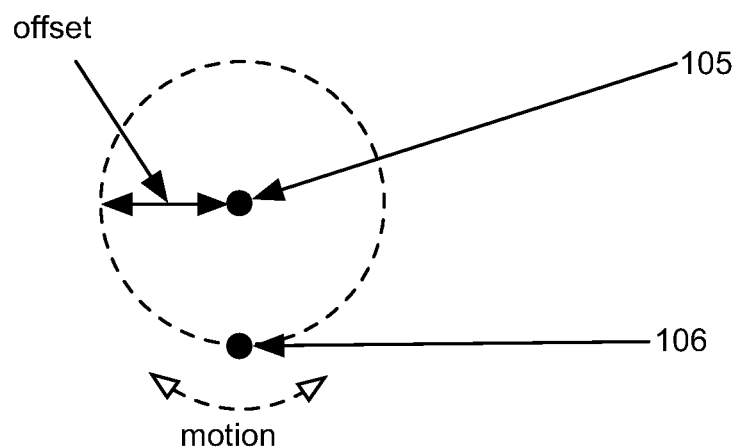
FIG. 51B is a diagram of the motion of a cam axis about the axis of rotation.

The floating cam preferably defines a cam axis 106. The cam axis can be defined relative to the geometry or motion (translational and/or rotational) of: one or more surfaces of the cam, cam volume, cam mass, one or more faces, one or more holes, the cam dimensions or geometry. Additionally or alternatively, the cam axis can be defined relative to any appropriate feature and/or in any other suitable manner. The cam axis preferably extends along the cam longitudinal axis (e.g., axial axis), but can additionally or alternatively extend radially or in any other suitable direction. The cam axis is preferably defined by the geometric center of a surface (e.g., reference surface, follower surface) or aperture, but can additionally or alternately be defined by a center of mass. Alternatively, the cam axis can be defined by any point on the interior or exterior of the cam with any appropriate relationship to the cam. Examples of the cam axis include: a geometric central axis (e.g., extending through center of the inner cam diameter, through the center of the outer cam diameter, etc.), a mass central axis (e.g., extending through the center of the cam mass), a rotational central axis (e.g., extending through the cam's axis of rotation), and/or any other suitable cam axis. Preferably, the cam axis is parallel to the (hub or axle's) axis of rotation, but can additionally or alternately be skewed (e.g., angled, perpendicular, etc.) relative to the axis of rotation. Preferably, the cam axis is offset from the axis of rotation, but can additionally or alternatively intersect the axis of rotation, be collinear (e.g., coaxial) with the axis of rotation. In a specific embodiment, the cam axis is a reference axis parallel to the axis of rotation (and offset from the axis of rotation) passing through the geometric center (point or line) of the reference surface of the floating cam. In variants where the cam axis is offset from the axis of rotation 105, the cam axis can trace a cam axis path 104 (example shown in FIGS. 51A and 51B). The cam axis path 104 can encircle the axis of rotation, intersect the axis of rotation, or be otherwise related to the axis of rotation. The cam axis path 104 can be: circular, roulette (e.g., cycloid, epicycloid, hypocycloid, spirograph, trochoid, involute, epitrochoid, etc.), harmonic, limacon, leminiscate, cardiod, and/or have any other suitable shape.

The floating cam preferably defines a cam axis 106. The cam axis can be defined relative to the geometry or motion (translational and/or rotational) of: one or more surfaces of the cam, cam volume, cam mass, one or more faces, one or more holes, the cam dimensions or geometry. Additionally or alternatively, the cam axis can be defined relative to any appropriate feature and/or in any other suitable manner. The cam axis preferably extends along the cam longitudinal axis (e.g., axial axis), but can additionally or alternatively extend radially or in any other suitable direction. The cam axis is preferably defined by the geometric center of a surface (e.g., reference surface, follower surface) or aperture, but can additionally or alternately be defined by a center of mass. Alternatively, the cam axis can be defined by any point on the interior or exterior of the cam with any appropriate relationship to the cam. Examples of the cam axis include: a geometric central axis (e.g., extending through center of the inner cam diameter, through the center of the outer cam diameter, etc.), a mass central axis (e.g., extending through the center of the cam mass), a rotational central axis (e.g., extending through the cam's axis of rotation), and/or any other suitable cam axis. Preferably, the cam axis is parallel to the (hub or axle's) axis of rotation, but can additionally or alternately be skewed (e.g., angled, perpendicular, etc.) relative to the axis of rotation. Preferably, the cam axis is offset from the axis of rotation, but can additionally or alternatively intersect the axis of rotation, be collinear (e.g., coaxial) with the axis of rotation. In a specific embodiment, the cam axis is a reference axis parallel to the axis of rotation (and offset from the axis of rotation) passing through the geometric center (point or line) of the reference surface of the floating cam. In variants where the cam axis is offset from the axis of rotation, the cam axis can trace a cam axis path 104 (example shown in FIGS. 51A and 51B). The cam axis path 104 can encircle the axis of rotation, intersect the axis of rotation, or be otherwise related to the axis of rotation. The cam axis path 104 can be: circular, roulette (e.g., cycloid, epicycloid, hypocycloid, spirograph, trochoid, involute, epitrochoid, etc.), harmonic, limacon, leminiscate, cardiod, and/or have any other suitable shape.

The floating cam can define one or more bearing surfaces (e.g., wear surfaces, contact surfaces) that function to engage with other components. The bearing surfaces are preferably continuous, but can additionally or alternatively be discontinuous. Different sections of each bearing surface is preferably of the same material, but can additionally or alternatively be made of different materials with different material properties (e.g., different friction coefficients, hardness, lubrication characteristics, etc.). Examples of the floating cam bearing surfaces can include: a reference surface and a follower surface.

The floating cam preferably includes a reference surface 107 (e.g., an inner surface) which functions to engage the convex surface 108 (axle component) in one or more modes of operation. The reference surface can have any appropriate geometry. The reference surface is preferably a concave surface of the floating cam (e.g., the inner arcuate surface of the floating cam), but can be otherwise configured. The reference surface is preferably axially constant (e.g., does not vary in the axial direction), but can additionally or alternatively vary in the axial direction (e.g., taper inward, taper outward, etc.). The cross section of the reference surface (e.g., in a plane perpendicular the axis of rotation) can be: circular, ovular, mirror the convex surface 108, and/or otherwise configured. For a cross section orthogonal to the axis of rotation, reference surface preferably has an inner radius (e.g., largest inscribing circle in a cross section, smallest circumscribing circle, average of inscribing and circumscribing circles, average radius of curvature, radius of curvature, etc.) which is larger than the outer radius of the convex surface (e.g., by the same or different measure of radius). The reference surface's inner radius is preferably larger than the convex surface's outer radius by a predetermined threshold (e.g., 1 mm, 2 mm, 10 mm, 1%, 2%, 10%, 30%, etc.), such that the reference surface is separated from the convex surface by a gap (e.g., the reference surface is coupled to the convex surface by a loose running, free running, easy running, close running, or sliding fit), but can additionally or alternatively be equal to the inner radius, smaller than the inner radius, or otherwise related to the inner radius. The reference surface is preferably symmetric (e.g., relative to the cam axis, relative to the axis of rotation, circular, annular, circular triangle shaped, with one or more maximal radii, etc.), but can additionally or alternately be asymmetric (e.g., eccentric about the cam axis, eccentric relative to a follower surface, etc.). The reference surface can be magnetic (e.g., on the radial interior) or non-magnetic.

Figure 43:
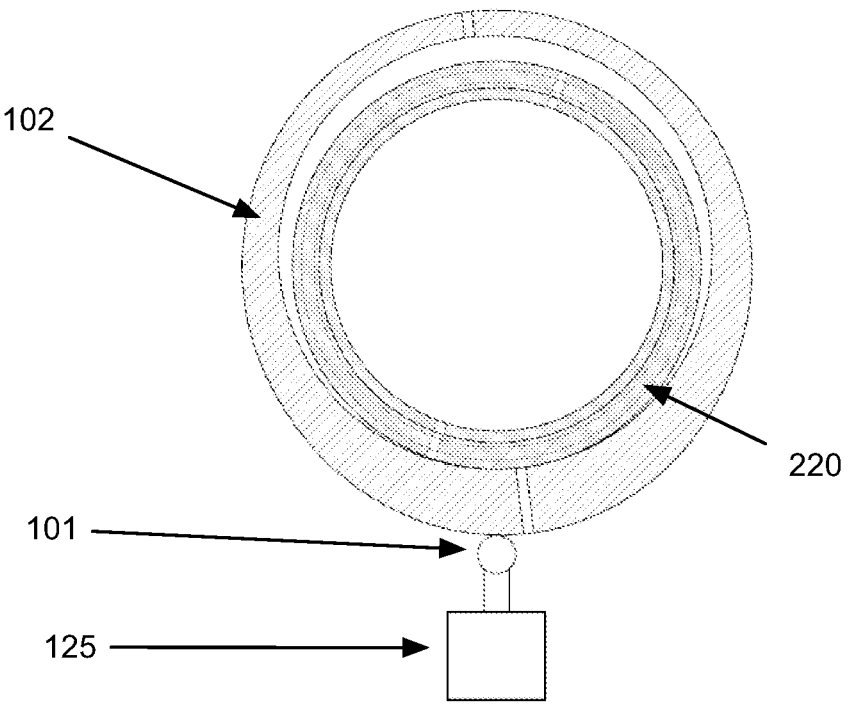
FIG. 43 is a diagram of an example of an inflation system with a floating cam.

The floating cam preferably includes a follower surface 103 (e.g., an exterior surface) which functions to transmit energy from the floating cam (input component of the PPA) to the output component of the PPA (cam follower) in one or more modes of operation. The follower surface can have any appropriate orientation. The follower surface is preferably arranged radially outward of the reference surface, relative to the axis of rotation, but can have any appropriate orientation. The follower surface is preferably a convex surface (e.g., outer arcuate surface of the floating cam), but can additionally or alternately be a planar surface, a concave surface, and/or an internal surface. The follower surface can be a continuous surface or a discontinuous surface (e.g., have a gap). The follower surface can be a single surface or a plurality of surfaces. In a specific example, the follower surface includes a first surface which is concave and a second surface which is convex, wherein the convex surface is positioned radially inward of the concave surface, the cam follower selectively biased to follow the first surface in a first mode of operation and the second surface in a second mode of operation. In a different specific example, a plurality of convex surfaces of different radii are located at different axial positions along the cam axis. The follower surface can be magnetic (e.g., on the radial interior, on the radial exterior, etc.) or non-magnetic. The follower surface can have any appropriate geometry. The follower surface can be symmetric (e.g., reflectional symmetry and/or rotational symmetry relative to the cam axis or the axis of rotation, etc.), but can additionally or alternately be asymmetric (e.g., eccentric about the cam axis, eccentric relative to a follower surface, etc.). The follower surface can be circular, obloid, ellipsoid, triangular (e.g., a Reuleaux triangle), lobed, arcuate (without dimples, with dimples, radially symmetric neglecting dimples, etc.), or otherwise configured. In a specific example, the follower surface includes an arcuate surface which defines the path of the cam follower relative to the cam. In a variant of the specific example, the cam is dimpled (e.g., includes concave divots in the follower surface, which can have the same or different radius or chord length as the cam follower), such that the cam follower passes over the dimple(s) in the pumping mode. In this variant, the follower surface can be defined to include the dimple(s), define a plurality of follower surfaces separated by the dimples, define a single follower surface to include a theoretical section(s) spanning the dimple(s), and/ or otherwise suitably define the follower surface. The follower surface can have: no lobes (e.g., circular), one lobe (e.g., eccentric about cam axis, example shown in FIG. 43), 2 lobes (e.g., diametrically opposed), 3 lobes (e.g., circular triangle shape, fixed diameter, variable diameter, etc.), more than 3 lobes, and/or any other suitable number of lobes. The follower surface can define a constant and/or variable cam angle (example shown in FIG. 42). The cam angle (along with other factors influencing friction such as: normal force, material properties, surface finish, lubrication, etc.) determines the friction at the bearing surface between the reference surface and the convex surface (bearing spacer). At a designated point on the follower surface, the cam angle is the angle between a vector orthogonal to the cam surface at the designated point and a reference vector passing through the designated point (e.g., orthogonal to the reference surface, orthogonal to the bearing spacer, orthogonal to the axis of the reference surface, orthogonal to the axis of rotation of the tire, etc.). Preferably, the cam angle is set such that there is a no-slip condition at the bearing surface, is less than a threshold amount of slip at the bearing surface, and/or satisfy any other suitable slip or friction condition at the bearing surface. For frictional coefficient μ and cam angle θ, this will occur according to the relationship: μ>tan(θ). This calculation can include additional adjustments for forces resulting from mass eccentricity, opposing frictional force at the cam follower, a factor of safety, a margin of safety, and/or any other appropriate adjustments. The cam angle can be: can be less than 1°, 1°, 2°, 3°, 4°, 5°, 15°, 30, 1-5°, 5-15°, 15-30°, greater than 30°, and/or any appropriate angle. In a first example, the follower surface is an outer arcuate surface of the cam. In a second example, the follower surface is defined by an arcuate channel within the cam (e.g., arranged radially inward of the cam's outer arcuate surface), wherein the channel is of sufficient width and depth to allow the cam follower to be arranged radially inward of the follower surface (e.g., depth greater than or equal to the diameter of the cam follower). In the second example, the cam shaft extends radially outward from the cam follower to the pump (e.g., through a circumferential gap in the arcuate wall of the cam, through a circumferential gap in the exterior of the cam follower of greater width than the piston shaft). In a third example, the follower surface is arranged on a flange of the cam (e.g., on concave interior of the flange) with the cam follower arranged on radially inward of the flange.

The floating cam can have any appropriate mass distribution. The mass can be distributed uniformly by volume, non-uniformly by volume, uniformly about the cam axis, non-uniformly about the cam axis (and/or axis of rotation), balanced, unbalanced, and/or otherwise configured.

Figure 46A:
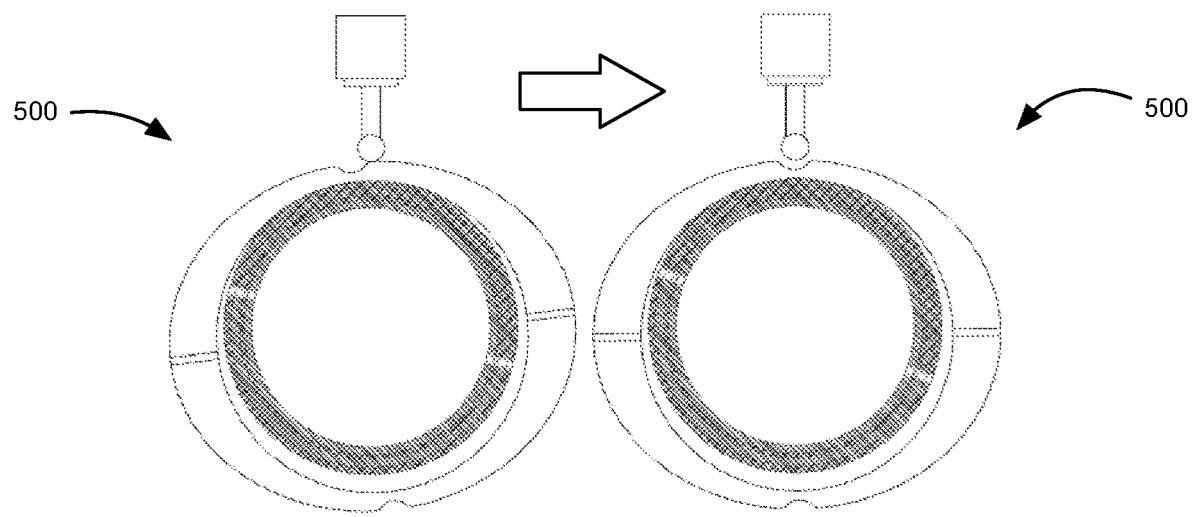
FIG. 46A is a diagram of an example of a two-lobed floating cam with dimples, where the cam follower passes over the dimples in the pumping mode.
Figure 46B:
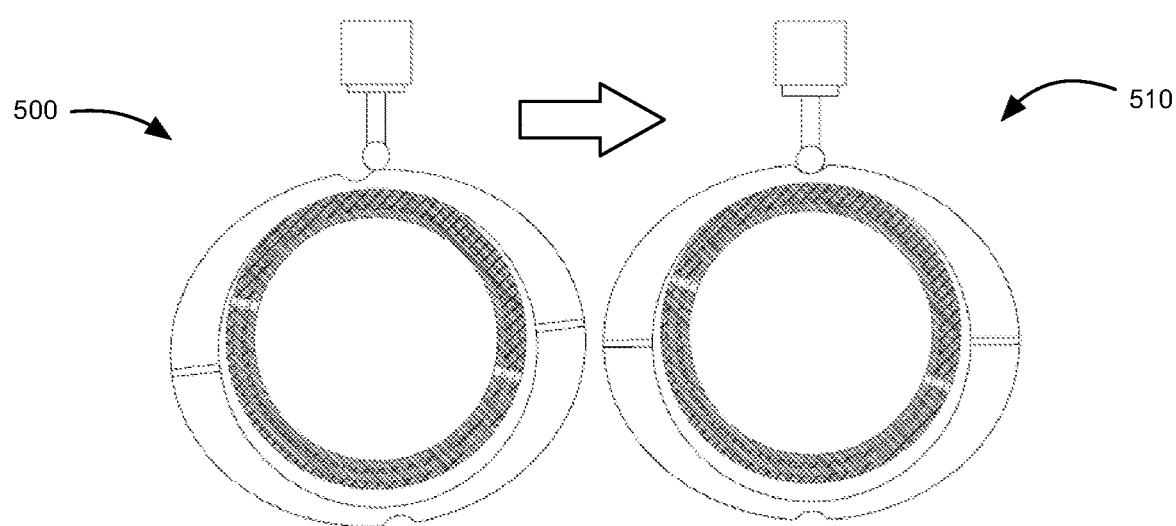
FIG. 46B is a diagram of an example of a two-lobed floating cam with dimples, where the cam follower engaged the dimple to transition the system from the pumping mode to the non-pumping mode.

The floating cam can engage the convex surface of an axle component (e.g., bearing spacer) in the pumping and/or non-pumping modes. In a first variant, the floating cam 'walks' around the convex surface (e.g., rotates around the convex surface at a different rate than the hub) during the pumping mode. Preferably, the angular frequency of the floating cam is less than the angular frequency of the wheel about the axis of rotation, but the angular frequency of the floating cam can also be the same or greater than the angular frequency of the hub. The relationship between the angular frequency of the floating cam ($\omega_{cam}$) and the angular frequency of the hub ($\omega_{hub}$) can be represented by:

$$\omega_{Cam} = \omega_{hub} \cdot \left(\frac{r_1}{r_2} - 1\right)$$

where $r_1$ is the reference surface radius and $r_2$ is the radius of the convex surface (e.g., bearing spacer), but can be otherwise represented or have any other suitable relationship. In a first example, the cam axis gyrates relative to the axis of rotation with $\omega_{cam}$. This motion is preferably a circular motion (e.g., for a cam axis defined through the geometric center of the reference surface), but can additionally or alternately be a wavy or harmonic circular motion (e.g., for cam axis defined through the geometric center of the follower surface). In the first variant, the bearing surface between the floating cam and the reference surface exhibits a no-slip condition during the pumping mode. In a second variant, the floating cam does not rotate relative to the hub body ($\omega_{cam}=\omega_{hub}$) in the non-pumping mode of operation. In a first example, the floating cam is mechanically retained (e.g., by the SEM, magnetically, by a dimple—an example is shown in FIGS. 46A-46B, static relative to the pump, etc.) relative to the hub body in the non-pumping mode. In a second example, the bearing surface between the floating cam and the reference surface exhibits a slip condition during the non-pumping mode. In a third example, the floating cam is statically retained relative to the bearing spacer (or other axle component) in the non-pumping mode (e.g., by a magnetic force, by a secondary actuator 109, etc.). In a fourth example, the floating cam freely rotates relative to the bearing spacer in the non-pumping mode (e.g., is retracted away from the bearing spacer; wherein a biasing mechanism that biases the floating cam against the spacer is released; etc.). However, the floating cam can be otherwise arranged in the pumping and non-pumping modes.

The inflation system can optionally include a selective engagement mechanism (SEM), which functions to selectively control pump operation between a pumping and non-pumping mode. Selective disengagement can reduce drag on the wheel when not pumping, increase the lifetime of the pump, and/or confer any suitable set of benefits. Alternatively, the pump can be continuously engaged with the PPA. However, the pump can be otherwise connected to the PPA. The inflation system can include one or more SEMs. Each SEM can be connected to one or more PPAs and/or pumps.

Figure 10:
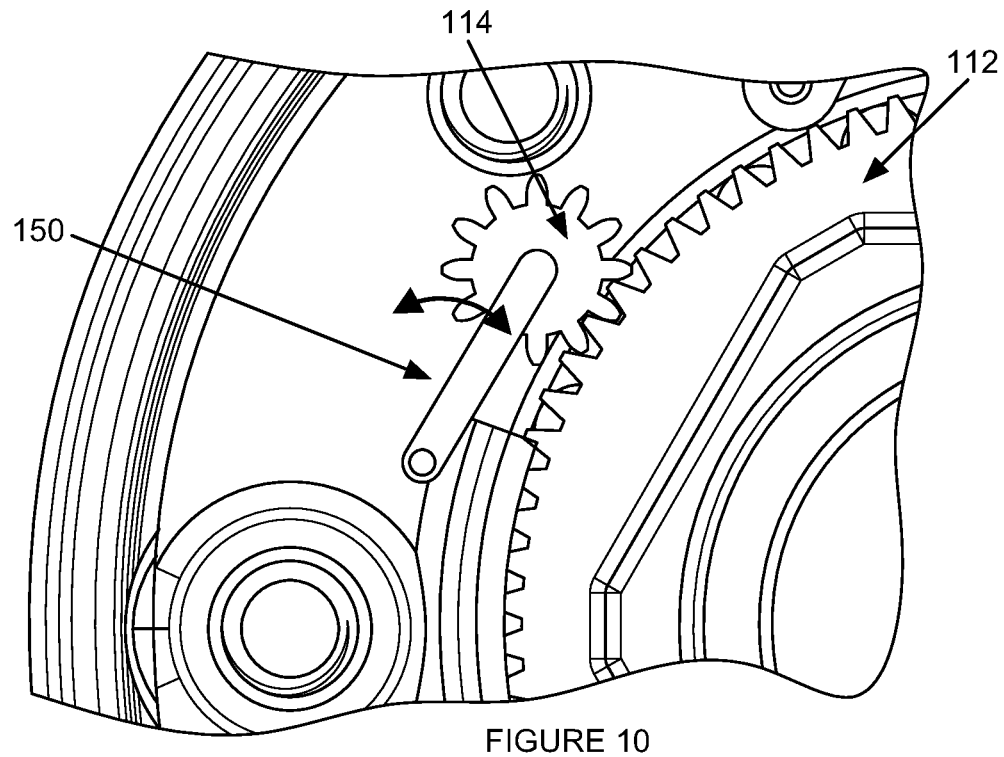
FIGS. 10 and 11 are schematic representations of a first and second example of selective engagement mechanisms, respectively.
Figure 11:
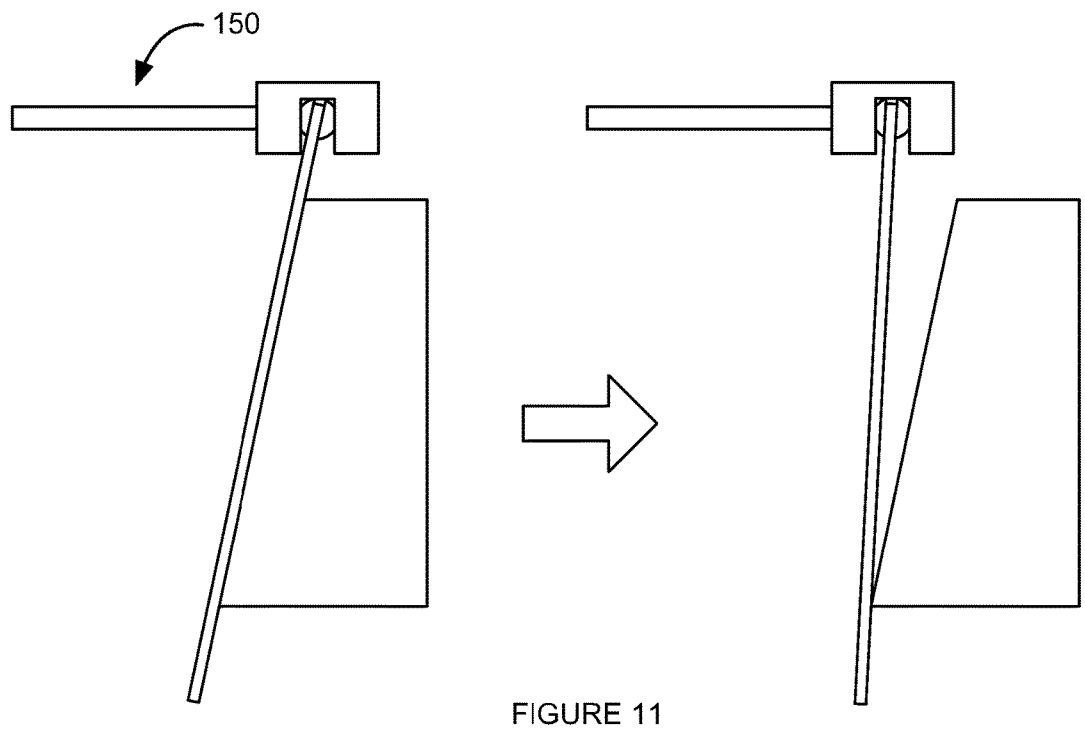
Figure 47:
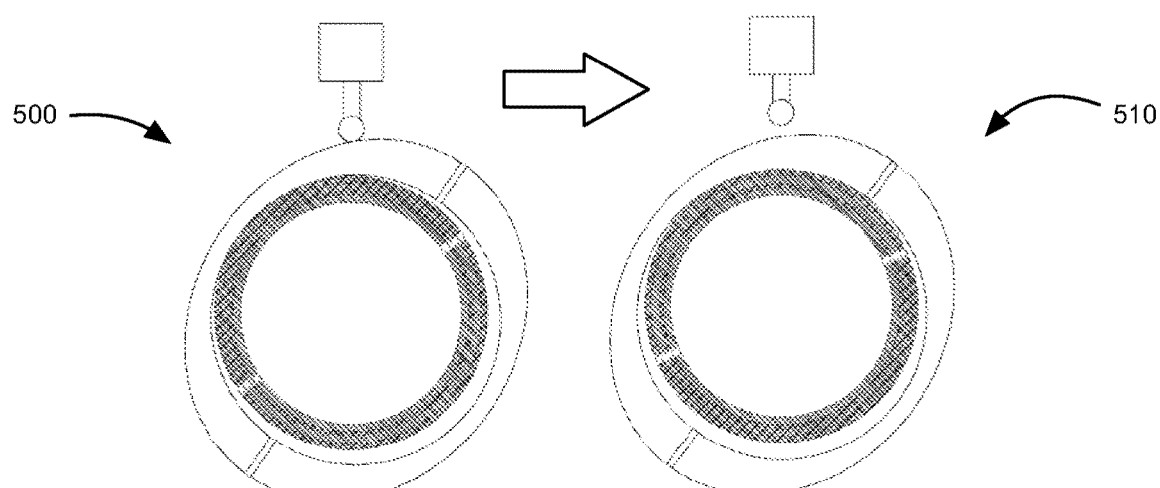
FIG. 47 is a diagram of an example of the selective engagement mechanism where a cam follower is spaced apart from the follower surface of a cam.
Figure 48A:
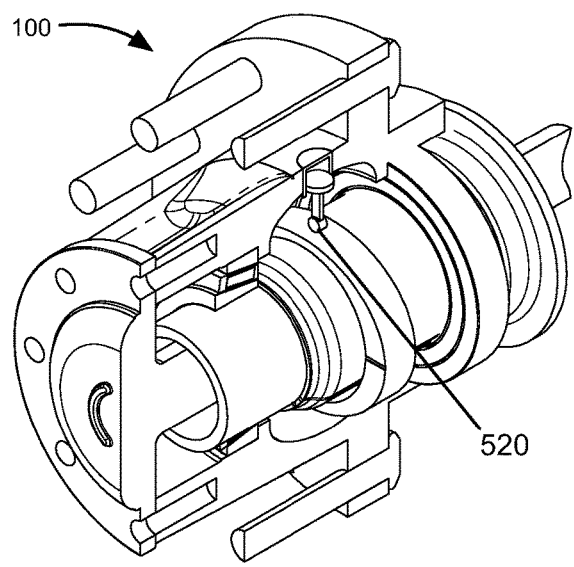
FIGS. 48A and 48B are each sectional views of an inflation mechanism in the bottom dead center position.
Figure 48B:
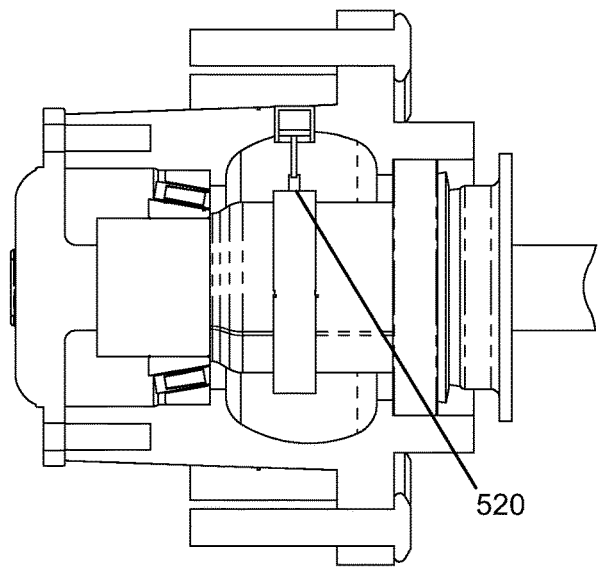
Figure 48C:
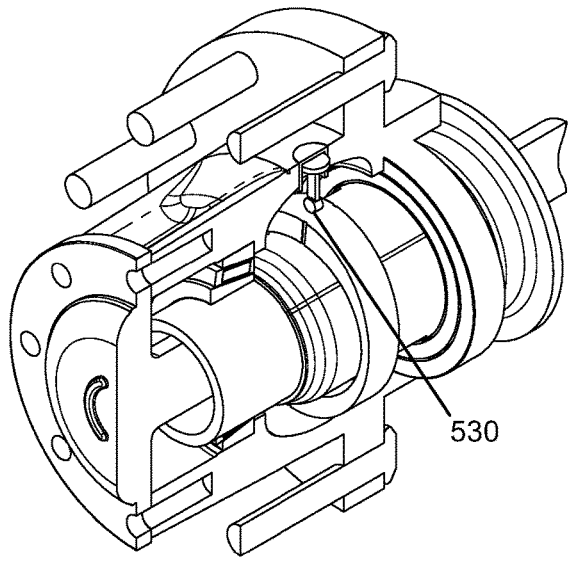
FIGS. 48C and 48D are each sectional views of an inflation mechanism in the top dead center position.
Figure 48D:
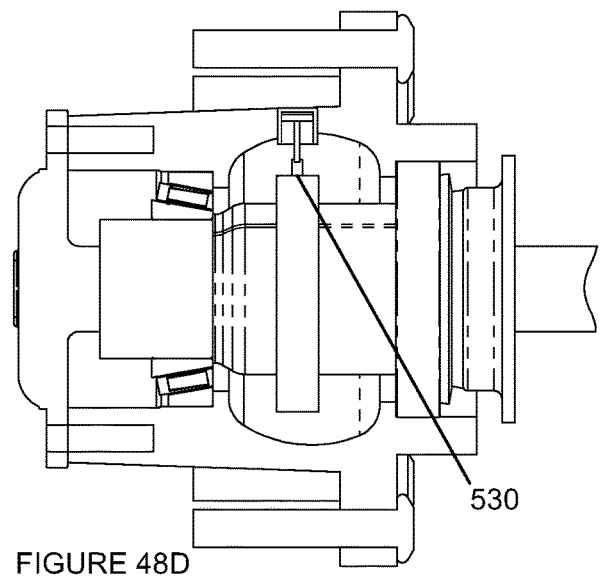
Figure 49A:
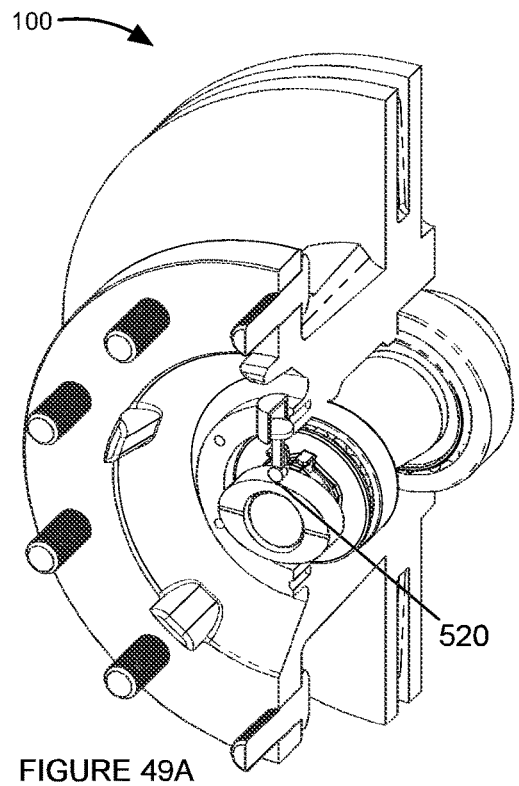
FIGS. 49A and 49B are each sectional views of an inflation mechanism in the bottom dead center position.
Figure 49B:
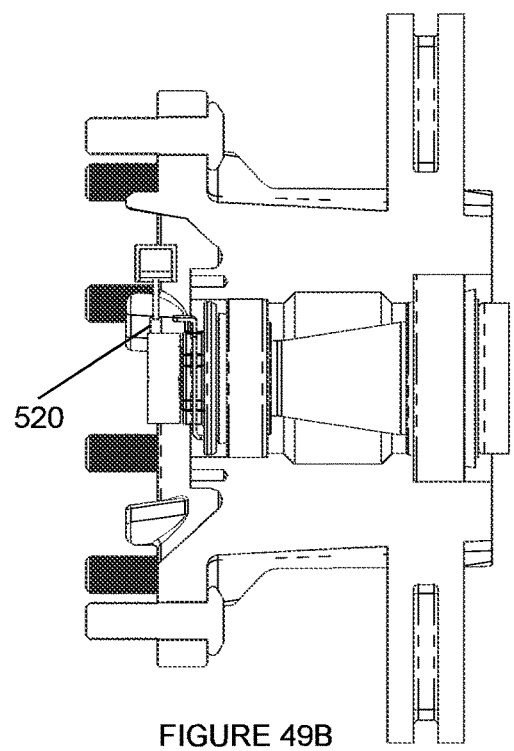
Figure 49C:
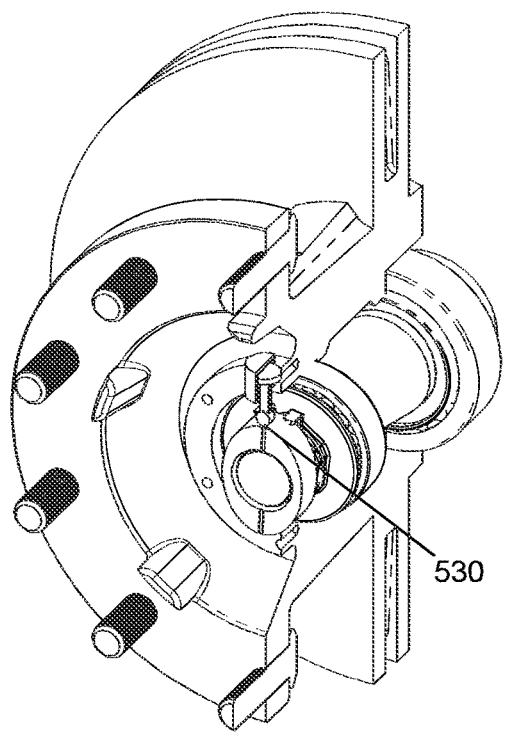
FIGS. 49C and 49D are each sectional views of an inflation mechanism in the top dead center position.
Figure 49D:
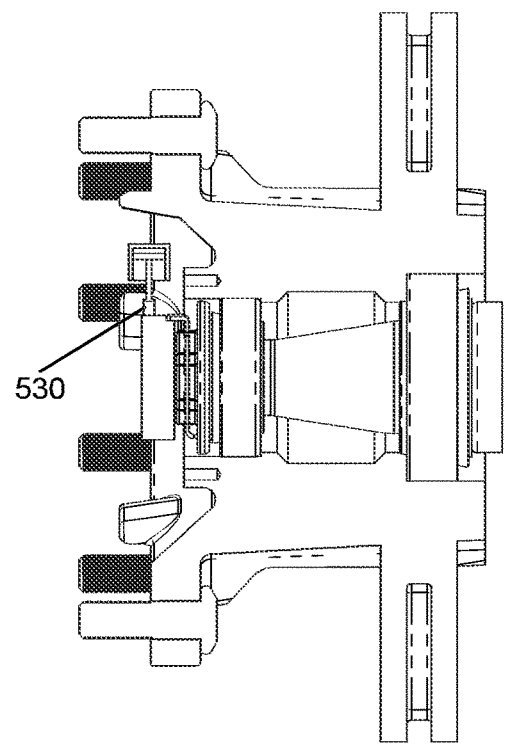

The selective engagement mechanism can selectively connect and disconnect: the pump from the PPA (e.g., in the pumping and non-pumping modes, respectively, as shown in FIG. 47), the pump piston from the pump, the input component from the axle component (e.g., bearing spacer, axle), the output component from the hub component (e.g., hub body), the output component from the input component, the output component from the pump, the ETM from the pump, selectively freeze the pump (and/or cam follower) in a predetermined configuration (e.g. at top dead center 530, bottom dead center 520, compressed, expanded, etc.), or otherwise selectively operate the pump between a pumping and non-pumping mode. In one example, the SEM axially translates the output component away from the input component (e.g., inward or outward) to place the inflation system in the non-pumping mode (example shown in FIG. 10). In a second example wherein the input component includes a plate resting against an angled surface, the SEM can include actuating the plate to a perpendicular position (relative to the axle axis) to place the inflation system in a non-pumping mode (example shown in FIG. 11). In a third example, the SEM disengages the pump from a bearing spacer. In a first specific example, the pump can be disengaged from the bearing spacer by disengaging a (floating) cam from the bearing spacer. In a second specific example, the pump can be disengaged from the bearing spacer by disengaging a cam follower from a cam surface. However, any other suitable component can be selectively connected or disconnected to transition between the pumping and nonpumping modes, respectively. The SEM can bias the system towards engagement or away from engagement (e.g., default to the non-pumping mode). However, the SEM can otherwise operate the inflation system between the pumping and non-pumping modes.

The selective engagement mechanism can be automatic, manual, pneumatic (e.g. pressure driven), electrically-powered, magnetic, spring-driven, friction-based, and/or generate an engagement and/or disengagement force in any suitable manner. Pneumatic SEMs can be controlled using pump charge pressure, tire pressure, and/or any other suitable fluid or pressure source. In one variation, tire pressure can be backflowed into the pump (e.g., via active valve control, due to the tire pressure exceeding a cracking pressure of a passive valve, etc.) to pressurize the pump chamber and bias the piston in a predetermined position (e.g., bottom dead center). However, the SEM can include a pawl (e.g., that selectively engages or disengages the input and output components in the connected and disconnected modes, respectively), a clutch (e.g., that selectively aligns and offsets the input and output components axially or radially in the connected and disconnected modes, respectively), sliding gears, rocker, synchromesh features, or any other suitable engagement and/or disengagement mechanism.

The SEM can operate the pump in a pumping mode when the tire pressure or reservoir pressure falls below of predetermined pressure threshold, and/or operate the pump in a non-pumping mode when the pressure exceeds a predetermined pressure threshold, or be otherwise controlled.

The selective engagement mechanism can be arranged within the inflator, between the inflator and the PPA, external the inflator, external the inflator system, or otherwise arranged.

The selective engagement mechanism can be electrically, mechanically, pneumatically, or otherwise controlled (e.g., connected and disconnected). The SEM can be passively or actively controlled (e.g., include active or passive actuation and/or return elements).

In a first variation, the SEM can electrically disconnect the pump from the PPA. In this variation, the pump can be electrically disconnected from the power generator, and/or the generated power can be rerouted to an energy storage system, such as a battery. The SEM can be electrically connected/disconnected based on control instructions received from a control system, based on a signal generated from a tire pressure sensor, or otherwise controlled. The control instructions can be communicated to the SEM from the control system via a wired or wireless connection, or be otherwise received. Examples of the communication system include: 802.11x, Wi-Fi, Wi-Max, WLAN, NFC, RFID, Bluetooth, Bluetooth Low Energy, BLE long range, ZigBee, cellular telecommunications (e.g., 2G, 3G, 4G, LTE, etc.), radio (RF), microwave, IR, audio, optical, wired connection (e.g., USB), or any other suitable communication module or combination thereof. When a wired connection is used, the wired connection can be routed through the hub barrel, the drive stud, the hub body, the lubricant hole, or through any other suitable path.

In second variation, the SEM can mechanically disconnect the pump from the PPA. The SEM can mechanically disconnect the power transfer components (e.g. disconnect the pump or inflator from the PPA; disconnect the output component from the output component; disconnect the ETM from the pump or the PPA; etc.), disconnect portions of the pump (e.g., chamber from the piston), or disconnect any suitable set of power transfer components. Examples of the mechanical SEM can include: a spring (e.g., biasing the components apart from each other, biasing the components toward each other), a magnet, pneumatic pressure (e.g., from pump, tire, etc.; controlled by one or more passive or active valves), and/or any other suitable mechanical mechanism.

In one example, the input gear can be disconnected from the output gear. In a second example, rotor can be disconnected from the stator. In a third example, the idler arm can be disconnected from the plate. In fourth example, the piston and the cam follower can be disconnected (e.g., retracted) from the cam (e.g., by venting the charge pressure of the pump). However, any other suitable PPA component can be separated or disconnected from any other suitable PPA component.

The power transfer components can be disconnected: axially (e.g., slid axially in or out to axially misalign the components), radially (e.g., actuated radially outward to disengage or inward to freeze the components), arcuately (e.g., arcuately misalign the components), or otherwise disconnected (and reversed to reconnect). The power transfer components can be separated using pneumatics (e.g., using a pneumatically-controlled mechanical actuator; selectively controlled by an active valve fluidly connecting a pressurized fluid source, such as the tire, to the SEM; venting a charge pressure left within the pump after pressurized fluid egress; etc.), using an electrically controlled mechanical actuator, or using any other suitable actuation mechanism. In the first embodiment, the SEM mechanically disconnects the power transfer components using the pump (e.g. the static position of the pump piston is biased in a predetermined position, such as radially inward, by backflowing tire air into the pump; the pump piston is biased radially outward by venting the charge pressure; etc.). In a second embodiment, the SEM mechanically disconnects the power transfer components using a clutch (e.g. selectively connecting or aligning the rotational axes of the power transfer components, etc.). The clutch can be electrically or pneumatically actuated. In a third embodiment, the SEM mechanically disconnects the power transfer components using an axially actuating arm (e.g. pneumatically actuated by the tire pressure, actuated by a motor, etc.) that actuates along the axle axis.

Figure 52A:
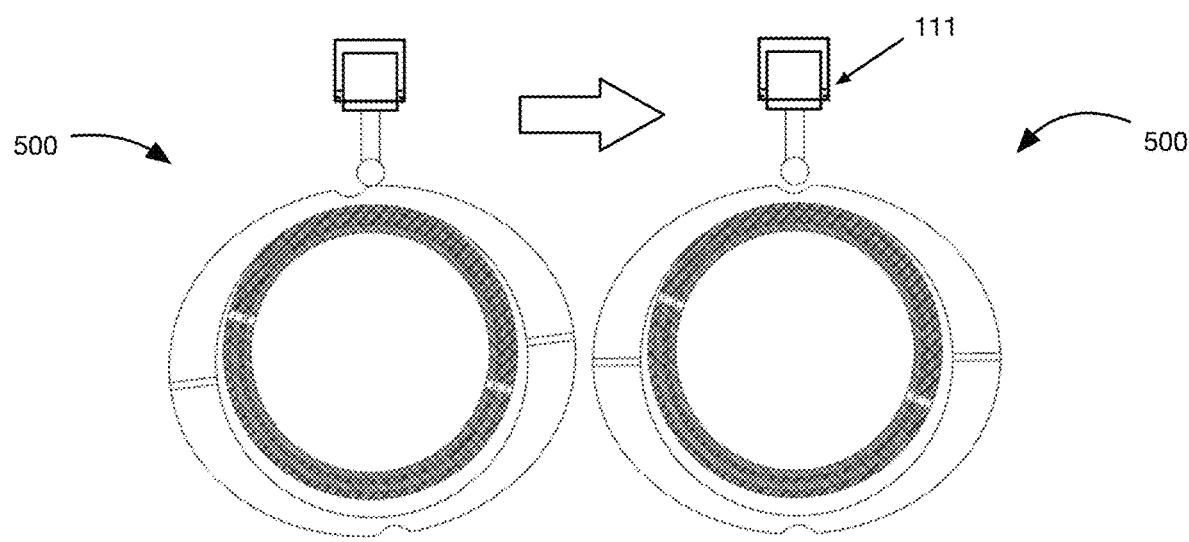
FIGS. 52A-52C are diagrams of a cam with dimples and a cam follower with stoppers in a set of configurations.
Figure 52B:
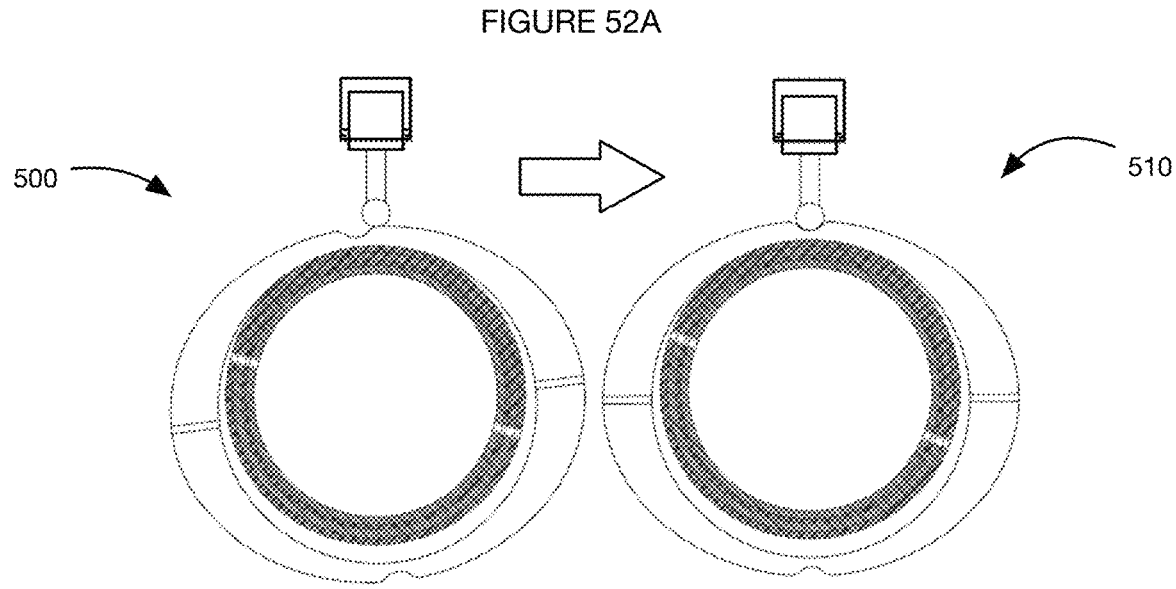
Figure 52C:
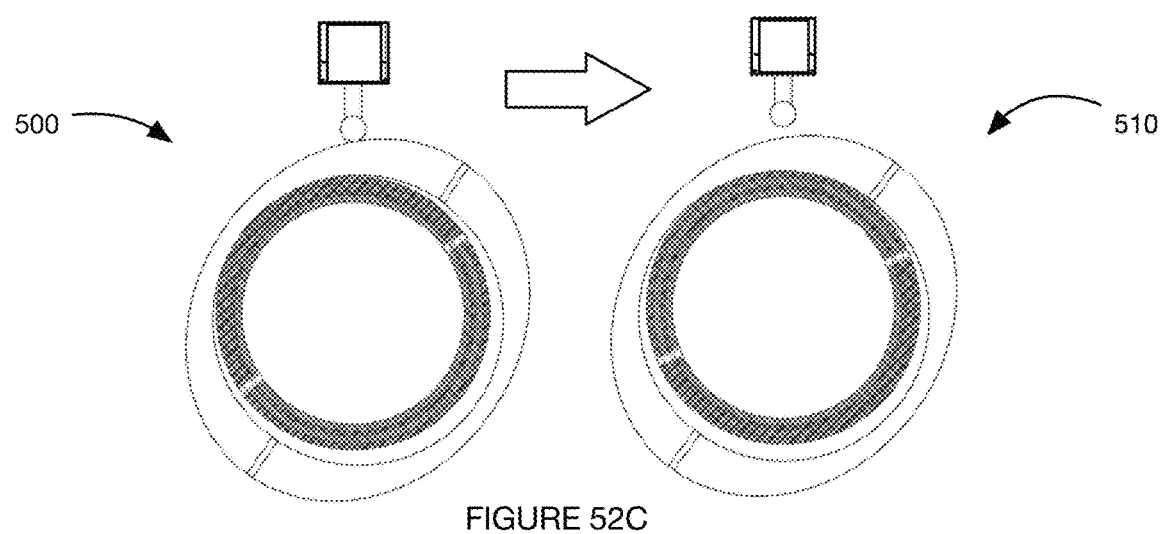

Binding friction can be mediated by a geometric engagement mechanism. In a first variation, the geometric engagement mechanism mediating binding friction can be one or more dimples on a cam. During the non-pumping mode, the cam follower extends into the interior of a dimple, wherein the normal force between the cam follower and the cam directly results in rotation of the cam about the axis of rotation (disengaging the cam from the no-slip condition at the reference surface, thereby mediating the friction at the reference surface). The dimple is preferably located at the arcuate region of the cam corresponding to the bottom dead center of the piston stroke (e.g., minimum distance between follower surface and reference surface on the cam), but can additionally or alternately be located at the arcuate region corresponding to the top dead center and/or any other appropriate location on the cam. The SEM preferably includes one dimple for each lobe of the cam, but can alternatively include more dimples than lobes, or less dimples than lobes. Dimples can be used with one or more stoppers 111, the stopper preventing a cam follower from bottoming out at the full depth of the dimple (which would increase the normal force between the cam and the bearing spacer—the resulting friction preventing the cam from slipping on the bearing spacer). The stopper in may bound the range of travel (in a radially inward and/or outward direction relative to the axis of rotation) of the piston head, piston shaft, and/or cam follower relative to the cam. The stopper may be non-deformable (hard stop) or deformable (e.g., spring, rubber). The stopper can be: a set of flanges (e.g., cooperatively defining a neck that the piston shaft extends through, wherein the piston can include complimentary flanges that engage the stopper flanges; examples shown in FIGS. 52A-52C; etc.), a spring, a magnet, and/or any other suitable stopping mechanism. The geometric engagement mechanism can alternately be a paired set of convex and concave surfaces, where the cam follower contacts the convex surface in one operating mode (e.g., pumping) and the concave surface in a second operating mode (e.g., non-pumping). However, the dimples and/or mechanical SEM can be used with any other suitable separation control mechanism.

Binding friction can be mediated by a geometric engagement mechanism. In a first variation, the geometric engagement mechanism mediating binding friction can be one or more dimples on a cam. During the non-pumping mode, the cam follower extends into the interior of a dimple, wherein the normal force between the cam follower and the cam directly results in rotation of the cam about the axis of rotation (disengaging the cam from the no-slip condition at the reference surface, thereby mediating the friction at the reference surface). The dimple is preferably located at the arcuate region of the cam corresponding to the bottom dead center of the piston stroke (e.g., minimum distance between follower surface and reference surface on the cam), but can additionally or alternately be located at the arcuate region corresponding to the top dead center and/or any other appropriate location on the cam. The SEM preferably includes one dimple for each lobe of the cam, but can alternatively include more dimples than lobes, or less dimples than lobes. Dimples can be used with one or more stoppers, the stopper preventing a cam follower from bottoming out at the full depth of the dimple (which would increase the normal force between the cam and the bearing spacer—the resulting friction preventing the cam from slipping on the bearing spacer). The stopper may bound the range of travel (in a radially inward and/or outward direction relative to the axis of rotation) of the piston head, piston shaft, and/or cam follower relative to the cam. The stopper may be non-deformable (hard stop) or deformable (e.g., spring, rubber). The stopper can be: a set of flanges (e.g., cooperatively defining a neck that the piston shaft extends through, wherein the piston can include complimentary flanges that engage the stopper flanges), a spring, a magnet, and/or any other suitable stopping mechanism. The geometric engagement mechanism can alternately be a paired set of convex and concave surfaces, where the cam follower contacts the convex surface in one operating mode (e.g., pumping) and the concave surface in a second operating mode (e.g., non-pumping). However, the dimples and/or mechanical SEM can be used with any other suitable separation control mechanism.

Figure 44:
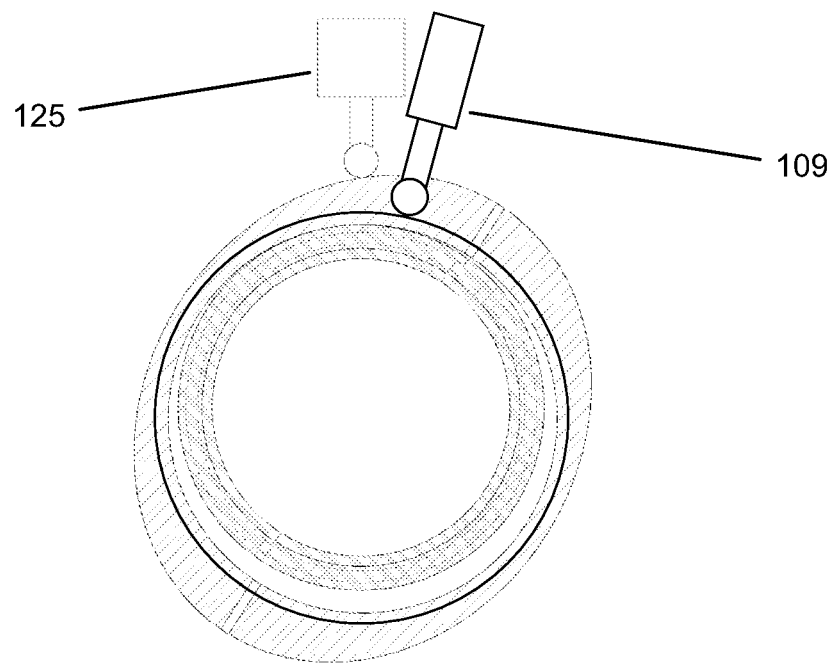
FIG. 44 is a diagram of an example of an inflation system with a secondary actuator.

Binding friction can be used with active friction control. In a first embodiment, active friction is controlled by pressurizing the pump to a charge pressure (e.g., with air from the tire) increasing the force between the cam follower and the cam (and thereby controlling the normal force between the cam and the bearing spacer). In a second embodiment, the SEM includes an active friction member (e.g., separate piston, solenoid, roller, etc.; an example is shown in FIG. 44) which is separate from the pump, that engages a flange on the cam or actuating the pump in a radial direction.

However, the power transfer components can be otherwise disengaged.

In a fourth embodiment, the SEM includes a gear disengagement mechanism. In a first example, the SEM can include a set of biasing mechanisms, including a first mechanism biasing the PPA components toward an engagement position (e.g., default position; e.g., by a spring), and a second mechanism biasing the PPA components away from the engagement position (e.g., by a pneumatic mechanism). The first and/or second mechanisms can include: a pneumatic mechanism (e.g. fluidly connected to the tire or pump pressure, etc.), spring, or other biasing mechanism.

In a second example, the gear disengagement mechanism can include a set of sliding gears, wherein the gears of the PPA slide relative to each other (e.g. axially, such as in a transmission). However, the gear disengagement mechanism includes a rocker arm (e.g. actuating radially, along a chord, etc.), a synchromesh feature, a friction drive, or any other suitable disengagement or engagement mechanism. However, the PPA components can be otherwise engaged and disengaged (e.g., using any of the systems discussed above). However, the SEM can be otherwise configured.

Figure 12:
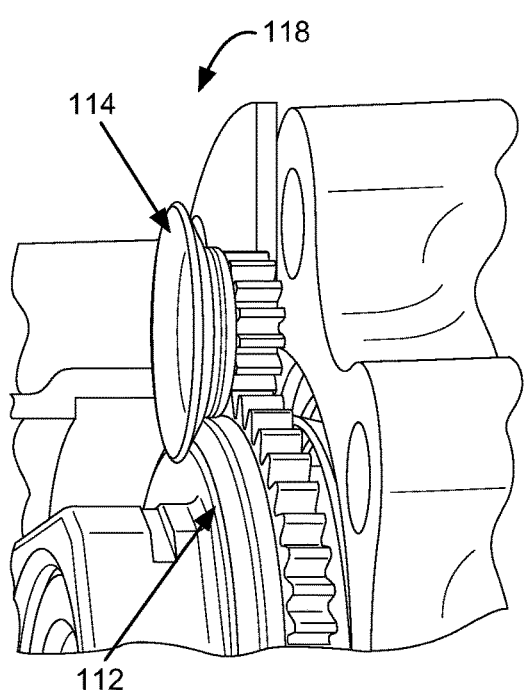
FIGS. 12 and 13 are schematic representations of a first and second example of guide mechanisms, respectively.
Figure 13:
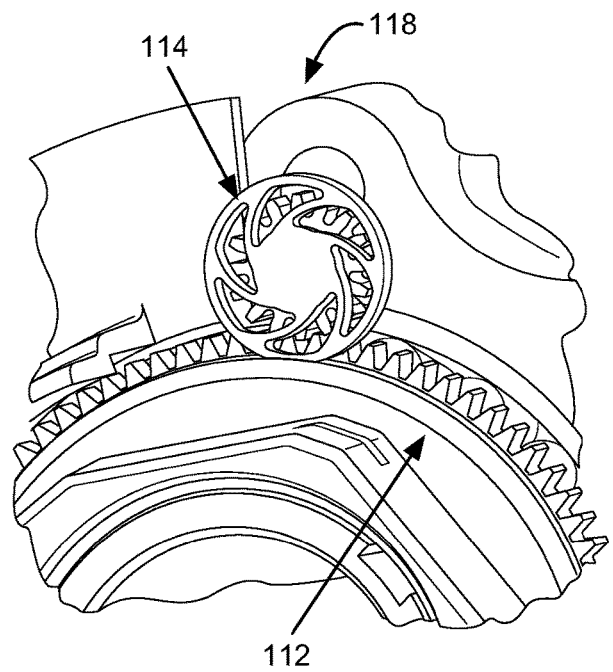
Figure 14A:
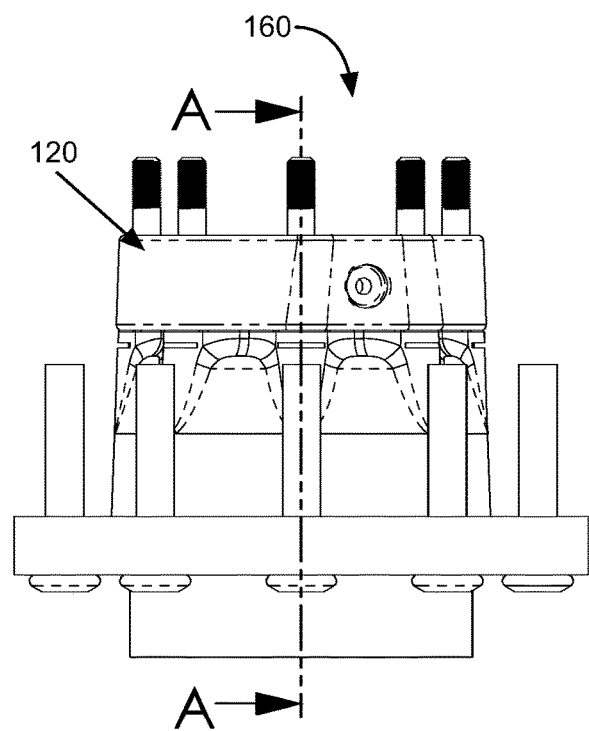
FIGS. 14A-14D are schematic representations of an example of the third embodiment of the inflation system, a sectional view of the third embodiment installed on the hub, a sectional view of the spindle nut retention region, and a sectional view of the inflator retention mechanism, respectively.
Figure 14B:
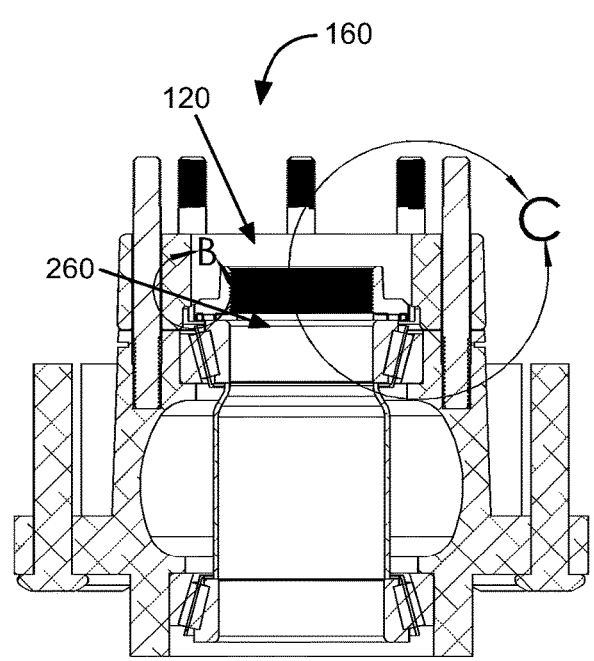
Figure 14C:
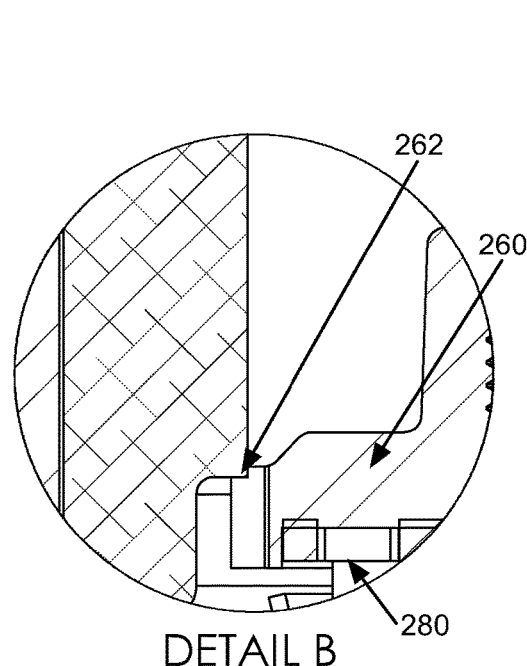
Figure 14D:
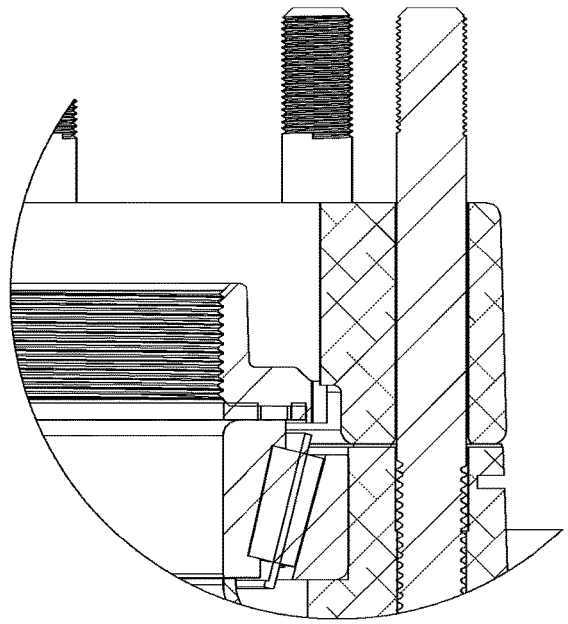

In variants where the output component can be disengaged from the input component, the PPA can optionally include a guide mechanism 118 that function to guide input component-output component engagement and/or disengagement (examples shown in FIGS. 12 and 13). The guide mechanism can include an input-side mechanism, an output-side mechanism, and/or any suitable set of components. The input-side mechanisms and/or output-side mechanisms can be arranged along the: face of the input component or output component, the crest of the input or output component (e.g., crest of the gear tooth, be a partial tooth), or be otherwise arranged. The guide mechanism (e.g., input-side and output-side mechanism pairs) can include: a friction plates, a groove or track coupled to a cone or an out-runner wheel (e.g. deformable, rigid, etc.), be the input or output component itself (e.g. deformable gear), or any other suitable guide mechanism.

In systems with multiple distributed pumps, the inflation system can optionally include fluid connections 460 fluidly connecting the pumps together. The fluid connections can define pump interconnections that connect the pump inlets and/or outlets together (e.g., in series, in parallel, a combination thereof, etc.). The fluid connections can optionally fluidly connect the pumps to the working fluid source (e.g., ambient environment), the tire, or to any other suitable endpoint. The fluid connections can be mounted to the hub end, the hub face, the hubcap, and/or any other suitable location. The fluid connections can extend arcuately, radially, axially, or in any other suitable direction relative to the hub face and/or axle axis.

In a first example, the fluid connections include tubing.

In a second example, the fluid connections include a manifold 190, statically defining inter-pump manifolds, inlets, outlets, and/or any other suitable set of fluid connections (example shown in FIG. 38). The manifold can be formed, manufactured by casting, 3D printing, stacking plates (with channels defined along the plate faces) together (e.g., by brazing the plates together, compressing the plates together, etc.), or otherwise manufactured. Additionally, or alternatively, the manifold can be formed by the hub or hub cap.

In a third example, the fluid connections can be cooperatively defined by an annular o-ring manifold that fits and seals to the inner diameter of the hub (example shown in FIG. 39). In this example, the o-ring manifold cooperatively defines separate air channels for intake, exhaust, storage, and/or any other suitable fluid connection between the manifold and the inner hub diameter. In this variation the plate can be split and assembled around the bearing spacer from the back of the hub before inner bearing assembly, can be manufactured with the bearing spacer as a singular piece, or otherwise manufactured. This variation can optionally include a SEM. SEM can selectively disengage the output component from the input component (e.g. plate) by moving the pistons to a compressed position, moving the plate axially away from the pistons, moving the plate to a position perpendicular to the axle axis or otherwise selectively engaging or disengaging the PPA components. However, the inflation system can be otherwise configured.

The hub-integrated inflation system can optionally include a tire connector. The tire connector functions to connect the air output to the tire. The tire connector can fluidly connect the air output to the tire by tubing, rigid manifolds or any other suitable fluid connection. The tire connector can extend through the shaft, the stud, between the stud bores, through the radio service of the hub barrel, through the inflator housing, through the lubrication hole, or through any other suitable component of the hub. The tire connector can optionally include a hose guard or any other suitable reinforcement. In one example, the tire connector includes tubing connected to the tire with a Schrader valve. However, the tire connector can be otherwise configured. Each inflation system can include one or more tire connectors, fluidly connected to one or more tires per wheel end.

5. Inflation System Variants

Figure 18:
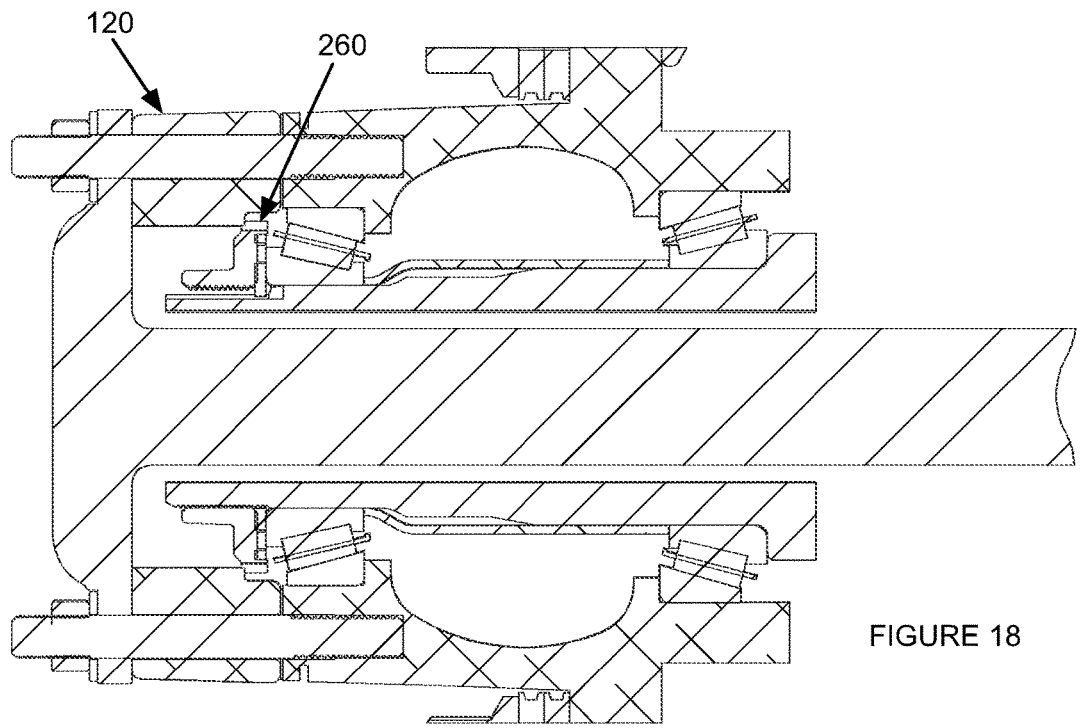
FIG. 18 is a sectional view of an example of the first variant of the inflation system.
Figure 19A:
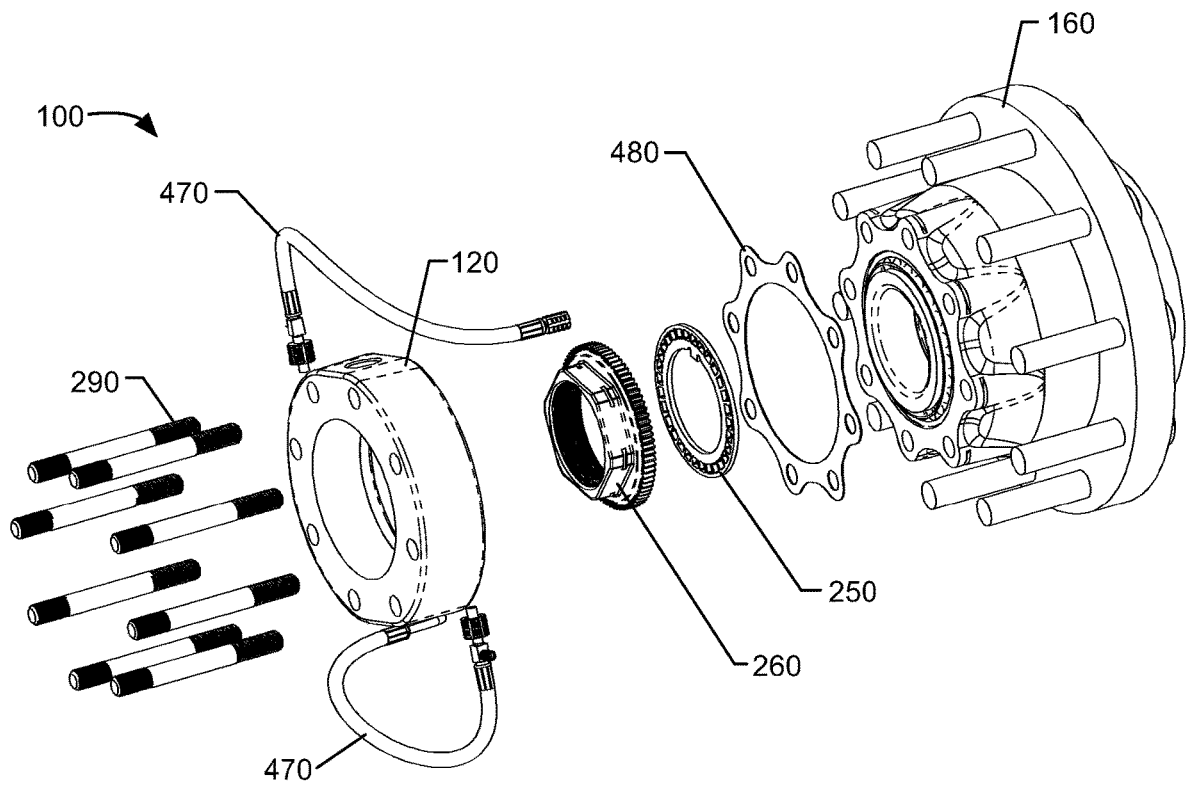
FIGS. 19A and 19B are exploded views of a mechanical and electrical variant of the third embodiment of the inflation system, respectively.
Figure 19B:
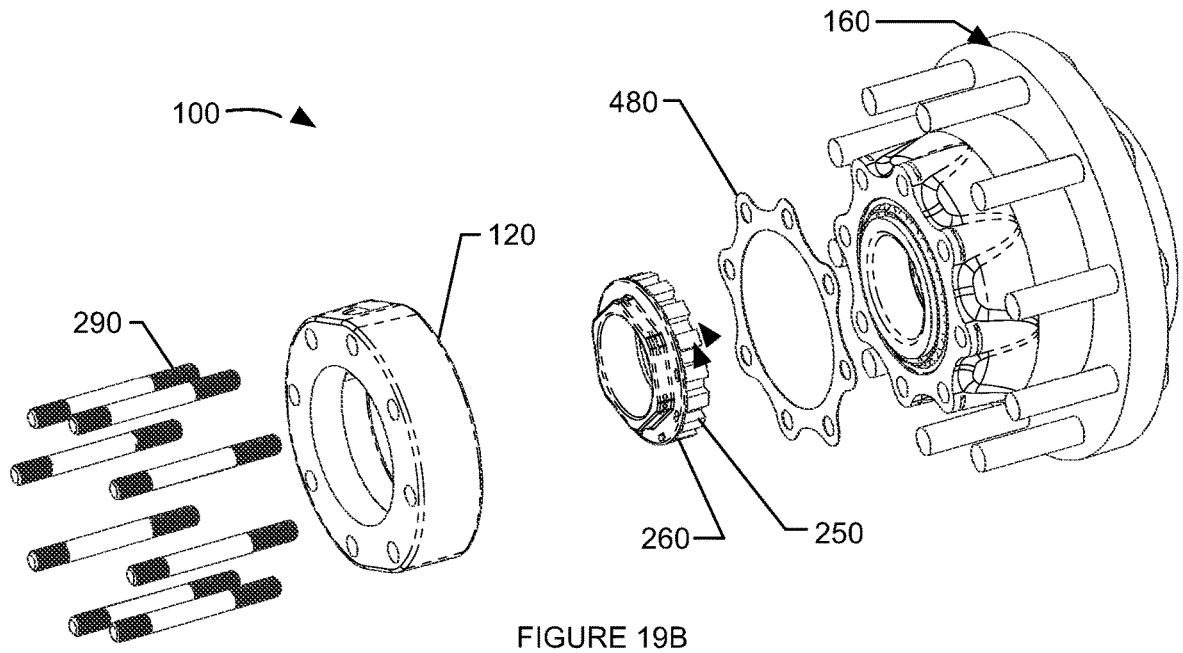
Figure 22:
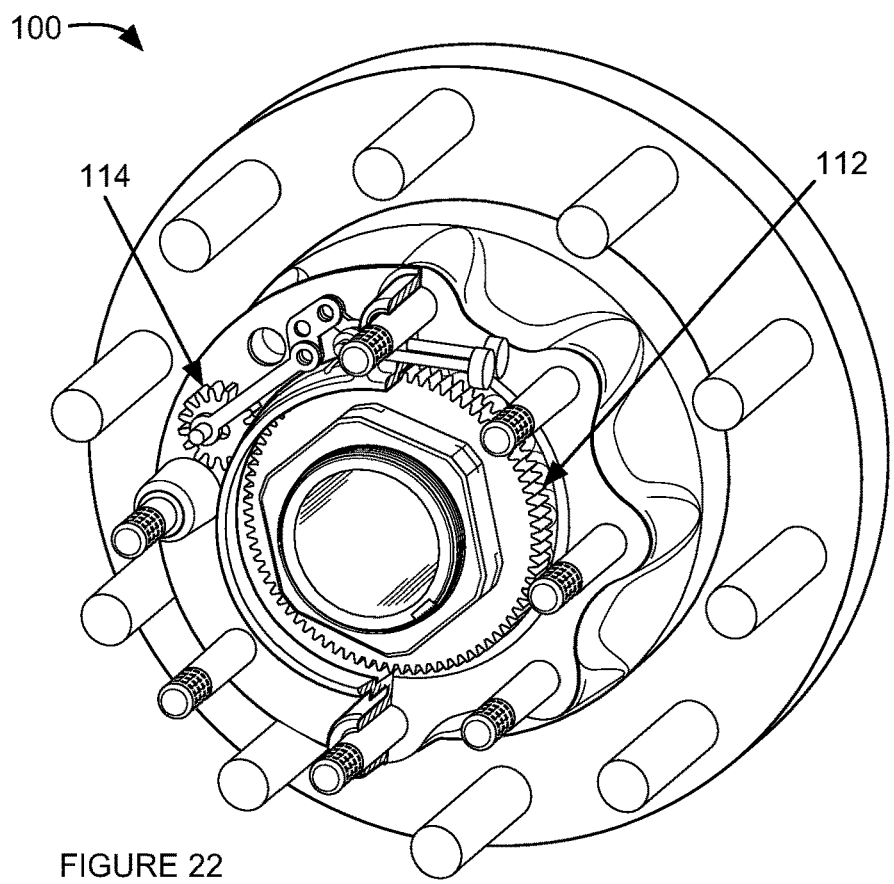

In a first variation of the hub-integrated inflation system, the inflation system harvests relative motion between the spindle nut (and/or lock ring) and the hub body or wheel (example shown in FIG. 18). This variation can be particularly well suited for steer hubs, but can be used with any suitable hub type. In this variation, the spindle nut functions as the input component, and a wheel-mounted component at the outer wheel end (e.g., the hub cap, the hub, the wheel, the inflator, etc.) functions as the output component (examples shown in FIGS. 21 and 22).

In this variation, the input component can be arranged on (e.g., retrofitted onto, manufactured as a singular piece with) the spindle nut or lock ring (e.g. the flange of the spindle nut, etc.). The input component can include exterior gear teeth arranged along the flange edge or perimeter, magnetic elements arcuately distributed about the flange circumference (e.g. evenly distributed, unevenly distributed), a flange with a profiled perimeter (e.g., non-circular flange), a profiled flange with an angled or profiled face, a cam integrated along the flange face, or any other suitable input component. In this variant, the input component preferably has the same diameter as the standard spindle nut, but can additionally or alternatively be larger or smaller than the standard spindle nut, or have any suitable size. In some variants, a spindle nut having diameter larger than a standard spindle nut diameter can be preferable to bring the engagement between the input component and the output component to the outside of the hub, likely requiring less modification to the hub.

In this variation, the output component is preferably statically mounted relative to the wheel, and can be directly mounted to the inflator housing, to the hub cap, to the inner diameter of the wheel, to the hub body interior (e.g. along the inner diameter of the outer end of the hub body), or otherwise arranged. The output component can be an exterior gear, but can additionally or alternatively be a set of windings, a ferrous element, or any other suitable output component. The output component can be manufactured as a singular piece with the hub, manufactured as a singular piece with the hub cap, assembled into the inflator housing, retrofit onto the hub (e.g., using adhesive, an interference fit, a mechanical retention mechanism, etc.), or otherwise assembled into the system.

Figure 15:
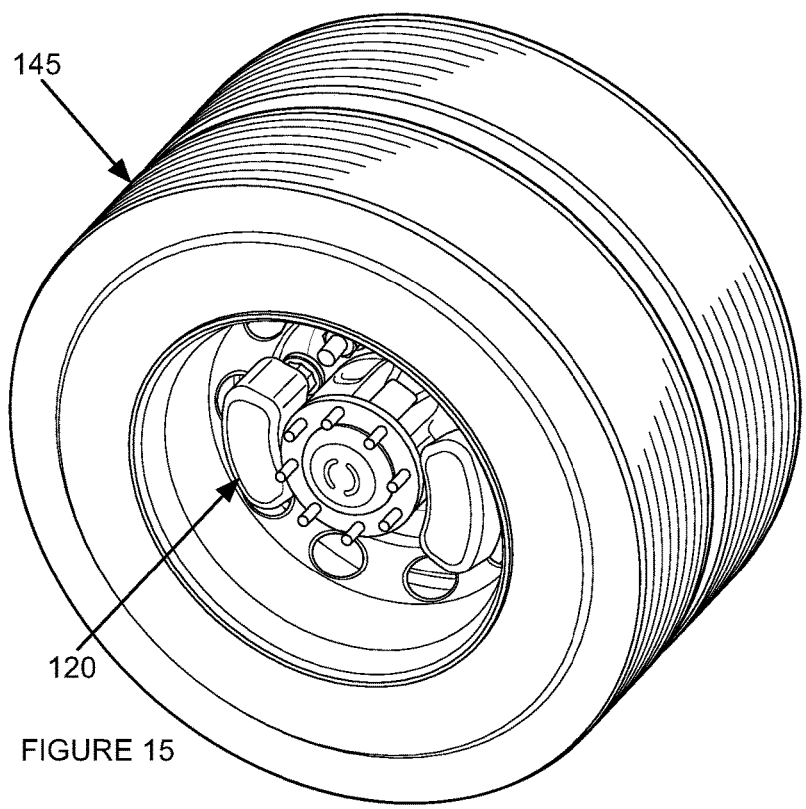
FIG. 15 is a schematic representation of an example of the first embodiment of the inflation system.
Figure 16:
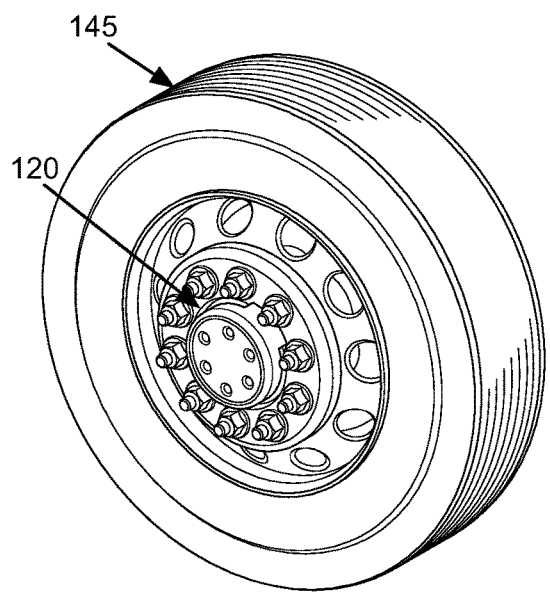
FIGS. 16 and 17 are an isometric view and a sectional view of an example of the third embodiment of the inflation system, respectively.
Figure 17:
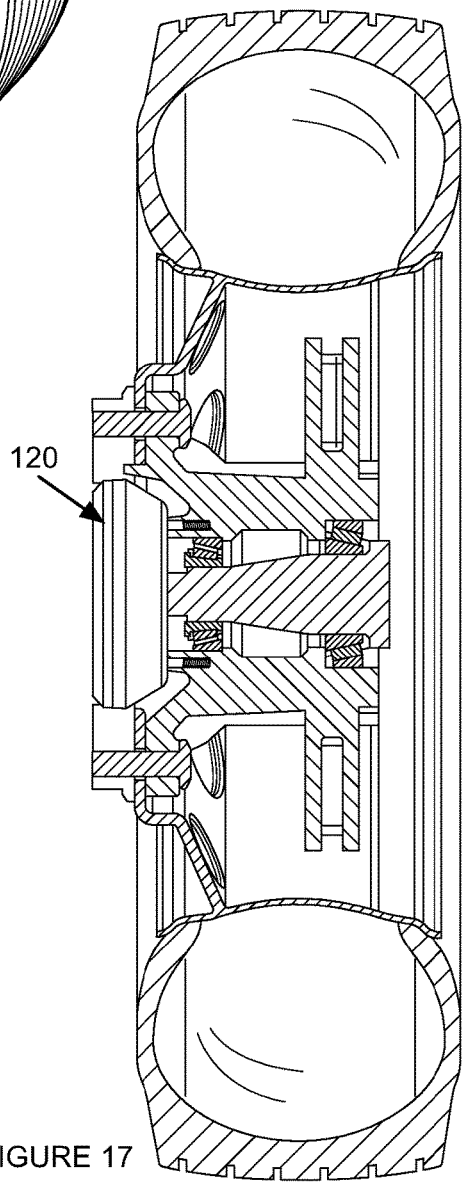

In a first embodiment, the inflation system leverages the first variation with the inflator mounted to the wheel face (e.g. to the spokes of the wheel) (example shown in FIG. 15). The pump can extend radially along, or parallel with, the wheel face. The output component is preferably mounted to the interior diameter of the hub body, is preferably axially aligned with the spindle nut or lock ring. This embodiment can optionally include an ETM (e.g., driveshaft) that extends radially through the hub body from the output component (e.g., hub interior surface) to the pump. The ETM can optionally include a bevel gear or rotary junction arranged between the inflator and the PPA.

In a second embodiment, the inflation system leverages the first variation with the inflator mounted to a hub axial surface (e.g., along the hub exterior; along the hub exterior between the inner and outer sets of studs; between the studs; within the hub scalloping; etc.). The inflator is preferably axially aligned with the spindle nut, but can alternatively be axially offset from the spindle nut. The inflator can be mechanically or electrically connected to the output component via a direct drive wherein the spindle nut extends through the hub body, or be indirectly connected by an ETM extending through the hub body.

In a third embodiment, the inflation system leverages the first variation with the inflator mounted the hub end (examples shown in FIGS. 14A-14B, 16, 17, and 19A-19B). In this embodiment, the inflator can function as the hubcap, form an annulus circumferentially surrounding the hub end (e.g., spindle), or be otherwise configured. In this embodiment, the inflator can include the output component (e.g., winding, armature, permanent magnet, output gear, etc.) along the inner surface (e.g., inner arcuate surface) of the inflator housing, wherein the output component is directly coupled to the spindle nut. Additionally or alternatively, the inflation system can a hub cap housing supporting the output component, wherein the output component can be mechanically connected to the inflator (e.g., the pump, which can be mounted anywhere on the hub or wheel exterior) by an ETM.

Figures 20A, 20B:
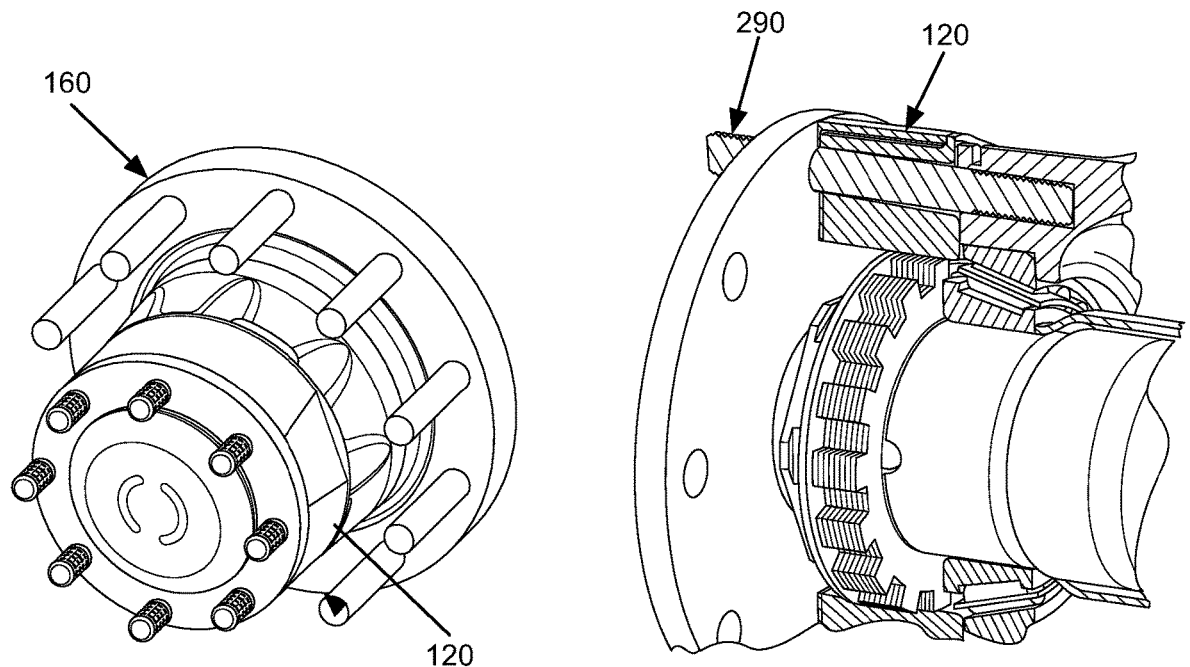
FIGS. 20A-20C are an isometric view, a sectional view from the back, and a sectional view from the front of an example of a fourth embodiment of the inflation system, respectively.
Figure 20C:
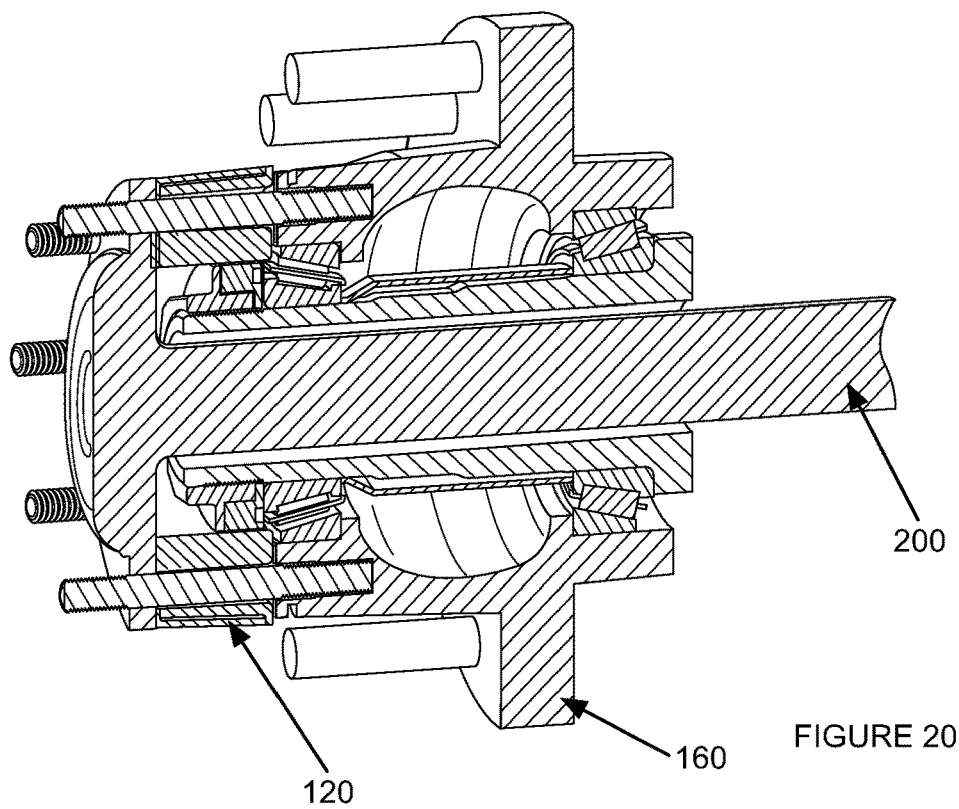

In a fourth embodiment, the inflation system leverages the first variation, with the inflator replacing (or mounted within) an axial section of the hub (example shown in FIG. 20A-20C). The axial section of the hub is preferably the exterior portion of the hub barrel (e.g., the front two inches of the hub barrel, the front several inches of the hub barrel, etc.), but can additionally or alternatively replace any suitable section of the hub barrel, replace an axial section of the hub barrel and extend along the hub exterior surface between the studs (e.g., within the hub scalloping), or be otherwise arranged. Additionally or alternatively, the inflator can be used instead of a snap ring to retain the spindle nut. In this embodiment, the inflator can include the output component (e.g., output gear, winding, armature, permanent magnets, etc.) coupled to the spindle nut (e.g., directly driven, indirectly driven via an ETM). Additionally or alternatively, the output component can be mounted to the interior surface of the hub, or be otherwise retained. In this embodiment, the studs can extend through the inflator housing into the hub body, such that the inflator housing is sandwiched between the hub cap and the hub body. Additionally or alternatively, the inflator housing can be retained in any other suitable manner.

In a second variation of the inflation system, the inflation system captures relative motion between the bearing spacer and the hub barrel (e.g. the inner diameter of the lubricant reservoir). In this variation, the bearing spacer is modified with the input component and the output component is mounted (directly or indirectly) to the hub barrel (examples shown in FIGS. 24, 20, 31, and 32). Alternatively, the inflator can be mounted to the bearing spacer, wherein the input component is statically mounted to the hub barrel (e.g., lubricant reservoir interior). The bearing spacer can be manufactured with the input component (e.g., as a unitary component), or be retrofit with the input component, wherein the input component is assembled over and/or mounted to the bearing spacer (e.g., using an interference fit, adhesive, retention mechanisms, etc.) before bearing spacer assembly into the hub. The input component can be an input gear (e.g., a collar with external teeth, a bearing spacer modified with external teeth along an axial section of the bearing spacer), inner stator, or any other suitable input component. The inner stator can be a ferrous toothed gear, include windings, include permanent magnets, or include any other suitable generator component. The input component is preferably arranged circumferentially about the bearing spacer's arcuate surface (or a portion thereof), but can additionally or alternatively be arranged along an axial surface of the bearing spacer or along any other suitable portion. The input component preferably extends along a portion of the bearing spacer length, but can alternatively extend along the entirety of the bearing spacer length.

In this variation, the output component is preferably mounted to (or integrated within) the interior of the hub barrel (e.g. the interior surface of the lubricant reservoir), but can alternatively be mounted to the exterior of the hub barrel. The outer component can be mounted to the interior surface of the lubricant reservoir, be mounted to or integrated within the lubricant cap, or otherwise arranged.

The output component can encircle the inner component (e.g., be circumferentially or concentrically arranged about the inner component), be mounted to and/or couple to an arcuate segment of the lubricant reservoir (e.g., to a point within the lubricant reservoir), be mounted to an axial segment of the lubricant reservoir, or be mounted to any suitable portion of the lubricant reservoir. In a first example, the output component can be an outer rotor that encircles the inner stator. The outer rotor can include field coils, armature windings, permanent magnets, or any other suitable generator component. In a second example, the output component can include an idler assembly mounted to a point within the lubricant reservoir. The idler assembly can include an output gear that meshes with the input gear of the input component. In this example, the output gear can be mechanically connected to the inflator via a rotary-to linear-converter; be connected to an electrical generator mounted to the hub interior (e.g., to the lubricant reservoir), wherein the electrical generator is electrically connected to the inflator; or be connected to any other suitable component. Additionally or alternatively, this variant can generate electricity by leveraging the existing magnet in the lubricant reservoir (e.g., for chip removal and/or collection) by modifying the bearing spacer with windings or armatures (e.g., wherein the modified bearing spacer or output component on the bearing spacer generates electricity when the windings or armatures pass by the magnet). This alternative can optionally include an ETM that extends through the axle, along the bearing spacer-axle interface, to the inflator (e.g., at the hub end, at the hub exterior, etc.), include a rotary junction, or include any other suitable ETM. For example, the inflator or inflation system can include an electrically conductive collar statically mounted to the hub barrel, offset from and electrically connected to the output component (e.g., via brushes), that conduct electricity from the modified bearing spacer to the electrically conductive collar (and subsequently, the inflator). In operation, wheel rotation about the axle causes the output component to rotate about the modified bearing spacer. In a fifth embodiment of the second variation, the inflator is mounted to the hub face. In this variation the inflator can additionally include an ETM extending axially through the hub barrel from the output component to the inflator at the hub face. The ETM can extend through the hub face, (e.g. hubcap), through a stud or through any other suitable component. The ETM can optionally extend into a recess within the inflator housing. In this embodiment the inflator can be directly driven by the output component or include a rotary to linear converter inside of the inflator. This embodiment can be assembled by inserting the output components through the lubricant hole and mounting the output component to the hub barrel interior (e.g. with adhesive screws or any other suitable mounting mechanism, et cetera), inserted in pieces through the hub rear (e.g. before inner bearing assembly to the hub rear and assembled within the hub cavity) and serve as a single piece through the hub rear or otherwise assembled. The input component can be manufactured with this bearing spacer or fitted to the bearing spacer before bearing spacer assembly into the hub cavity. The inflator can be bolted to the hub face wherein the ETM can align with the protrusion or recess in the inflator housing at a complimentary connection point.

Figure 23:
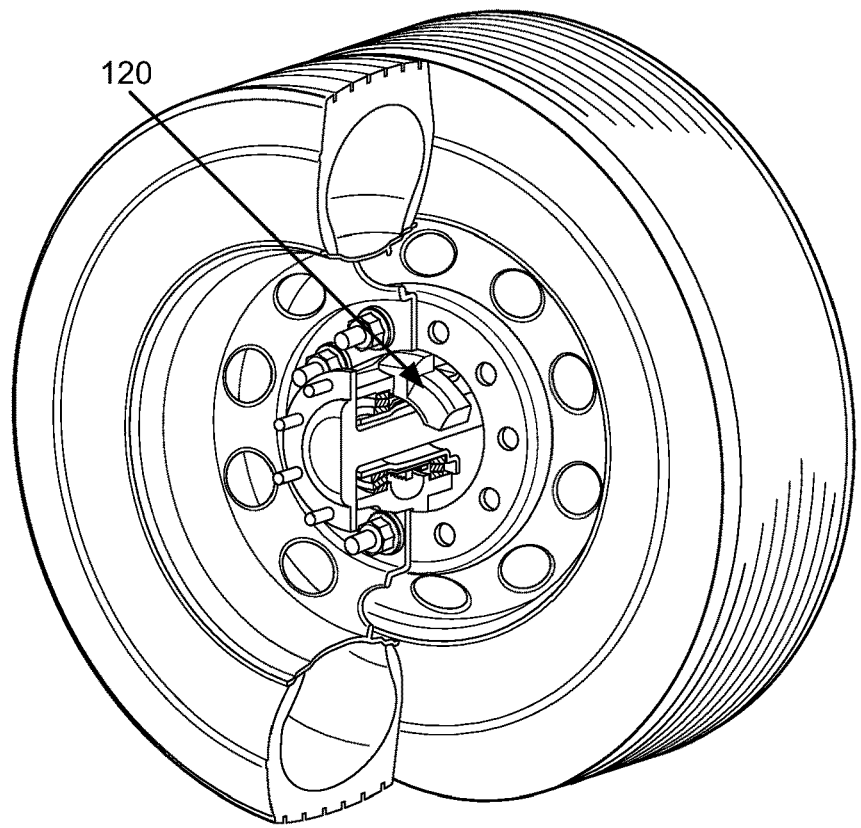
FIG. 23 is an isometric view of an example of the sixth embodiment of the inflation system.
Figure 24:
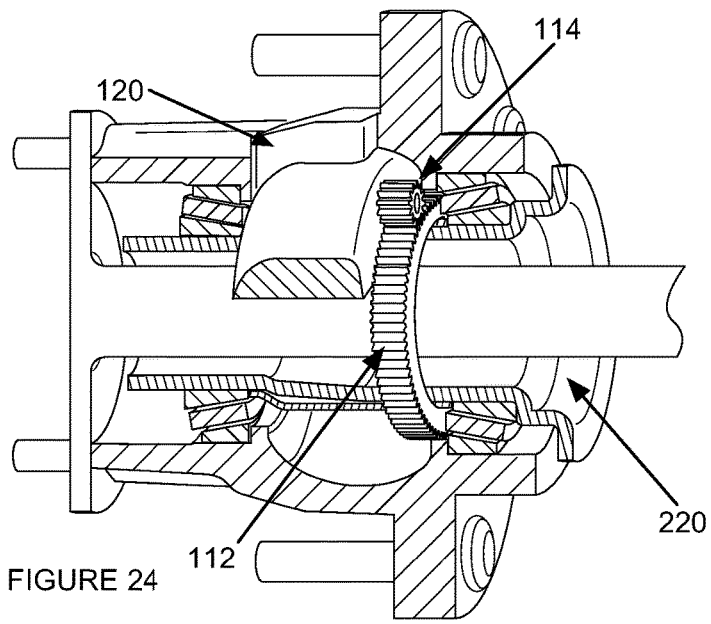
FIG. 24 is a schematic representation of an example of the power pickup assembly for the second variant of the inflation system, coupled to an example of the sixth embodiment of the inflation system.

In a sixth embodiment, the inflator system leverages the third variant, and the inflator is located within the lubricant reservoir (example shown in FIG. 23 and FIG. 24). In this embodiment, the inflator is preferably a toroid, circumferentially surrounding the bearing spacer, but can be otherwise configured. In this embodiment, the inflator can be mounted to the hub barrel (e.g. to the lubricant reservoir's interior surface, to the lubricant hole seal, etc.), or otherwise mounted to the lubricant reservoir interior. The input component is preferably statically mounted to the bearing spacer, and the output component can be statically mounted to the lubricant reservoir interior or be mounted to a component statically mounted to the lubricant reservoir interior. The inflator is preferably separated from the bearing spacer by a gap, but can alternatively be directly connected to the bearing spacer. The inflator is preferably axially offset from the input component and/or the output component, but can alternatively be coaxially arranged with the input component and/or output component. In a first example, the inflator houses the output component along an inner diameter, and is axially aligned with the input component. In a second example, the inflator houses the output component along a side face, and is axially offset from the input component. In a third example, the output component is mounted to an intermediary component, wherein the intermediary component transfers the energy to the inflator (e.g., axially offset from the input and output components). However, the inflator can be otherwise arranged. In this embodiment, the tire connection can extend through the lubricant hole, a stud, or through any other suitable path. In this embodiment, the inflation system can be assembled by feeding the inflator through the lubricant hole or through the back of the hub before assembling the inner bearing. However, this embodiment can be otherwise assembled.

Figure 25:
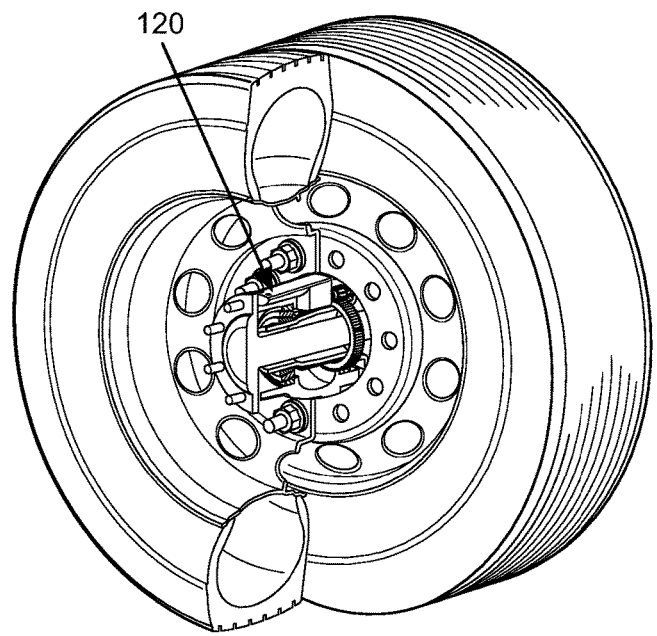
FIGS. 25 and 26 are isometric and sectional views of an example of the seventh embodiment of the inflation system.
Figure 26:
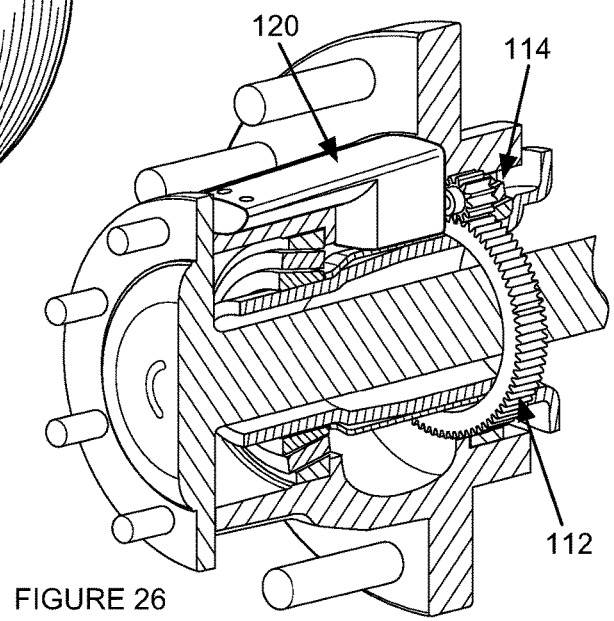
Figure 27:
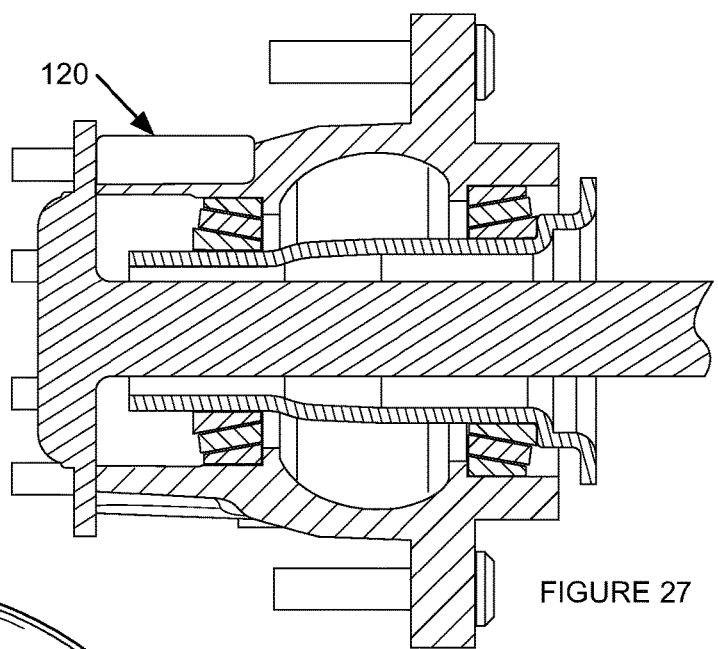
FIG. 27 is a sectional view of a second example of the seventh embodiment of the inflation system.
Figure 28:
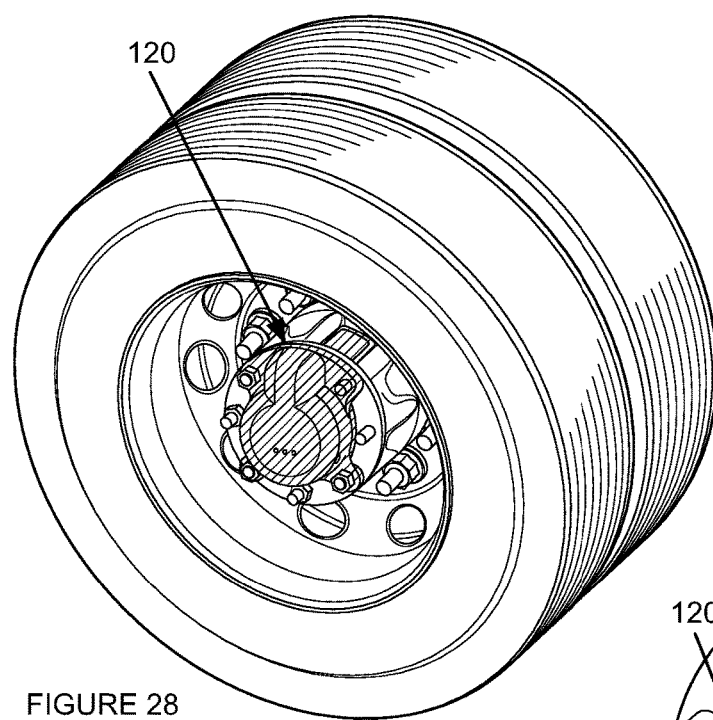
FIGS. 28 and 29 are isometric and sectional views of an example of the eighth embodiment of the inflation system.
Figure 29:
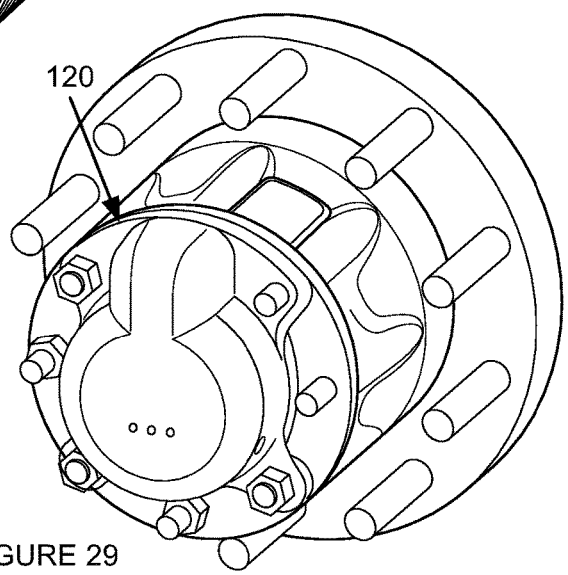
Figure 30:
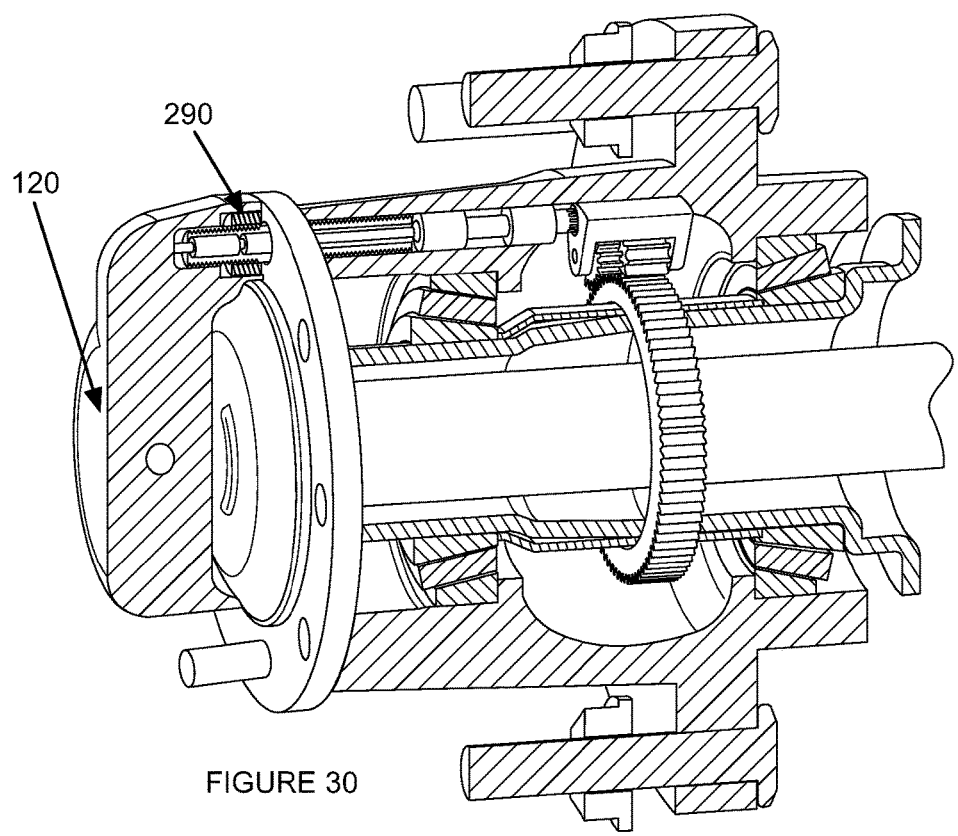
FIG. 30 is a schematic representation of an example of the inflation system with a mechanical power pickup assembly, an energy transmission mechanism extending through a stud, and an example of the eighth embodiment of the inflation system.
Figure 31:
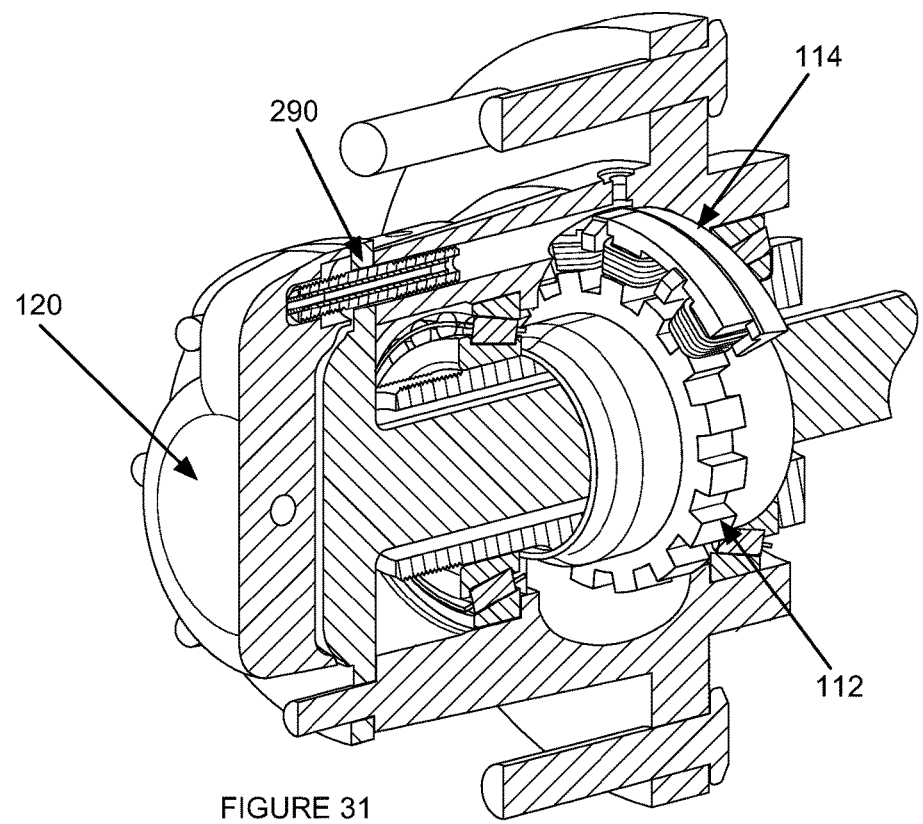
FIG. 31 is a schematic representation of an example of the inflation system with an electrical generator power pickup assembly (e.g., with generator coils attached to the output component and a stator attached to the bearing spacer), an energy transmission mechanism extending through a stud, and an example of the eighth embodiment of the inflation system.

In a seventh embodiment, the inflator system leverages the third variant, and the inflator is mounted along an exterior surface of the hub barrel (e.g. along an exterior arcuate surface, radially inward of the drive studs). In this embodiment the inflator extends axially (examples shown in FIGS. 25, 26, and 27), but can additionally or alternatively extend radially or in any other suitable direction. In this embodiment, the inflator can connect to the lubrication reservoir cavity via the lubrication hole or a hub barrel pass through. In this embodiment, the inflator can optionally function as the lubrication hole seal, wherein the inflator housing optionally includes a gasket 480 or other sealing component. In this embodiment, the output component is preferably mounted to the inflator (e.g., the interior surface of the inflator), but can additionally or alternatively be separate from the inflator and connected to the inflator by an ETM. The output component can be an output gear, a set of windings, and/or be any other suitable PPA component. The output component is preferably axially aligned with the inflator, but can additionally or alternatively be radially aligned with inflator or otherwise aligned with inflator.

In an eighth embodiment, the inflator system leverages the third variant, and the inflator is mounted to the wheel face (e.g. to the spokes), the hub end (e.g., form a hubcap, couple over the hub end, replace a section of the hub front, etc.), and/or any other suitable portion of the wheel end (examples shown in FIGS. 28, 29, 30, 31, 32, and 33). In this embodiment, the pump can be arranged such that the pump axis extends parallel with the wheel face (e.g., radially, along a chord), but can additionally or alternatively extend in any other suitable direction. In this embodiment, the inflation system can include an output component (e.g., an output gear, electrical generator, rotor, etc.) mounted to the lubricant reservoir interior (e.g., to the lubricant hole cap, the lubricant reservoir interior, etc.) and an input component (e.g., input gear, permanent magnet array, etc.), mounted to the bearing spacer. In this embodiment, the inflation system can optionally include an energy transfer mechanism that extends from the lubricant reservoir interior to the inflator (e.g., hub end, wheel end). The ETM can extend through a stud, a stud bore, function as a stud bore, through the housing between hub bores, out a radial section of the hub barrel and along the hub exterior, or be otherwise arranged. The ETM is preferably aligned with the output component, but can be otherwise arranged.

In a third variation, the inflation system captures relative motion between the bearing spacer and the hub barrel (e.g. the interior of the lubricant reservoir) using a plate as the input component (example shown in FIGS. 35A-35D). In this variation, the plate can be mounted to the arcuate surface of the bearing spacer and extend radially outward from the bearing spacer. The plate can be angled at a non-zero angle to the bearing spacer (e.g. angled at a non-perpendicular angle to the axle axis, arranged perpendicular the axle axis, etc.). The plate can have a profiled face (e.g., wherein the idler arm can be coupled to the profiled face), profiled edges (e.g., wherein the idler arm can be coupled to the profiled edges), planar face, smooth edges, or be otherwise configured. The output component can include one or more idler arms, contacting the plate at one end and connected to the pump piston at an opposing end. The idler arms preferably extend axially (e.g., parallel the axle axis), but can additionally or alternatively extend at an angle to the axle axis or in any suitable direction. The idler arms of the output component can slide along the plate face, hook onto the plate edge, or otherwise contact the input component. The inflation system can include one or more pump assemblies.

In this variation, the pump assemblies can be housed in the hub barrel (e.g., modified to mount the pump assemblies therein; include pump bores between the stud bores; etc.), be housed in the stud bores (e.g., wherein the pump assemblies can be housed in the studs or replace the studs and function as the stud bores), be mounted at the wheel end (e.g., wherein one or more ETMs extend through the hub housing, such as through the stud bores, to connect the idler arms to the pumps), or be otherwise mounted. The pump assemblies can be arranged with the pump axis parallel the axle axis, perpendicular the axle axis, or at any suitable angle relative to the axle axis.

In this variation, the plate can be split and assembled around the bearing spacer from the back of the hub, before inner bearing assembly; can be manufactured with the bearing spacer as a singular piece; or be otherwise assembled into the hub.

This variation can optionally include a SEM. SEM can selectively disengage the output component from the input component (e.g. plate) by moving the pistons to a compressed position, moving the plate axially away from the pistons, moving the plate to a position perpendicular to the axle axis or otherwise selectively engaging or disengaging the PPA components. The SEM can be used to: selectively engage or disengage all pumps, a subset of the pumps, or any suitable number of the pumps (e.g., to selectively adjust the pump rate and/or pressure). Additionally or alternatively, the pump rate can be adjusted by adding or removing pumps installed into the hub and connected to the plate.

In third variant operation, wheel rotation about the axle causes the output component (e.g., idler arm(s)) to move along the plate, wherein plate features along the rotation path axially actuate the output component. The idler arms are connected to the pump pistons, which are axially aligned with the idler arms, such that the idler arm axial actuation (due to changes in the axial position of the plate-coupled idler arm end) drives pump actuation.

Figure 45:
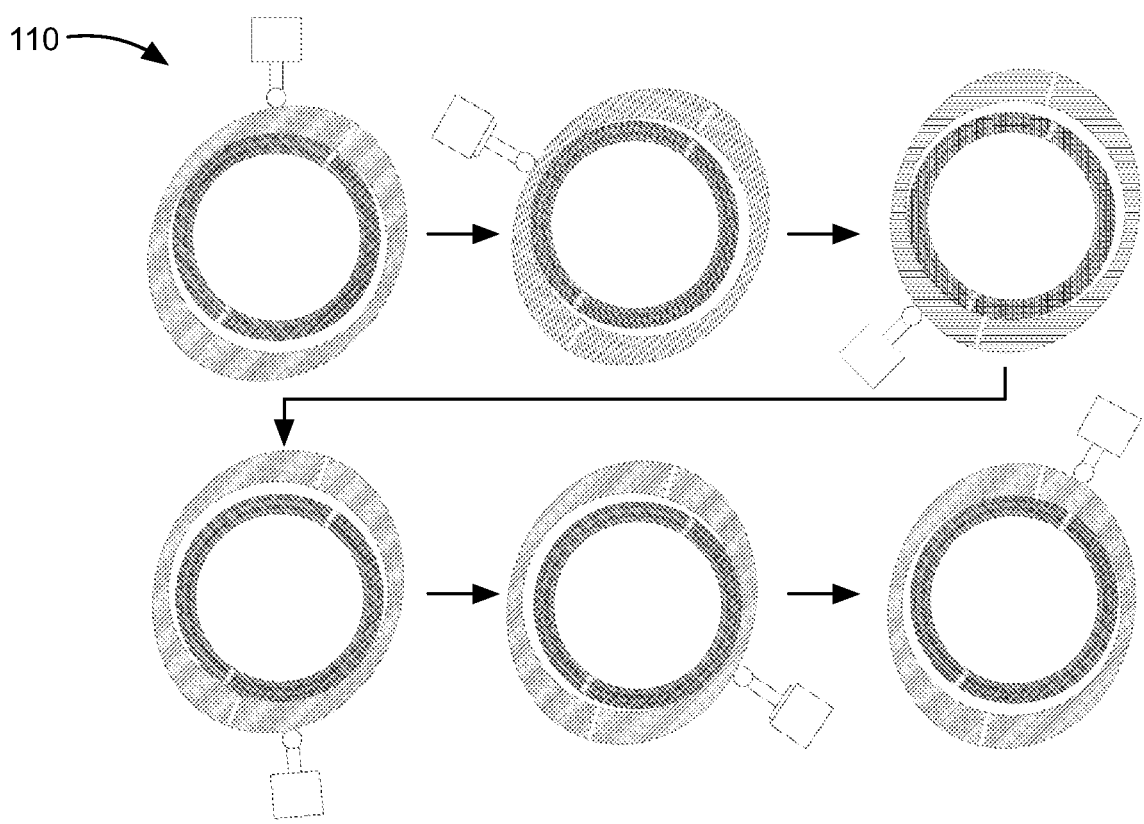
FIG. 45 is a diagram of an example of a floating cam motion about the bearing spacer with a different angular frequency than the hub body.

In a fourth variant, the system uses an eccentric mass and binding friction. In variants, the system can include a cam that passively binds the spacer or axle component (e.g., via friction). In these variants, cam can rotate (e.g., "walk"—an example is shown in FIG. 45) around the spacer harmonically, due to the difference in diameters of the spacer outer diameter and the cam inner diameter.

In a first example of the fourth variant, the PPA includes an eccentric floating cam with a lobe and a dimple (e.g., arranged in a low-slope arcuate region of the floating cam). In a specific example, the floating cam can include a single lobe and a dimple diametrically opposing the lobe. The dimple has a dimple depth (e.g., 1 cm), extending radially inward on the follower surface of the floating cam. The system can additionally include a stopper (hard stop), arranged proximate the piston head on a radially inward portion of the pump, which prevents the piston head from bottoming out on the radially inward portion of the dimple (e.g., from extending beyond the dimple bottom, from contacting the dimple bottom, extending beyond 0.75 cm radially inward of its position at bottom dead center of the cam during pumping mode). During the non-pumping mode 510, the piston head engages the stopper, and the cam follower engages the dimple at a depth less than the dimple depth (e.g., 0.75 cm), such that the cam rotates with substantially the same angular frequency as the pump about the axis of rotation. During the pumping mode 500, the cam follower disengages the dimple and the cam begins to walk relative to the piston (rotating about the axis of rotation with a different angular frequency than the pump, an example of which is shown in FIG. 45).

In a second example of the fourth variant, the SEM includes an active friction member separate and distinct from the pump (e.g., secondary actuator 109), which controls the friction between the cam and the bearing spacer.

In a third example of the fourth variant, the pump is charged with pressurized working fluid (e.g., from the tire) to change the friction between the cam and the bearing spacer.

In a fifth variant, the system uses binding friction (e.g., only) and no eccentric mass.

Figure 50:
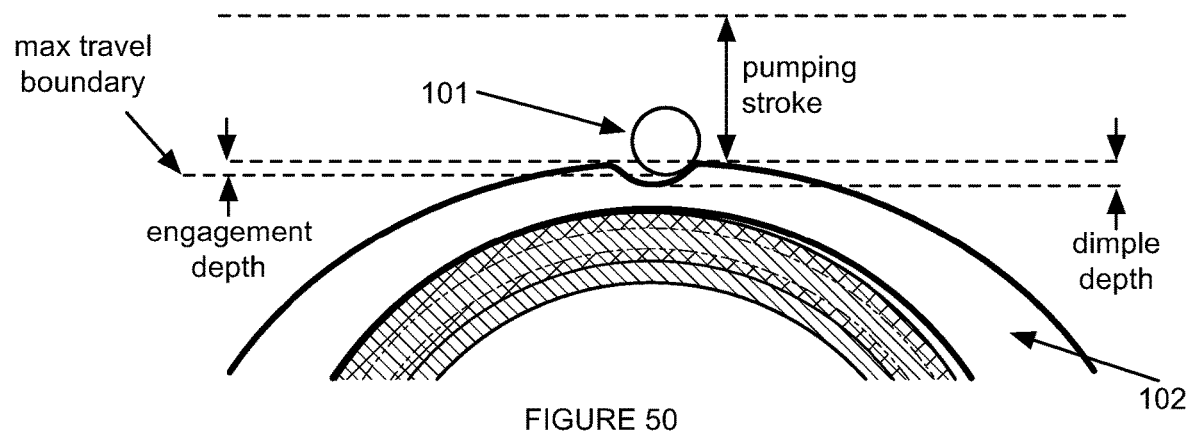
FIG. 50 is a diagram of an example arrangement of cam follower engagement with a cam and a dimple.

In a first example of the fifth variant, the PPA includes a symmetric floating cam with two lobes with dimples arranged at bottom dead (one dimple per lobe). Each dimple has a depth of 1 cm, extending radially inward on the follower surface of the floating cam. A stopper (hard stop) prevents the piston head from extending beyond 0.75 cm radially inward of its position at bottom dead center of the cam (during pumping mode). An example of the pumping stroke, max travel of the cam follower, engagement depth of the follower in the dimple, and depth of the dimple relative to the cam is shown in FIG. 50.

Variants of the fourth and fifth variant can optionally be arranged at the wheel end (e.g., used instead of the hubcap, mounted to the hubcap, mounted to the spindle, mounted to the spindle nut stack, mounted to an auxiliary shaft extending from the spindle or spindle nut stack, arranged axially outward of the spindle nut, etc.). For example, the floating cam can fit over the spindle or a shaft extending from the spindle or spindle nut stack. These variants can be used for static axles (e.g., steer or trailer hubs), drive axles, and/or any other suitable axle.

In a sixth variant, the system uses an active member to create friction instead of binding.

In variants, the cam would be forced to spin with the pump when pumping is not needed. For example, the friction force can be removed so that the cam became free to spin (e.g., in the active friction variant). However, the cam can be actuated axially or radially; a divot on the low pressure side that receives the roller if the pump is forcefully pressurized so that it extends beyond Bottom Dead Center (e.g., the divot serves to interfere with the roller so that the pump will carry the cam with it as it rotates with the hub); the pump has integrated hard stops (e.g., so that it doesn't transfer pressure force to the cam, when a cam is used); or otherwise statically engaged with the pump when pumping is not needed.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A hub-integrated inflation system comprising:
   a hub body defining a lubricant cavity;
   a pump mounted to the hub body; and
   a cam follower mechanically coupled to the pump; and
   a floating cam arranged within the lubricant cavity,
   wherein, in a pumping mode, the floating cam is configured to eccentrically rotate about an axis of rotation of a spindle, with the cam follower in contact with a first surface of the floating cam,
   wherein, in a non-pumping mode, the pump is disengaged.

2. The hub-integrated inflation system of claim 1, further comprising a selective engagement mechanism configured to retain the floating cam relative to the hub body.

3. The hub-integrated inflation system of claim 2, wherein the selective engagement mechanism comprises at least one dimple, the dimple arranged proximate the first surface, the dimple located at a local minimum of a radial thickness of the cam.

4. The hub-integrated inflation system of claim 1, further comprising a bearing spacer arranged within the hub body and statically mounted to a vehicle axle, wherein the bearing spacer is coaxial with the axis of rotation, wherein the floating cam encircles the bearing spacer and contacts the bearing spacer along a second surface, radially inwards of the first surface.

5. The hub-integrated inflation system of claim 1, wherein the hub body defines a pump cavity and a lubricant port, each extending through a radial hub thickness, wherein the pump is arranged inside the pump cavity, wherein the pump cavity is separate and distinct from the lubricant port.

6. The hub-integrated inflation system of claim 1, wherein, in the non-pumping mode, the floating cam is configured to slip within the lubricant cavity, thereby disengaging the pump.

7. The hub-integrated inflation system of claim 6, wherein, in the non-pumping mode, the floating cam is configured to slip against a non-rotating component of an axle along a second surface of the floating cam.

8. The hub-integrated inflation system of claim 7, wherein, in the pumping mode, the second surface statically contacts the non-rotating component.

9. The hub-integrated inflation system of claim 1, wherein, in the pumping mode, the floating cam is configured to eccentrically rotate about the axis of rotation with a different angular frequency than the hub body.

10. The hub-integrated inflation system of claim 1, further comprising a selective engagement mechanism, wherein a normal force exerted on the floating cam is larger in the pumping mode than in the non-pumping mode, wherein the selective engagement mechanism changes the normal force exerted on the floating cam.

11. A system comprising:
   a hub body configured to mount to an axle and defining an axis of rotation;
   a cam encircling a static component of the axle, the cam defining:
      a first surface with a central axis offset from the axis of rotation; and
      a second surface which is radially outward of the first surface;
   an output component mounted to the hub body; and
   a cam follower selectively connecting the output component to the second surface.

12. The system of claim 11, wherein the hub body and the static component of the axle cooperatively define a lubricant cavity, wherein the cam is arranged within the lubricant cavity.

13. The system of claim 11, wherein, in a first configuration, the cam is freely rotatable about the static component.

14. The system of claim 11, wherein the static component of the axle comprises a bearing spacer coaxially aligned with the axis of rotation.

15. The system of claim 11, wherein the cam follower selectively connects the output component to the second surface based on a normal force exerted on the cam.

16. The system of claim 11, wherein the system outputs a torque of less than 50 inch-ounces on the output component.

17. A system comprising:
   a hub body defining an axis of rotation;
   an output component mounted to the hub body; and
   a cam encircling a non-rotating axle component, the cam defining a central axis offset from the axis of rotation, wherein, in a first configuration, the output component is coupled to the cam and the cam is configured to rotate about the axis of rotation with a different angular frequency than the hub body.

18. The system of claim 17, wherein the output component comprises a piston pump.

19. The system of claim 17, wherein, in a second configuration, the cam is configured to slip against the non-rotating axle component.

20. The system of claim 17, wherein the non-rotating axle component comprises a bearing spacer.

* * * * *